United States Patent
Castinado et al.

(10) Patent No.: US 11,374,935 B2
(45) Date of Patent: Jun. 28, 2022

(54) BLOCK CHAIN ALIAS PERSON-TO-PERSON RESOURCE ALLOCATION

(71) Applicant: BANK OF AMERICA CORPORATION, Charlotte, NC (US)

(72) Inventors: Joseph B. Castinado, North Glenn, CO (US); Venkatakrishnan Balasubramanian, Bangalore (IN); Richard Huw Thomas, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 414 days.

(21) Appl. No.: 16/596,832

(22) Filed: Oct. 9, 2019

(65) Prior Publication Data

US 2021/0112063 A1   Apr. 15, 2021

Related U.S. Application Data

(63) Continuation of application No. 15/041,566, filed on Feb. 11, 2016, now abandoned.

(51) Int. Cl.
*H04L 9/40* (2022.01)
*G06F 16/27* (2019.01)

(52) U.S. Cl.
CPC ............ *H04L 63/102* (2013.01); *G06F 16/27* (2019.01)

(58) Field of Classification Search
CPC .............................. H04L 63/102; G06F 16/27
See application file for complete search history.

(56) References Cited

U.S. PATENT DOCUMENTS 5,671,283 A   9/1997   Michener et al.
5,835,599 A   11/1998   Buer
(Continued)

FOREIGN PATENT DOCUMENTS

WO   2014162296   10/2014
WO   2015135018    9/2015

OTHER PUBLICATIONS

Bradley Hope et al., "A Bitcoin Technology Gets Nasdaq Test"; May 10, 2015; retrieved from http://www.wsj.com/articles/a-bitcoin-technology-gets-nasdaq-test-1431296886.
(Continued)

*Primary Examiner* — Jason Chiang
(74) *Attorney, Agent, or Firm* — Moore & Van Allen PLLC; James C. Edwards

(57) ABSTRACT

Embodiments provide a system operatively connected with a block chain distributed network and for using the block chain distributed network for facilitating a person-to-person (P2P) alias-based resource allocation. Embodiments receive an event record associated with a P2P event between a first user and a second user. The event record comprises an alias associated with the first user and/or the second user. A distributed ledger is accessed that is updated based on communications from a block chain distributed network. An alias-to-entity mapping is retrieved from the accessed distributed ledger. The alias-to-entity mapping indicates at least an entity to which the alias is mapped. Based on the mapping the alias is determined to be at least partially valid. In some cases, embodiments determine that the alias corresponds to a resource depository number maintained by the entity in a private ledger and authorizes a resource event associated with the resource event request.

14 Claims, 29 Drawing Sheets

(56) References Cited

U.S. PATENT DOCUMENTS

| | | | |
|---|---|---|---|
| 6,073,234 A | 6/2000 | Kigo et al. |
| 6,324,286 B1 | 11/2001 | Lai et al. |
| 6,725,303 B1 | 4/2004 | Hoguta et al. |
| 6,850,252 B1 | 2/2005 | Hoffberg |
| 6,973,187 B2 | 12/2005 | Gligor et al. |
| 7,055,039 B2 | 5/2006 | Chavanne et al. |
| 7,092,400 B2 | 8/2006 | Malzahn |
| 7,184,549 B2 | 2/2007 | Sorimachi et al. |
| 7,362,859 B1 | 4/2008 | Robertson et al. |
| 7,392,384 B2 | 6/2008 | Hopkins et al. |
| 7,428,306 B2 | 9/2008 | Celikkan et al. |
| 7,502,933 B2 | 3/2009 | Jakobsson et al. |
| 7,574,401 B1 | 8/2009 | Burns |
| 7,649,992 B2 | 1/2010 | Raju et al. |
| 7,764,788 B2 | 7/2010 | Tardo |
| 7,979,889 B2 | 7/2011 | Gladstone et al. |
| 8,078,874 B2 | 12/2011 | You et al. |
| 8,107,621 B2 | 1/2012 | Celikkan et al. |
| 8,155,311 B2 | 4/2012 | Shin et al. |
| 8,259,934 B2 | 9/2012 | Karroumi et al. |
| 8,302,153 B1 | 10/2012 | Garrity et al. |
| 8,358,781 B2 | 1/2013 | Schneider |
| 8,396,209 B2 | 3/2013 | Schneider |
| 8,397,841 B1 | 3/2013 | Griffo et al. |
| 8,416,947 B2 | 4/2013 | Schneider |
| 8,458,461 B2 | 6/2013 | Tardo |
| 8,464,320 B2 | 6/2013 | Archer et al. |
| 8,516,266 B2 | 8/2013 | Hoffberg et al. |
| 8,590,055 B2 | 11/2013 | Yoon et al. |
| 8,725,635 B2 | 5/2014 | Klein et al. |
| 8,737,606 B2 | 5/2014 | Taylor et al. |
| 8,942,374 B2 | 1/2015 | Fujisaki |
| 8,983,063 B1 | 3/2015 | Taylor et al. |
| 9,059,866 B2 | 6/2015 | Bar-Sade et al. |
| 9,083,702 B2 | 7/2015 | Wied et al. |
| 9,092,766 B1 | 7/2015 | Bedier et al. |
| 9,298,806 B1 | 3/2016 | Vessenes et al. |
| 9,319,469 B2 | 4/2016 | Ruhlen et al. |
| 9,635,000 B1 | 4/2017 | Muftic |
| 9,672,499 B2 | 6/2017 | Yang et al. |
| 9,722,790 B2 | 8/2017 | Ebrahimi |
| 9,818,092 B2 | 11/2017 | Pennanen |
| 10,333,705 B2 * | 6/2019 | Smith | H04L 9/3236 |
| 10,565,645 B1 * | 2/2020 | Kurani | G06Q 40/04 |
| 10,841,307 B2 * | 11/2020 | Smith | H04L 9/321 |
| 10,929,842 B1 * | 2/2021 | Arvanaghi | H04L 67/10 |
| 10,970,684 B1 * | 4/2021 | Kurani | G06Q 20/065 |
| 11,200,569 B1 * | 12/2021 | James | G06Q 40/04 |
| 11,226,956 B2 * | 1/2022 | Somani | G06F 16/24575 |
| 2003/0126094 A1 | 7/2003 | Fisher et al. |
| 2004/0172535 A1 | 9/2004 | Jakobsson et al. |
| 2004/0199463 A1 | 10/2004 | Deggendorf |
| 2005/0256802 A1 | 11/2005 | Ammermann et al. |
| 2007/0136573 A1 | 6/2007 | Steinberg |
| 2009/0281948 A1 | 11/2009 | Carlson |
| 2010/0279653 A1 | 11/2010 | Poltorak |
| 2011/0078073 A1 | 3/2011 | Annappindi |
| 2011/0197064 A1 | 8/2011 | Garcia Morchon et al. |
| 2012/0066121 A1 | 3/2012 | Shahbazi et al. |
| 2012/0096529 A1 | 4/2012 | Bournelle et al. |
| 2012/0271920 A1 | 10/2012 | Isaksson |
| 2012/0284175 A1 | 11/2012 | Wilson et al. |
| 2013/0198061 A1 | 8/2013 | Dheer et al. |
| 2013/0232056 A1 | 9/2013 | Schulman |
| 2014/0006185 A1 | 1/2014 | Zurn et al. |
| 2014/0089243 A1 | 3/2014 | Oppenheimer |
| 2014/0310171 A1 | 10/2014 | Grossman et al. |
| 2014/0344153 A1 | 11/2014 | Raj et al. |
| 2015/0032627 A1 | 1/2015 | Dill et al. |
| 2015/0100495 A1 | 4/2015 | Salama et al. |
| 2015/0172053 A1 | 6/2015 | Schwarz et al. |
| 2015/0206106 A1 | 7/2015 | Yago |
| 2015/0244690 A1 | 8/2015 | Mossbarger |
| 2015/0262137 A1 | 9/2015 | Armstrong |
| 2015/0262140 A1 | 9/2015 | Armstrong |
| 2015/0310424 A1 | 10/2015 | Myers |
| 2015/0332283 A1 | 11/2015 | Witchey |
| 2015/0356523 A1 | 12/2015 | Madden |
| 2015/0379510 A1 | 12/2015 | Smith |
| 2015/0379636 A1 | 12/2015 | Szabo et al. |
| 2016/0012424 A1 | 1/2016 | Simon et al. |
| 2016/0028552 A1 | 1/2016 | Spanos et al. |
| 2016/0035054 A1 | 2/2016 | Branscomb et al. |
| 2016/0050203 A1 | 2/2016 | Hefetz |
| 2016/0092874 A1 | 3/2016 | ORegan et al. |
| 2016/0125376 A1 | 5/2016 | Beatty et al. |
| 2016/0191243 A1 | 6/2016 | Manning |
| 2016/0219045 A1 | 7/2016 | Toedter et al. |
| 2016/0253663 A1 * | 9/2016 | Clark | G06Q 20/3274 705/75 |
| 2016/0260169 A1 | 9/2016 | Arnold et al. |
| 2016/0275461 A1 | 9/2016 | Sprague et al. |
| 2016/0292672 A1 | 10/2016 | Fay et al. |
| 2016/0321654 A1 | 11/2016 | Lesavich et al. |
| 2016/0323109 A1 | 11/2016 | McCoy et al. |
| 2016/0342978 A1 | 11/2016 | Davis et al. |
| 2016/0342989 A1 | 11/2016 | Davis |
| 2016/0342994 A1 | 11/2016 | Davis |
| 2017/0005804 A1 | 1/2017 | Zinder |
| 2017/0011460 A1 | 1/2017 | Molinari et al. |
| 2017/0046526 A1 | 2/2017 | Chan et al. |
| 2017/0046651 A1 | 2/2017 | Lin et al. |
| 2017/0046652 A1 | 2/2017 | Haldenby et al. |
| 2017/0046664 A1 | 2/2017 | Haldenby et al. |
| 2017/0046680 A1 | 2/2017 | Crites |
| 2017/0046693 A1 | 2/2017 | Haldenby et al. |
| 2017/0046792 A1 | 2/2017 | Haldenby et al. |
| 2017/0085555 A1 | 3/2017 | Bisikalo et al. |
| 2017/0091397 A1 | 3/2017 | Shah |
| 2017/0103167 A1 | 4/2017 | Shah |
| 2017/0103461 A1 | 4/2017 | Acuna-Rohter et al. |
| 2017/0109735 A1 | 4/2017 | Sheng et al. |
| 2017/0116693 A1 | 4/2017 | Rae et al. |
| 2017/0132621 A1 | 5/2017 | Miller et al. |
| 2017/0132625 A1 | 5/2017 | Kennedy |
| 2017/0132626 A1 | 5/2017 | Kennedy |
| 2017/0132630 A1 * | 5/2017 | Castinado | G06Q 20/382 |
| 2017/0140374 A1 | 5/2017 | OBrien et al. |
| 2017/0140375 A1 | 5/2017 | Kunstel |
| 2017/0140394 A1 | 5/2017 | Cao et al. |
| 2017/0142024 A1 | 5/2017 | Fromentoux et al. |
| 2017/0149796 A1 | 5/2017 | Gvili |
| 2017/0155515 A1 | 6/2017 | Androulaki et al. |
| 2017/0163733 A1 | 6/2017 | Grefen et al. |
| 2017/0177855 A1 | 6/2017 | Costa Faidella et al. |
| 2017/0178131 A1 | 6/2017 | Fernandez et al. |
| 2017/0178237 A1 | 6/2017 | Wong |
| 2017/0180134 A1 | 6/2017 | King |
| 2017/0200137 A1 | 7/2017 | Vilmont |
| 2017/0213209 A1 | 7/2017 | Dillenberger |
| 2017/0214675 A1 | 7/2017 | Johnsrud et al. |
| 2017/0214698 A1 | 7/2017 | Hughes et al. |
| 2017/0220998 A1 | 8/2017 | Horn et al. |
| 2017/0221052 A1 | 8/2017 | Sheng et al. |
| 2017/0223005 A1 | 8/2017 | Birgisson et al. |
| 2017/0228447 A1 | 8/2017 | Catania et al. |
| 2017/0228822 A1 | 8/2017 | Creighton et al. |
| 2017/0230378 A1 | 8/2017 | Bliss |
| 2017/0232300 A1 | 8/2017 | Tran et al. |
| 2017/0235955 A1 | 8/2017 | Barkan |
| 2017/0236407 A1 | 8/2017 | Rhoads et al. |
| 2017/0243020 A1 | 8/2017 | Dhondse et al. |
| 2018/0053161 A1 | 2/2018 | Bordash et al. |
| 2018/0114205 A1 * | 4/2018 | Thomas | G06Q 40/02 |
| 2018/0268479 A1 | 9/2018 | Dowling et al. |
| 2019/0044917 A1 * | 2/2019 | Mork | H04L 63/0428 |
| 2019/0197554 A1 * | 6/2019 | Patel | G06Q 20/42 |
| 2019/0303931 A1 * | 10/2019 | Valencia | G06Q 20/3229 |
| 2019/0325532 A1 * | 10/2019 | Torrenegra | G06Q 10/1053 |
| 2020/0052903 A1 * | 2/2020 | Lam | H04L 9/3218 |
| 2020/0167336 A1 * | 5/2020 | Somani | G06Q 20/223 |
| 2020/0218795 A1 * | 7/2020 | Antar | G06Q 20/38215 |

(56) References Cited

U.S. PATENT DOCUMENTS

| | | | | |
|---|---|---|---|---|
| 2020/0250168 | A1* | 8/2020 | Xu | G06Q 20/3678 |
| 2020/0286081 | A1* | 9/2020 | Anderson | G06Q 20/3674 |
| 2020/0334668 | A1* | 10/2020 | Nicli | G06Q 20/10 |

OTHER PUBLICATIONS

Nathaniel Popper, "Bitcoin Technology Piques Interest On Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_Tasca/publication/290805276 Digital Currencies Principles Trends Opportunities and Risks/links/569bb91e08ae6169e5624552.pif> 39 5, 10, 12, 14.

Lerner. "MAVEPAY a new lightweight payment scheme for peer to peer currency networks." Apr. 17, 2012 ;Apr. 17, 2012) Retrieved from <https://pdfs.semanticscholar.org/1185/a26f014678b959876519065c2624458d75b8.pdf>, entire document.

International Search Report and Written Opinion for International Application No. PCT/US2016/061402 completed Dec. 27, 2016.

International Search Report and International Written Opinion for International Application No. PCT/IB16/01655 dated Apr. 7, 2017.

Extended European Search Report for European Patent Application 16863739.5 completed Mar. 18, 2019.

Malahov, Yanislav Georgiev, "BitAlias 1, Aka Usernames for Bitcoin, A New, Simple Naming System for Bitcoin Addresses", retrieved from hqvi:limedium.cornit,.:,,. s-cloceh Lr alized-naming:. ,-Licirntivi-se x ,,-,,.—661lffet19d S on Mar. 12, 2017; Bringing Crypto to the People, Founder of www.aaernity.com, Jun. 6, 2015, 6 pages.

Buterin, Vitalik, "On Public and Private Blockchains", Aug. 7, 2015, https://blog.ethereum.org/2015/08/07/on-public-and-private-blockchains/.

Provisional Application filed Dec. 10, 2015, by Arjomand et al. "Attributable Digital Currency", cited on Nov. 21, 2017 in U.S. Appl. No. 15/049,777.

* cited by examiner

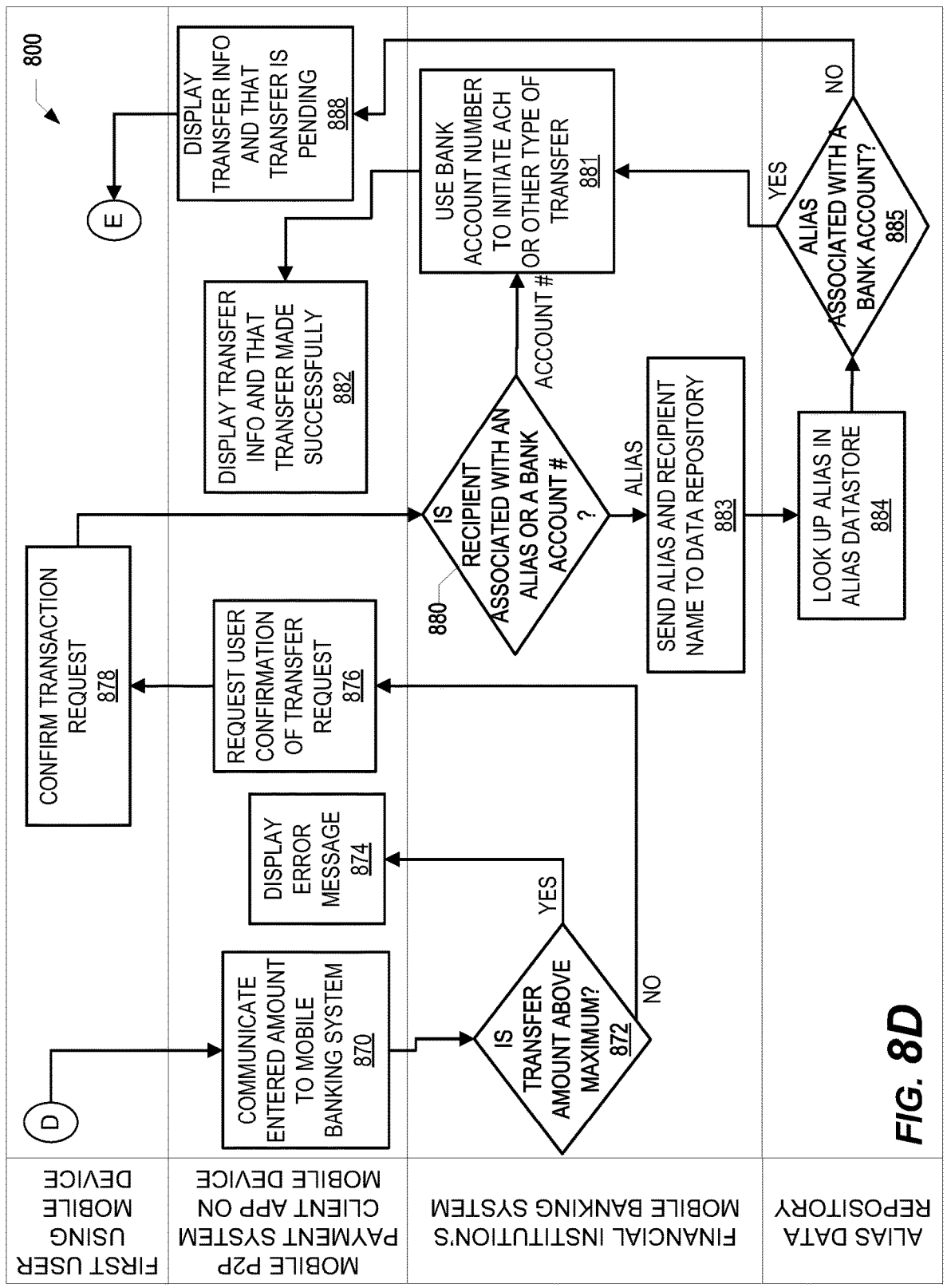

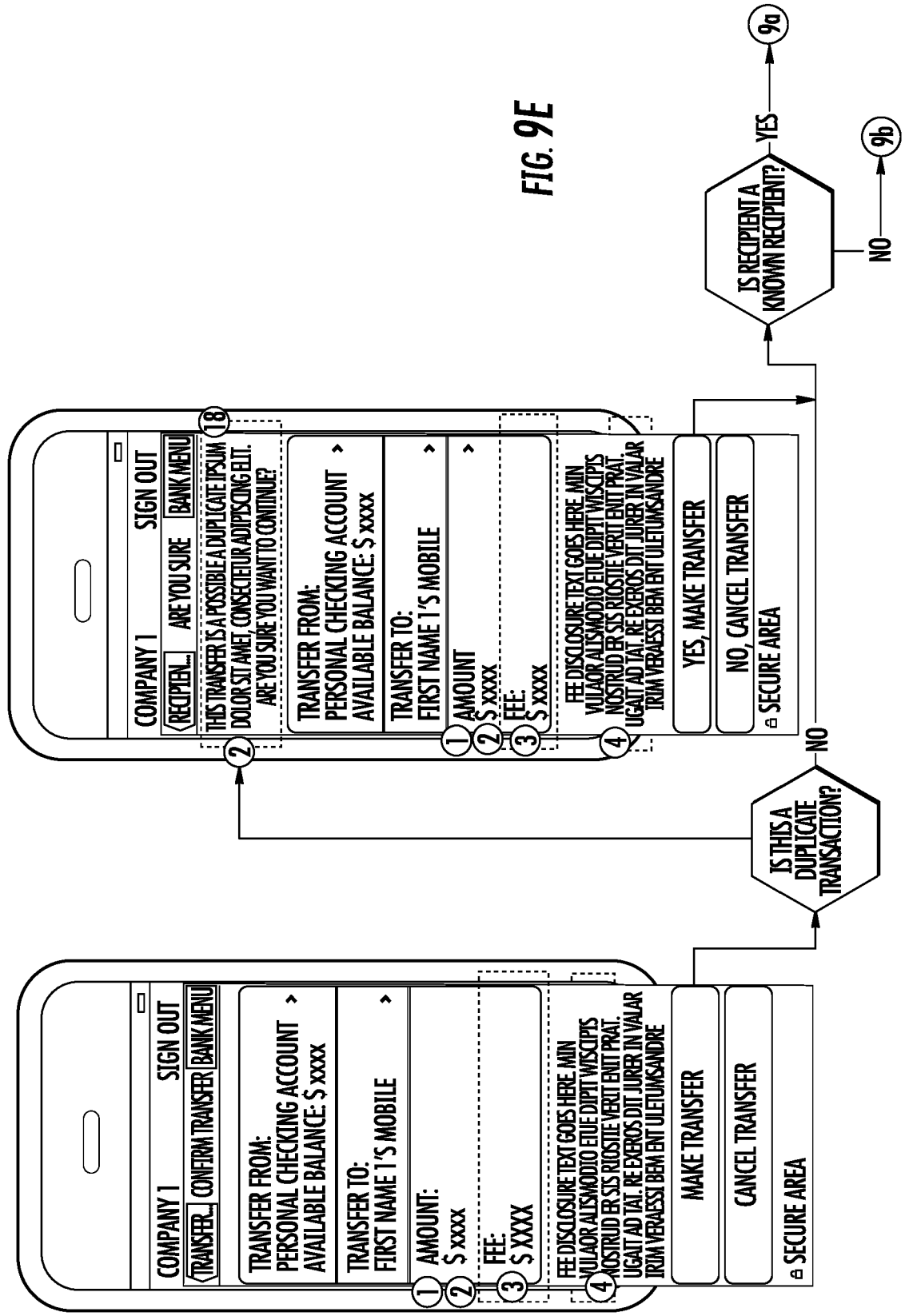

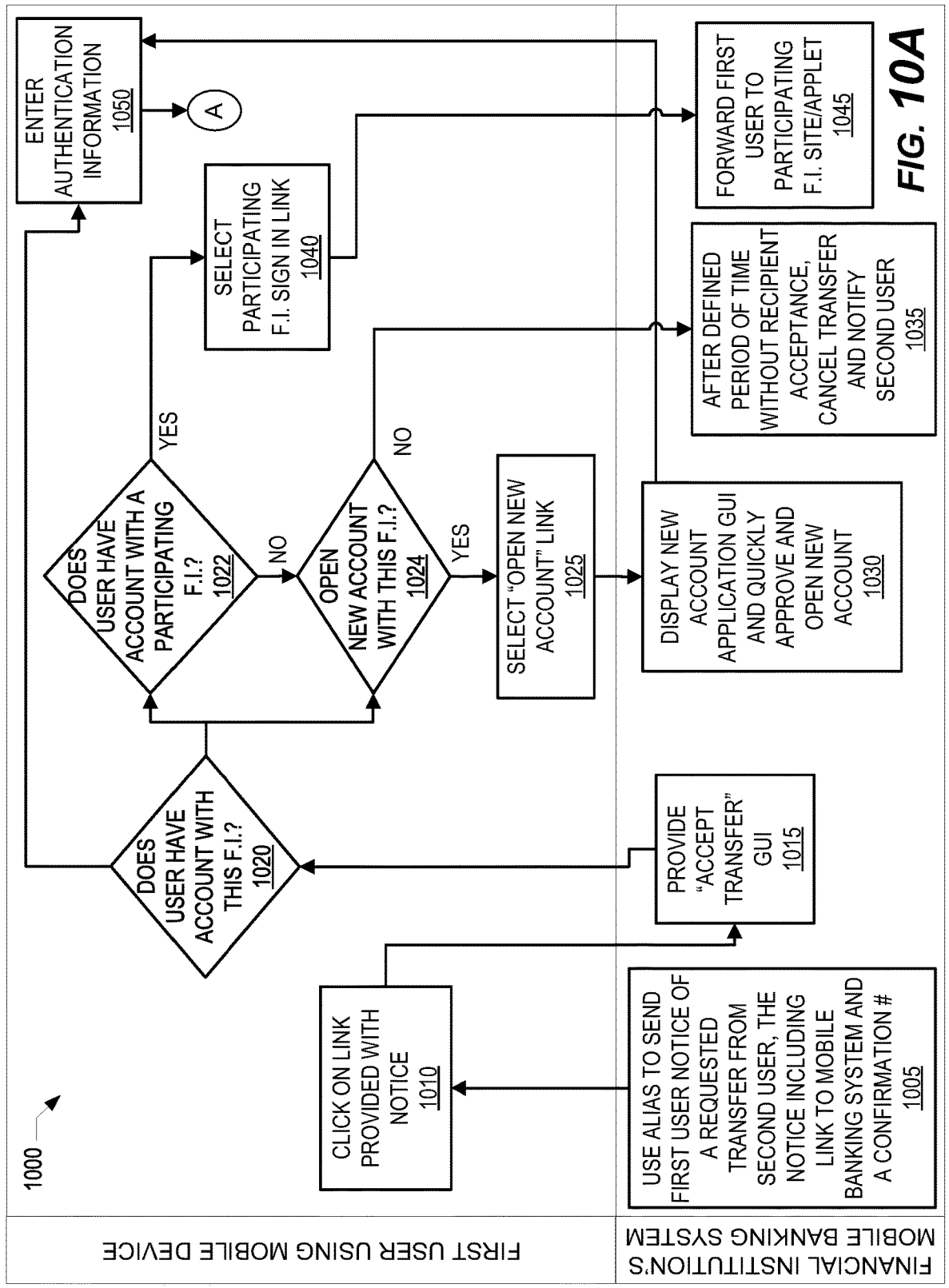

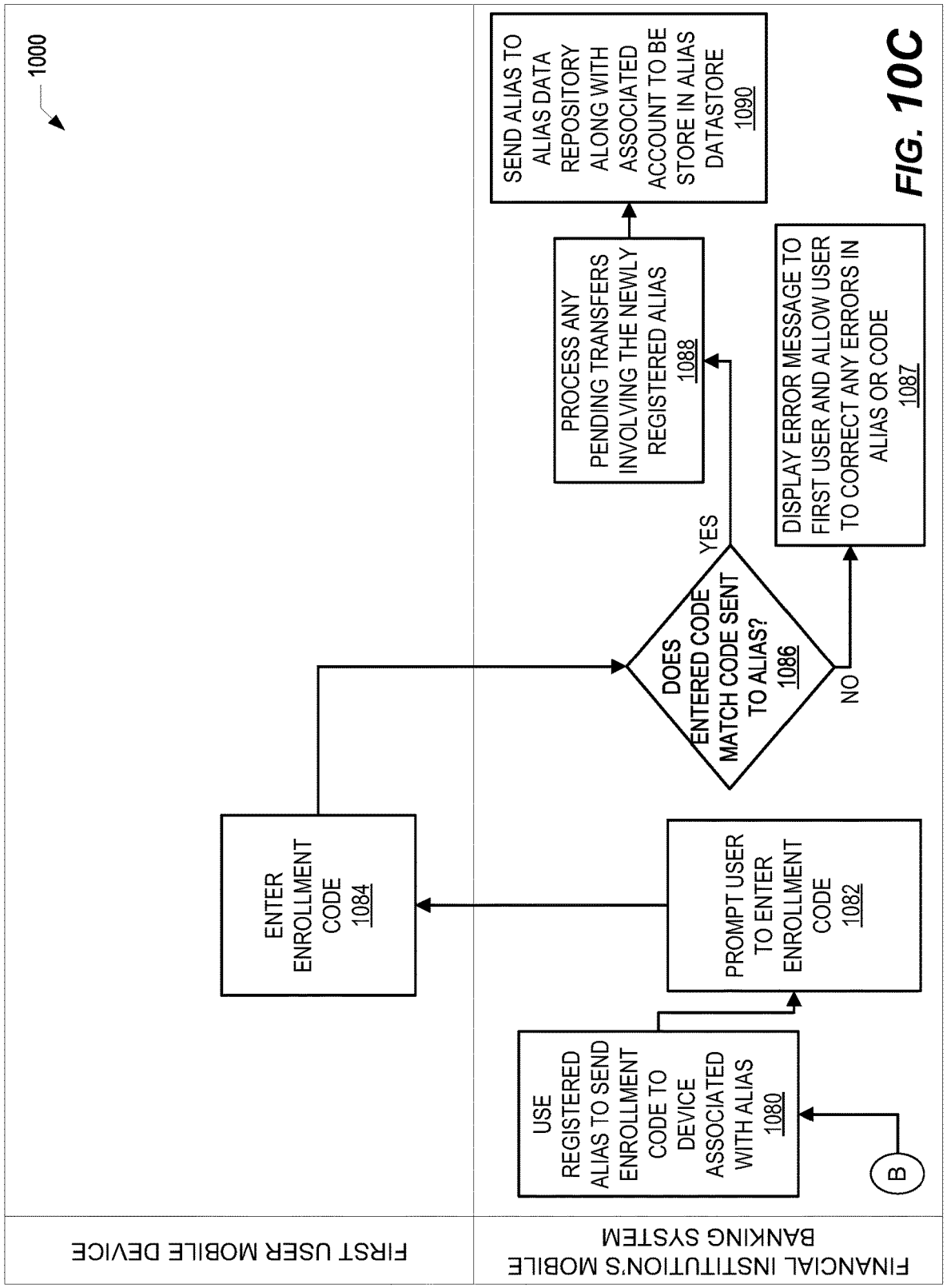

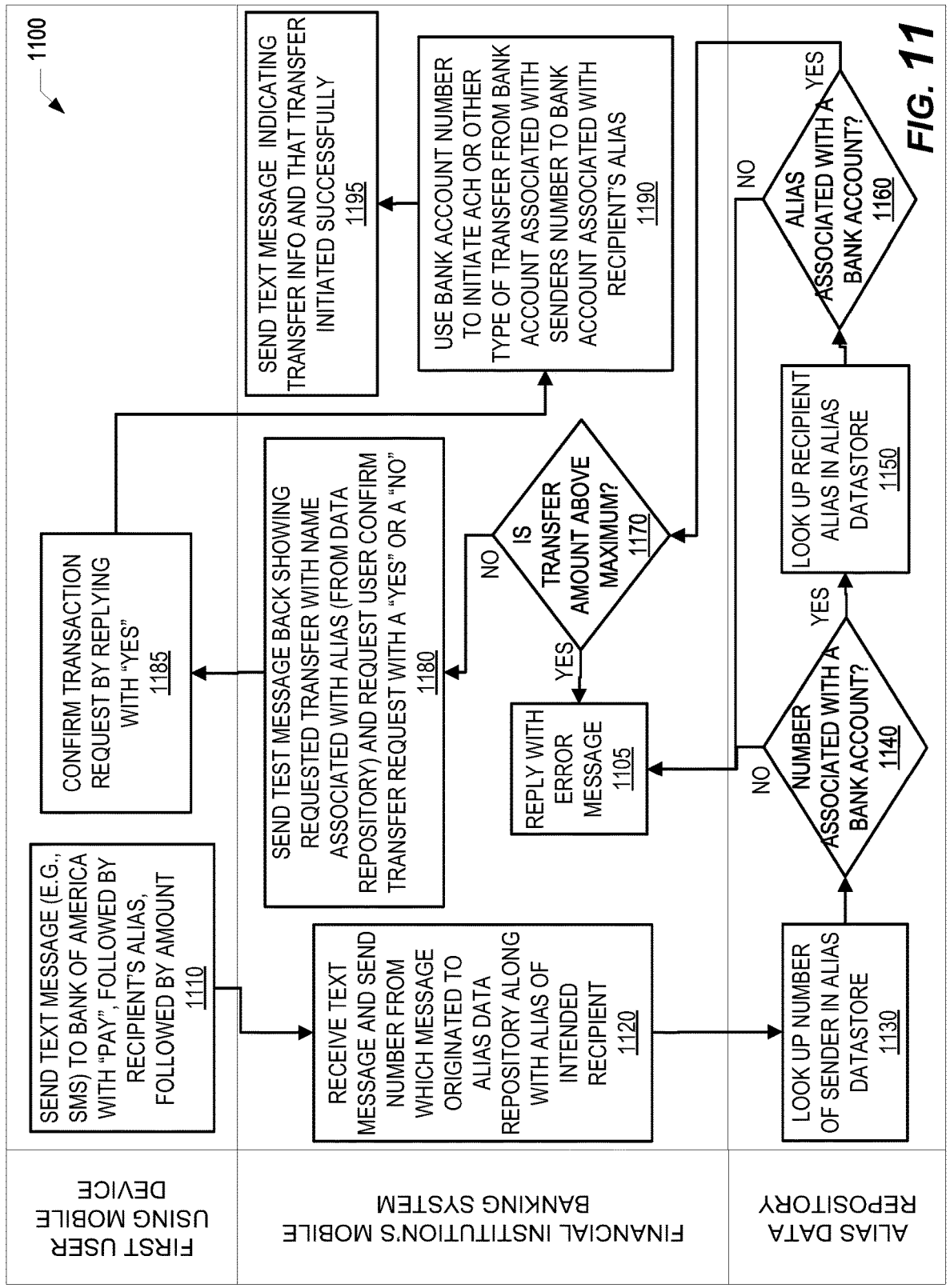

BLOCK CHAIN ALIAS PERSON-TO-PERSON RESOURCE ALLOCATION

FIELD OF THE INVENTION

The present invention relates to block chain computing and, more specifically, block chain alias person-to-person resource allocation.

BRIEF SUMMARY

Embodiments of the present invention address these and/or other needs by providing an innovative system operatively connected with a block chain distributed network and for using the block chain distributed network for facilitating a person-to-person (P2P) alias-based resource allocation, where the system includes a memory device; and a processing device operatively coupled to the memory device, wherein the processing device is configured to execute computer-readable program code to receive a resource event record associated with a P2P resource event between a first user and a second user, wherein the resource event record comprises an alias associated with at least one of the first user and the second user; access a distributed ledger, wherein the distributed ledger is updated based on communications from a block chain distributed network; retrieve an alias-to-entity mapping from the accessed distributed ledger, wherein the alias-to-entity mapping indicates at least an entity to which the alias is mapped; and based on the mapping, determine that the alias is at least partially valid.

In some embodiments, the processing device is further configured to execute computer-readable program code to communicate the resource event record to the entity for full validation of the transaction record and authorization of the resource event. In some embodiments, the processing device is further configured to execute computer-readable program code to, based at least in part on the determination that the alias is at least partially valid, initiate authorization of the resource event.

According to embodiments of the invention, a system maintained by an entity and operatively connected with a block chain distributed network and for using the block chain distributed network for facilitating a person-to-person (P2P) alias-based resource allocation includes a memory device; and a processing device operatively coupled to the memory device, wherein the processing device is configured to execute computer-readable program code to receive a resource event request from a node in a block chain distributed network; determine, from the resource event request, that an alias is associated with the resource event request; access a private alias ledger comprising a listing of a plurality of aliases and a corresponding plurality of resource depository numbers; determine that the alias corresponds to a resource a depository number maintained by the entity; and based on determining that the alias corresponds to the resource depository number maintained by the entity, authorize a resource event associated with the resource event request.

In some embodiments, the processing device is further configured to execute computer-readable program code to communicate authorization of the resource event to the block chain distributed network. In some embodiments, the processing device is further configured to execute computer-readable program code to update a distributed ledger stored by the system and provide access to the distributed ledger to the block chain distributed network. In some such embodiments, the processing device is further configured to execute computer-readable program code to update the distributed ledger with the authorization of the resource event.

Embodiments of the present invention address these and/or other needs by providing an innovative system operatively connected with a block chain distributed network and for using the block chain distributed network for facilitating a person-to-person (P2P) alias-based payment, where the system includes a memory device; and a processing device operatively coupled to the memory device, wherein the processing device is configured to execute computer-readable program code to receive a transaction record associated with a P2P transaction between a payor and a payee, wherein the transaction record comprises an alias associated with the payor and/or the payee; access a distributed ledger, wherein the distributed ledger is updated based on communications from a block chain distributed network; retrieve an alias-to-entity mapping from the accessed distributed ledger, wherein the alias-to-entity mapping indicates at least an entity to which the alias is mapped; and based on the mapping, determine that the alias is at least partially valid.

In some embodiments, the processing device is further configured to execute computer-readable program code to communicate the transaction record to the entity for full validation of the transaction record and authorization of the transaction. In some embodiments, the processing device is further configured to execute computer-readable program code to, based at least in part on the determination that the alias is at least partially valid, initiate authorization of the transaction.

According to embodiments of the invention, a system maintained by an entity and operatively connected with a block chain distributed network and for using the block chain distributed network for facilitating a person-to-person (P2P) alias-based payment includes a memory device; and a processing device operatively coupled to the memory device, wherein the processing device is configured to execute computer-readable program code to receive a transaction request from a node in a block chain distributed network; determine, from the transaction request, that an alias is associated with the transaction request; access a private alias ledger comprising a listing of a plurality of aliases and a corresponding plurality of account numbers; determine that the alias corresponds to an account number maintained by the entity; and based on determining that the alias corresponds to the account number maintained by the entity, authorize a transaction associated with the transaction request.

In some embodiments, the processing device is further configured to execute computer-readable program code to communicate authorization of the transaction to the block chain distributed network. In some embodiments, the processing device is further configured to execute computer-readable program code to update a distributed ledger stored by the system and provide access to the distributed ledger to the block chain distributed network. In some such embodiments, the processing device is further configured to execute computer-readable program code to update the distributed ledger with the authorization of the transaction.

According to embodiments of the invention, a method performed by a system operatively connected with a block chain distributed network and for using the block chain distributed network for facilitating a person-to-person (P2P) alias-based payment includes receiving a transaction record associated with a P2P transaction between a payor and a payee, wherein the transaction record comprises an alias associated with the payor and/or the payee; accessing a distributed ledger, wherein the distributed ledger is updated based on communications from a block chain distributed network; retrieving an alias-to-entity mapping from the accessed distributed ledger, wherein the alias-to-entity mapping indicates at least an entity to which the alias is mapped; and based on the mapping, determining that the alias is at least partially valid.

In some embodiments, the method includes communicating the transaction record to the entity for full validation of the transaction record and authorization of the transaction.

In some embodiments, the method includes, based at least in part on the determination that the alias is at least partially valid, initiating authorization of the transaction.

According to embodiments of the invention, a method performed by a system maintained by an entity and operatively connected with a block chain distributed network and for using the block chain distributed network for facilitating a person-to-person (P2P) alias-based payment includes receiving a transaction request from a node in a block chain distributed network; determining, from the transaction request, that an alias is associated with the transaction request; accessing a private alias ledger comprising a listing of a plurality of aliases and a corresponding plurality of account numbers; determining that the alias corresponds to an account number maintained by the entity; and, based on determining that the alias corresponds to the account number maintained by the entity, authorizing a transaction associated with the transaction request. In some embodiments, the method includes communicating authorization of the transaction to the block chain distributed network.

In some embodiments, the method includes updating a distributed ledger stored by the system and provide access to the distributed ledger to the block chain distributed network. In some such embodiments, the method includes updating the distributed ledger with the authorization of the transaction.

According to embodiments of the invention, a computer program product for execution on a system operatively connected with a block chain distributed network for using the block chain distributed network for facilitating a person-to-person (P2P) alias-based payment and including at least one non-transitory computer-readable medium having computer-readable program code portions embodied therein. The computer-readable program code portions include an executable portion configured to receive a transaction record associated with a P2P transaction between a payor and a payee, wherein the transaction record comprises an alias associated with the payor and/or the payee; an executable portion configured to access a distributed ledger, wherein the distributed ledger is updated based on communications from a block chain distributed network; an executable portion configured to retrieve an alias-to-entity mapping from the accessed distributed ledger, wherein the alias-to-entity mapping indicates at least an entity to which the alias is mapped; and an executable portion configured to, based on the mapping, determine that the alias is at least partially valid.

In some embodiments, the computer-readable program code portions further comprise an executable portion configured to communicate the transaction record to the entity for full validation of the transaction record and authorization of the transaction.

In some embodiments, the computer-readable program code portions further comprise an executable portion configured to, based at least in part on the determination that the alias is at least partially valid, initiate authorization of the transaction.

According to embodiments of the invention, a computer program product for execution on a system operatively connected with a block chain distributed network for using the block chain distributed network for facilitating a person-to-person (P2P) alias-based payment includes at least one non-transitory computer-readable medium having computer-readable program code portions embodied therein. The computer-readable program code portions include an executable portion configured to receive a transaction request from a node in a block chain distributed network; an executable portion configured to determine, from the transaction request, that an alias is associated with the transaction request; an executable portion configured to access a private alias ledger comprising a listing of a plurality of aliases and a corresponding plurality of account numbers; an executable portion configured to determine that the alias corresponds to an account number maintained by the entity; and an executable portion configured to, based on determining that the alias corresponds to the account number maintained by the entity, authorize a transaction associated with the transaction request.

In some embodiments, the computer-readable program code portions further comprise an executable portion configured to communicate authorization of the transaction to the block chain distributed network. In some embodiments, the computer-readable program code portions further comprise an executable portion configured to update a distributed ledger stored by the system and provide access to the distributed ledger to the block chain distributed network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
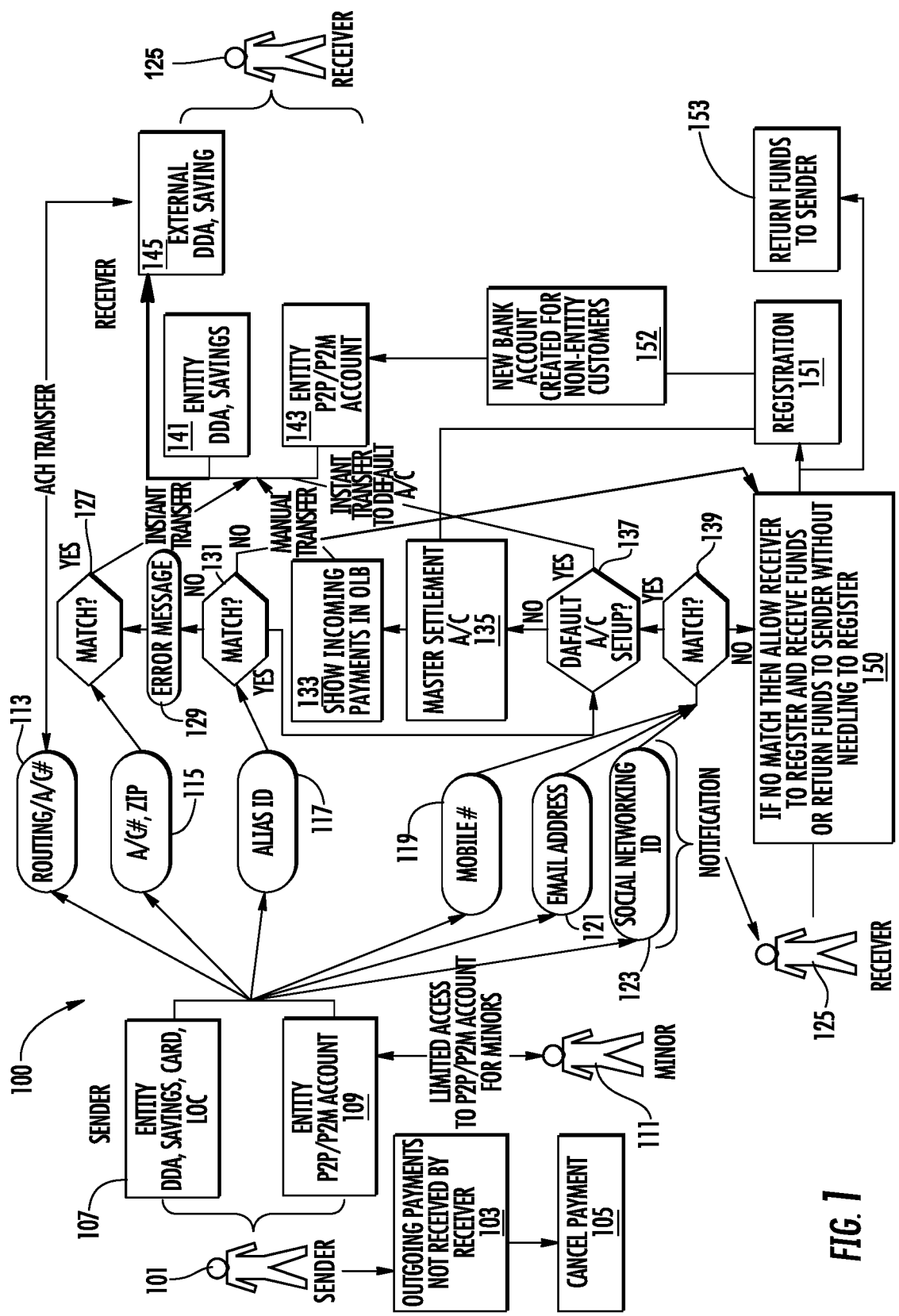
Figure 2:
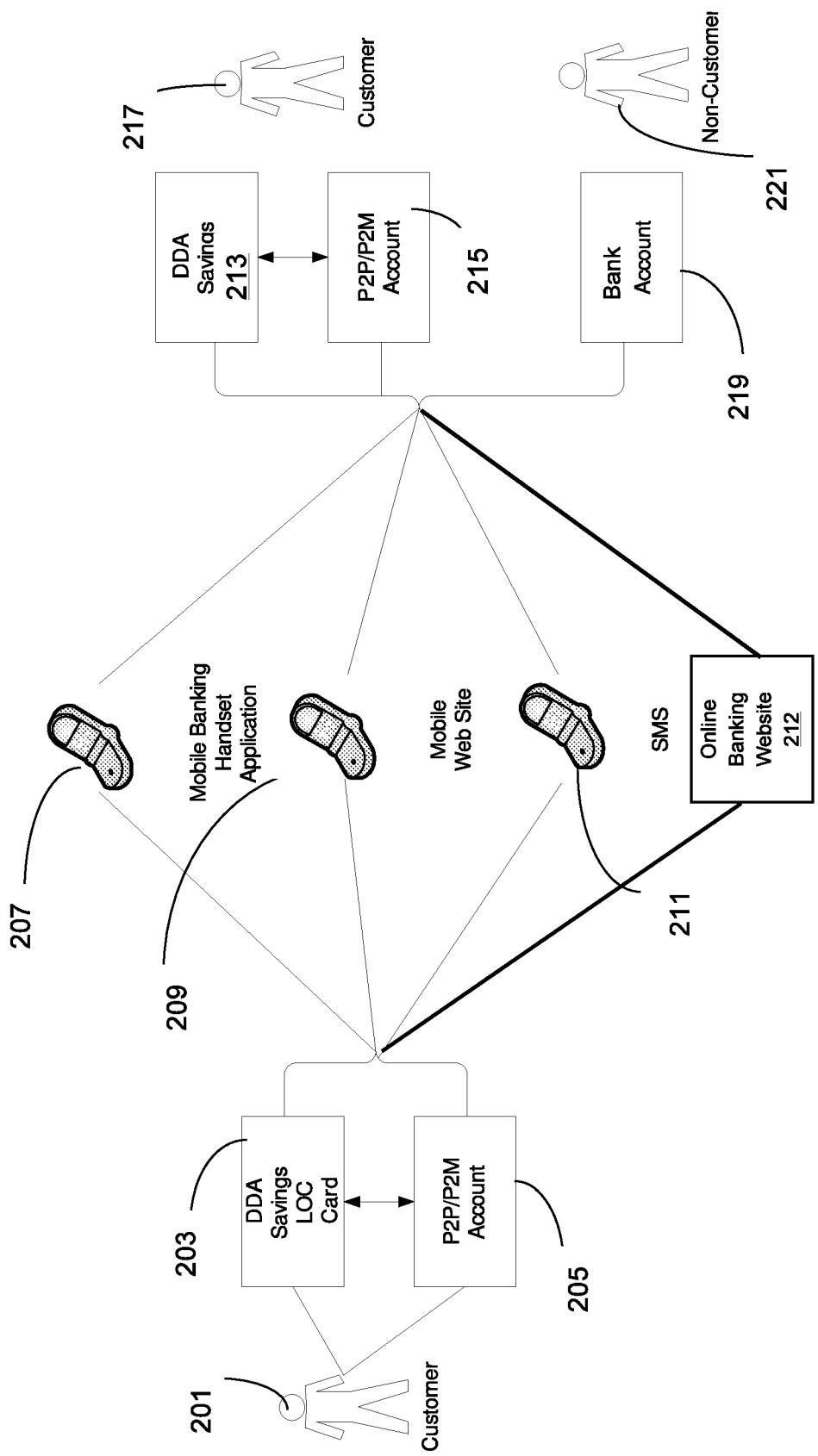
Figure 3:
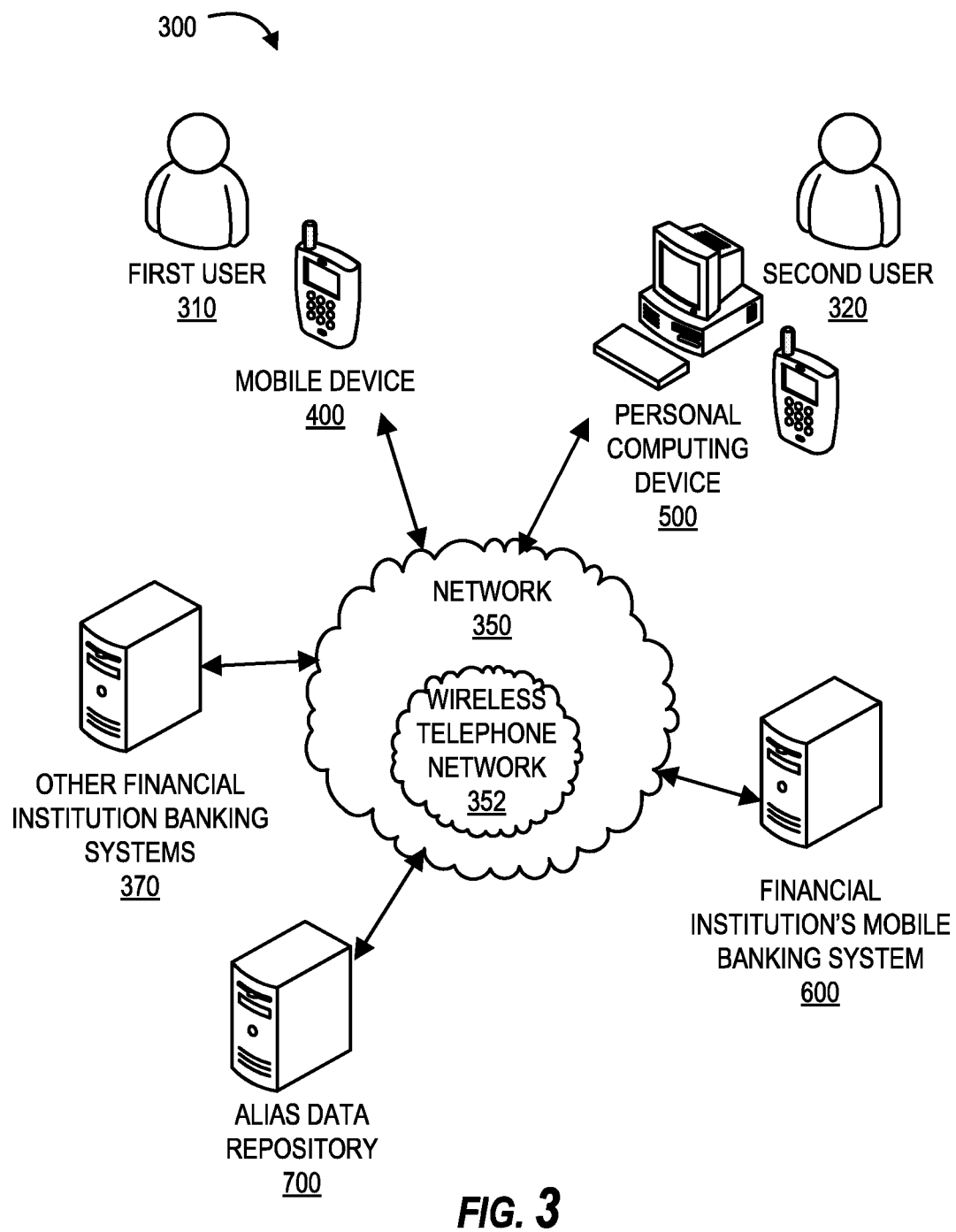
Figure 4:
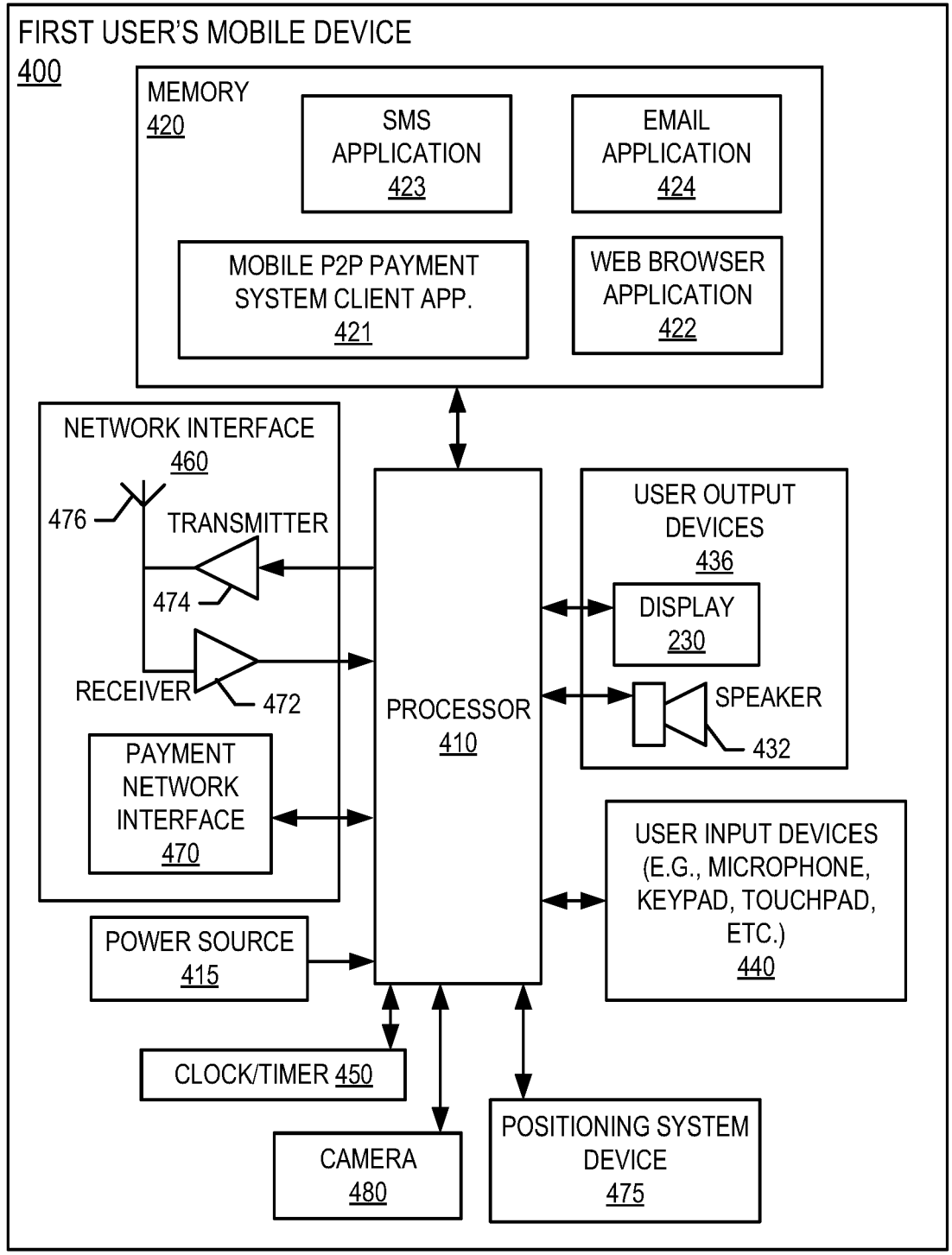
Figure 5:
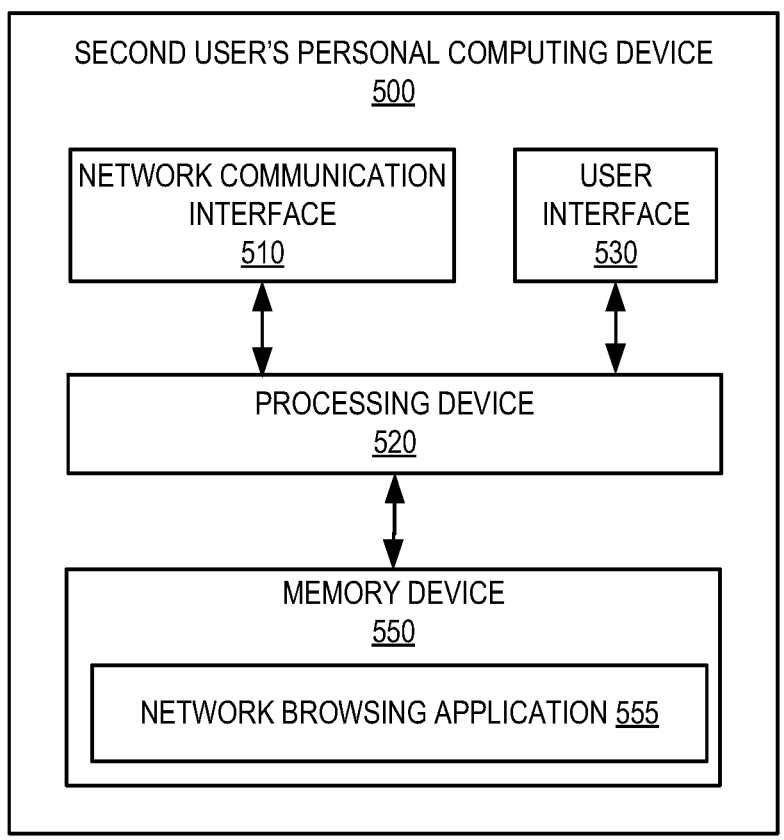
Figure 6:
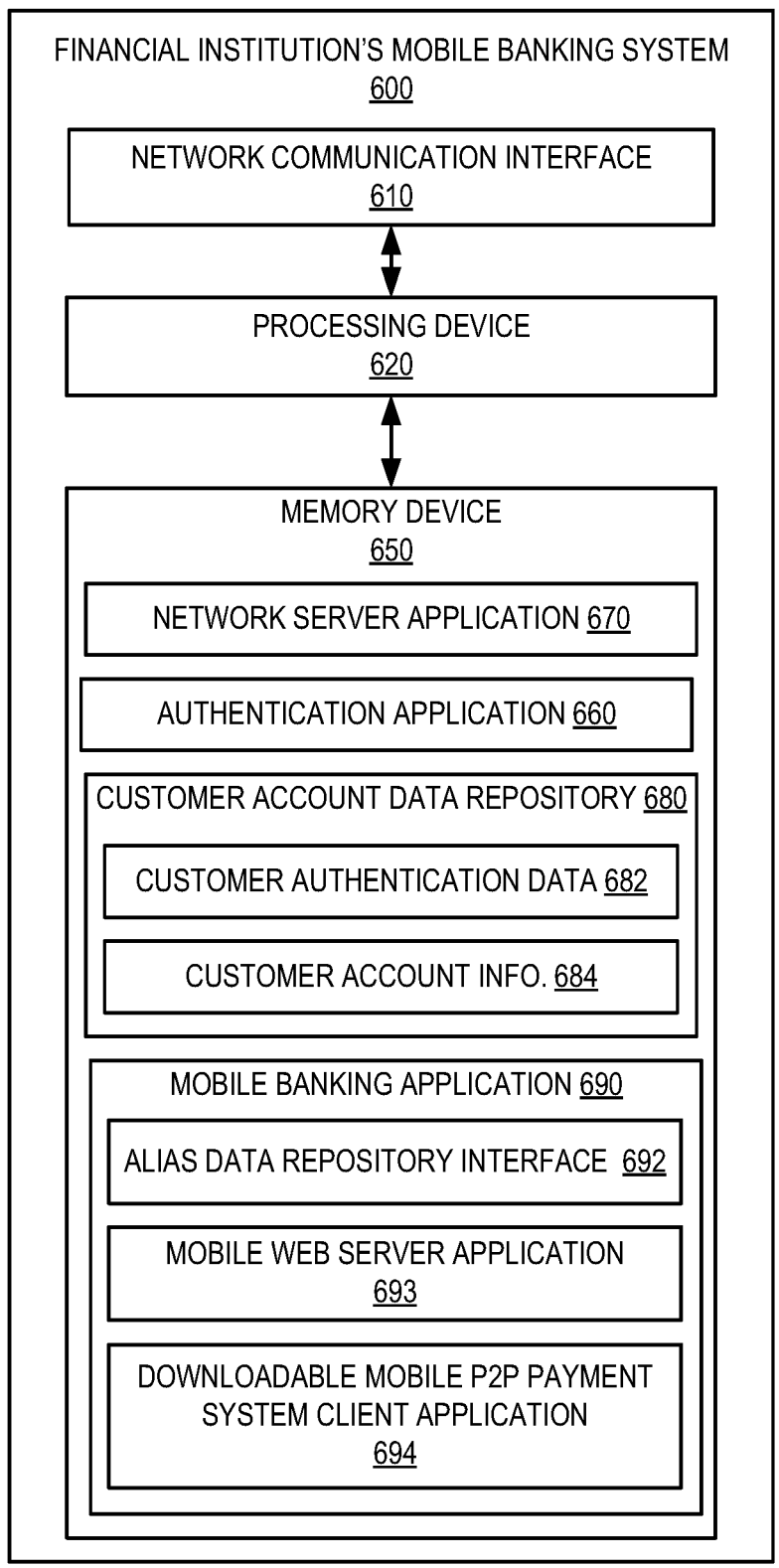
Figure 7:
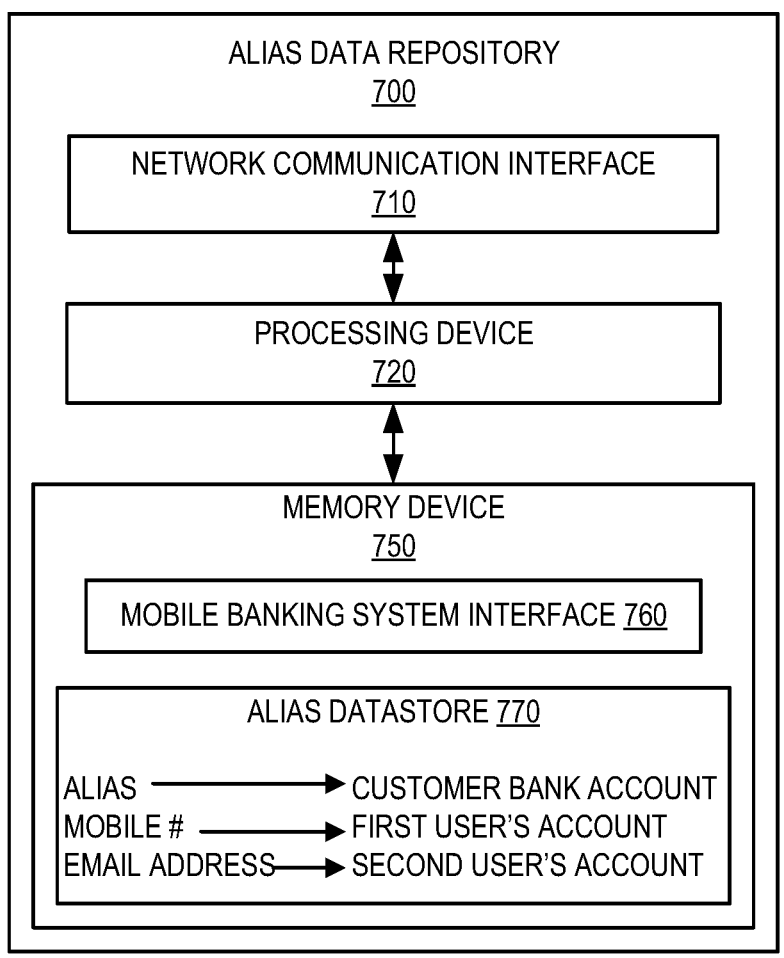
Figure 10B:
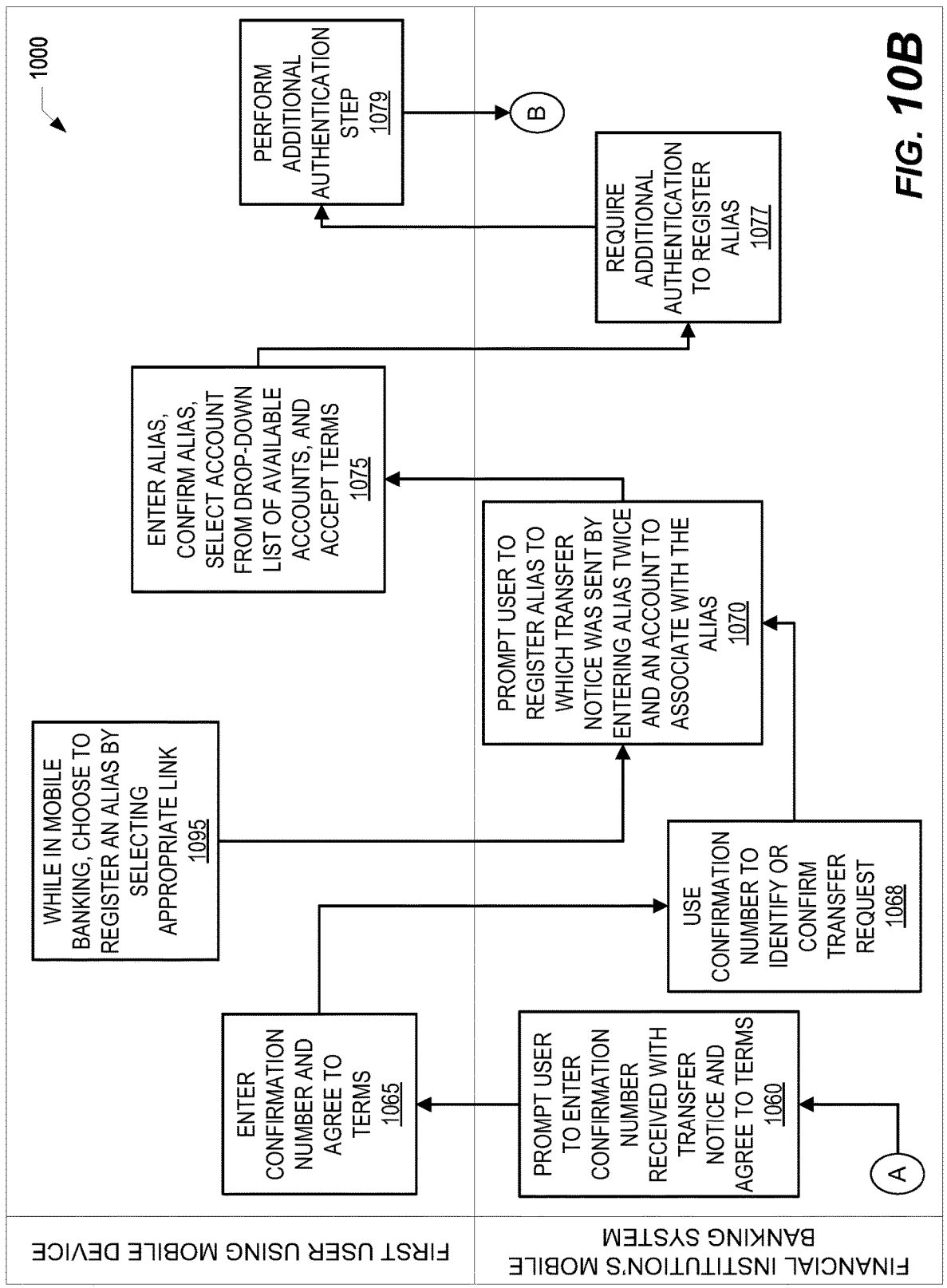
Figure 13A:
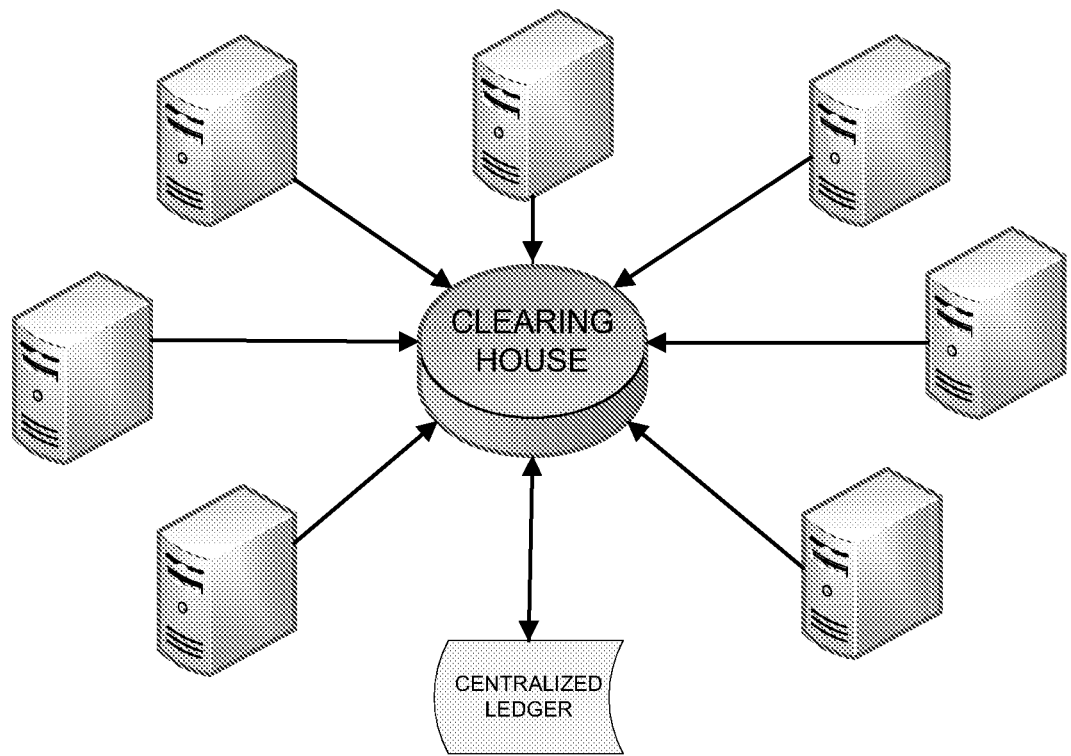
Figure 13B:
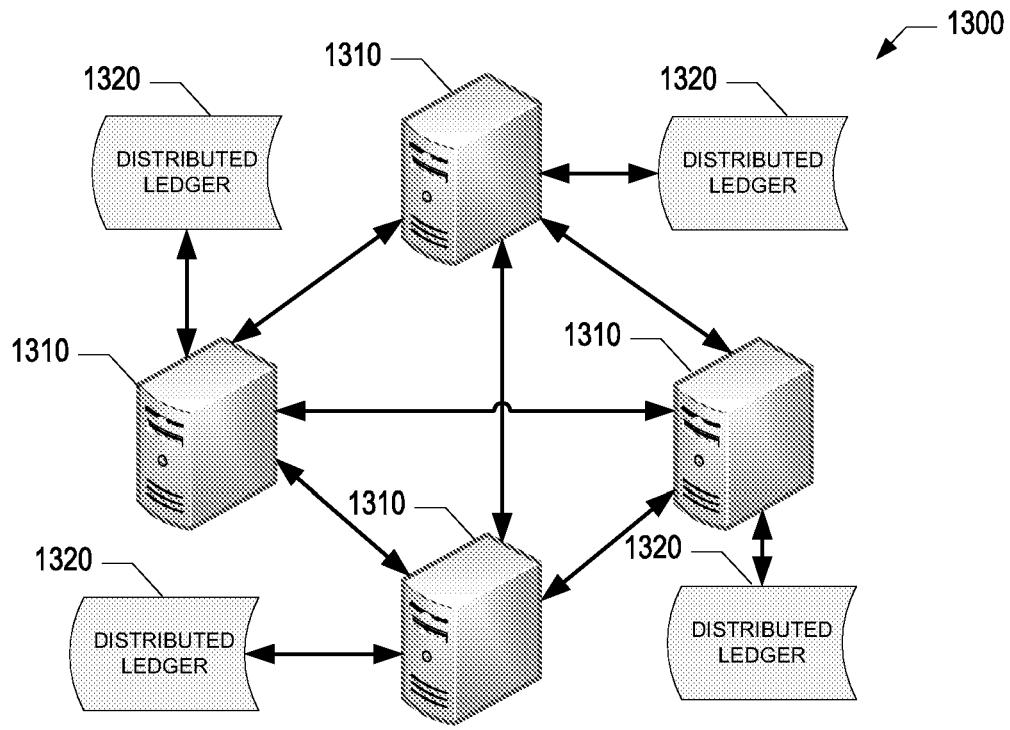
Figure 14:
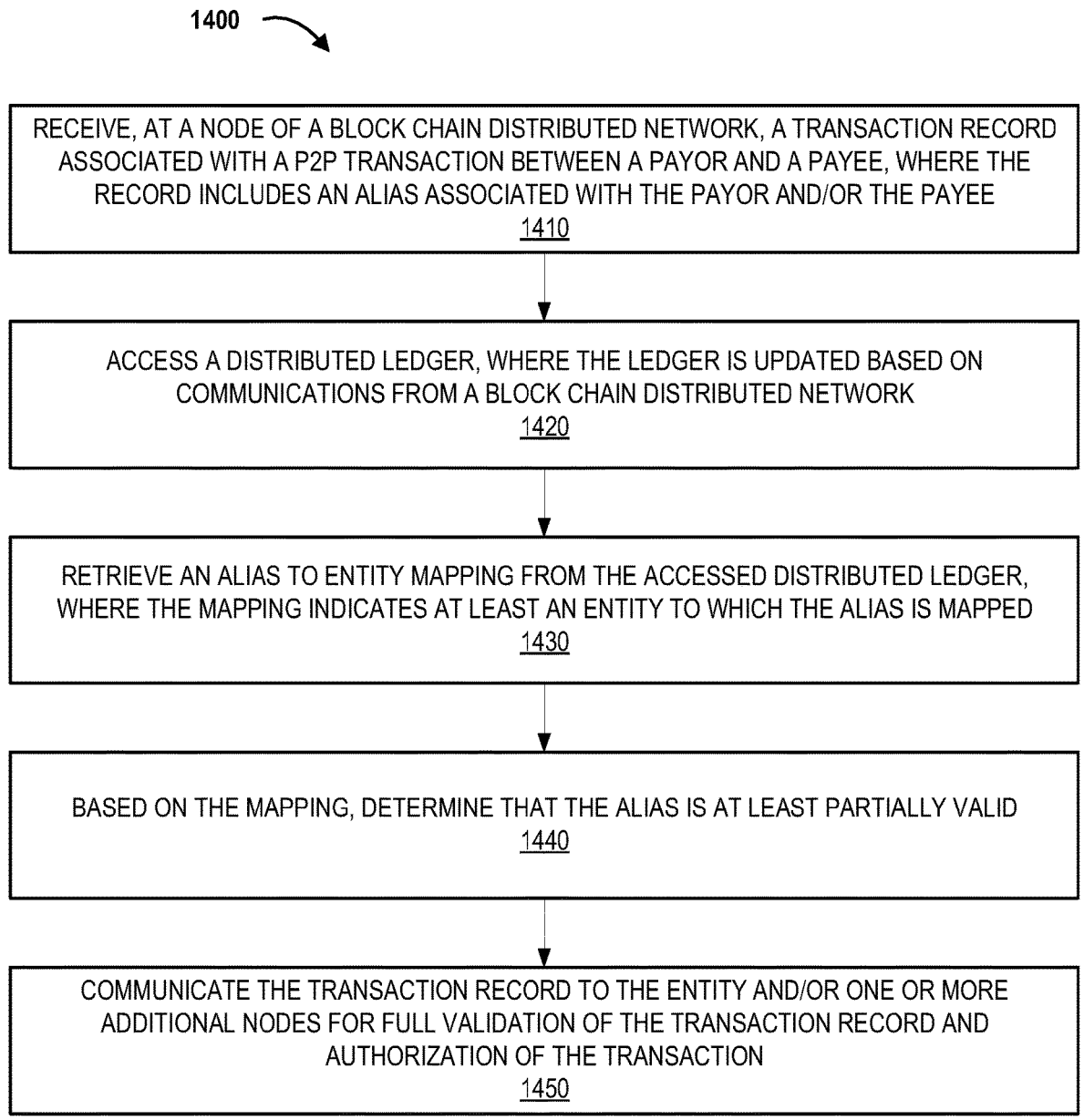
Figure 15:
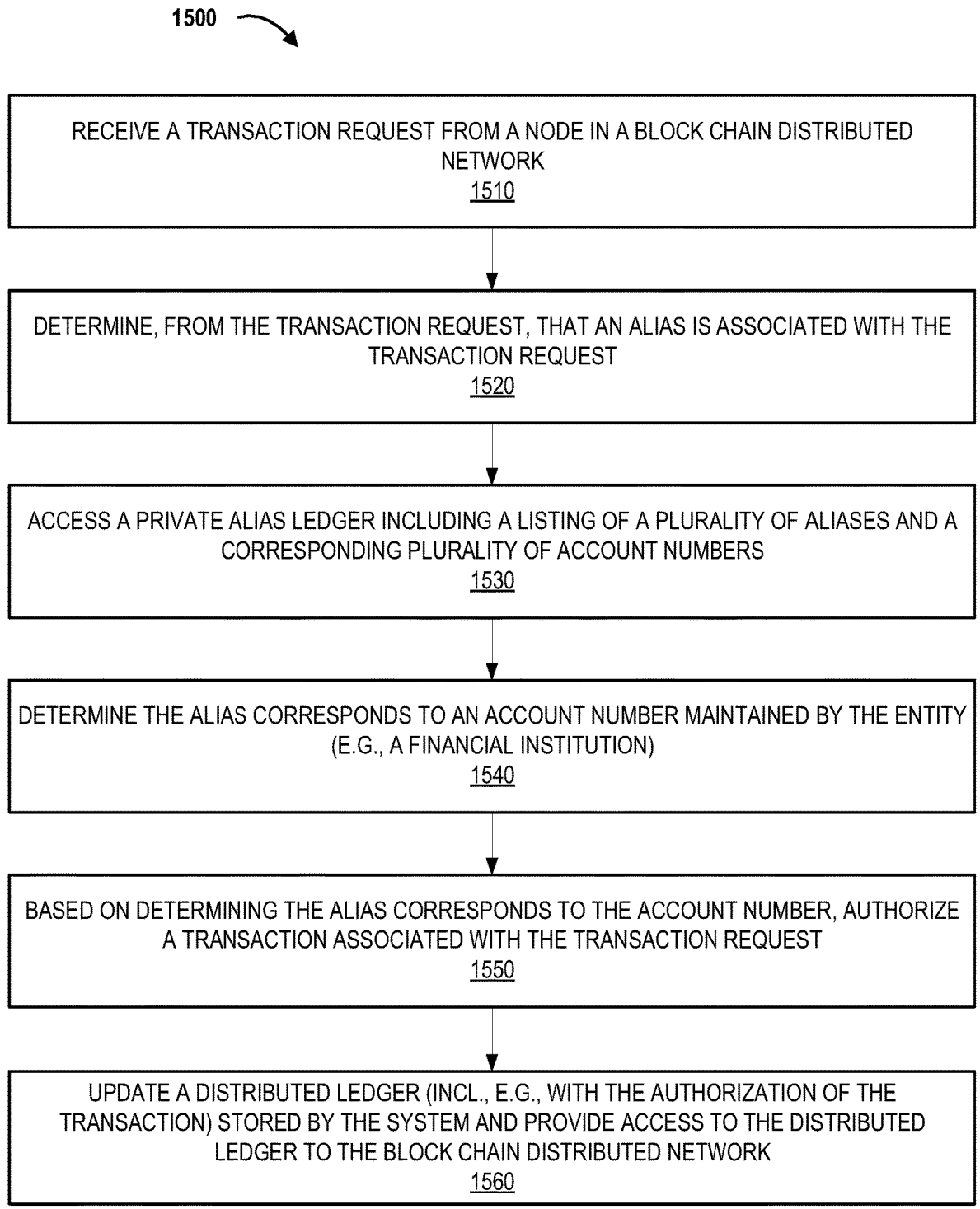
Figure 16:
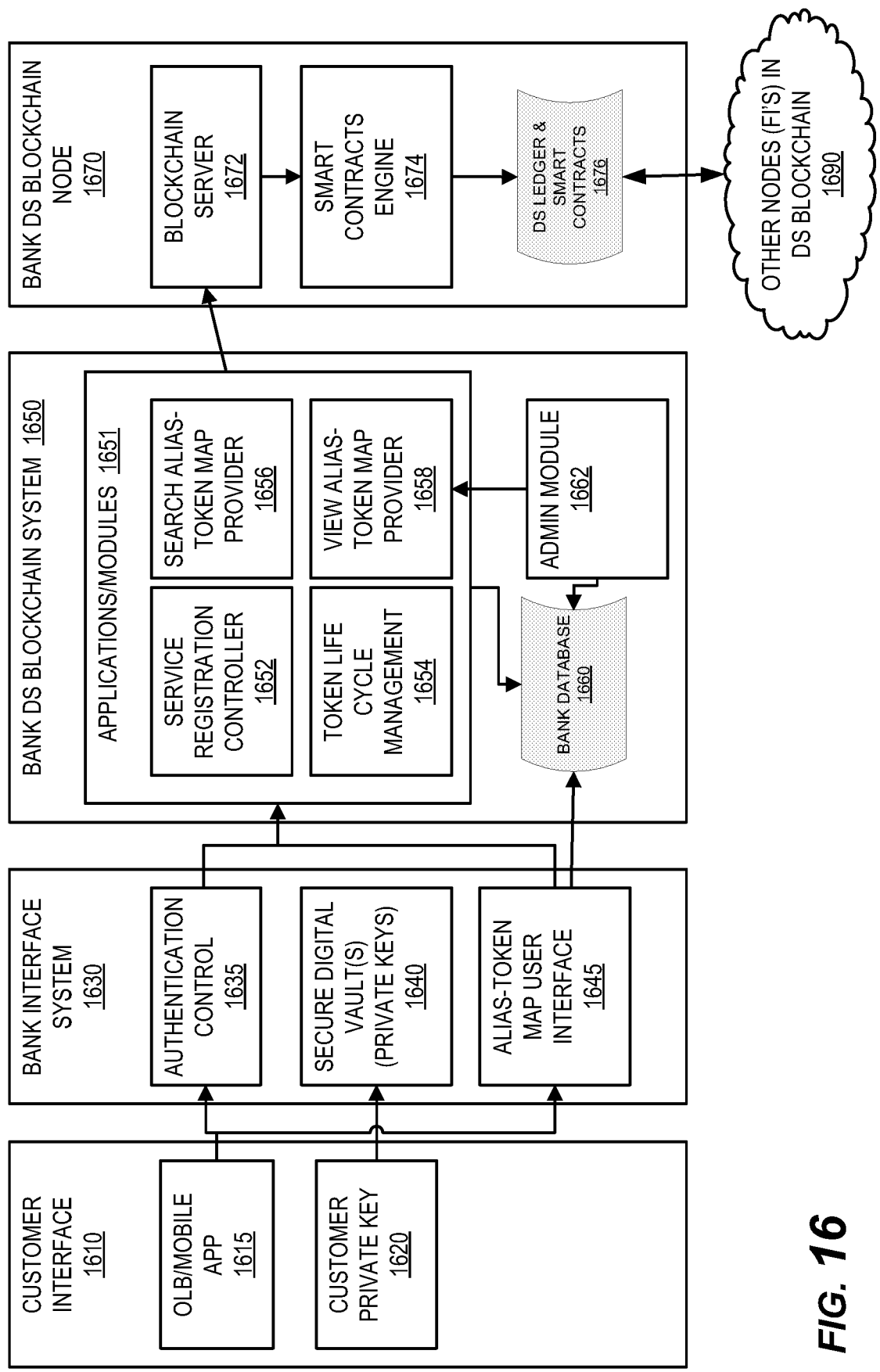
Figure 17:
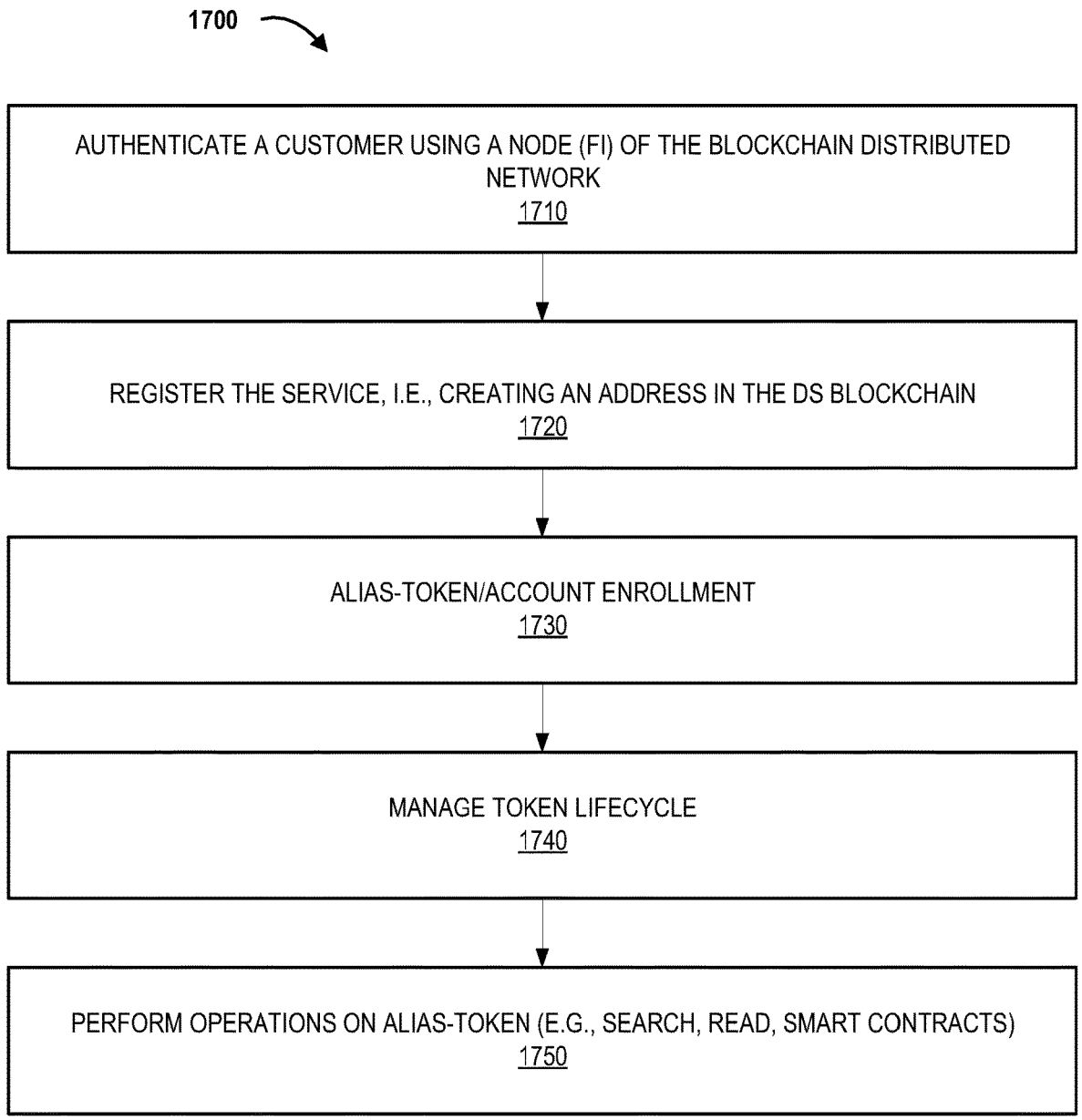

Having thus described embodiments of the invention in general terms, reference will now be made the accompanying drawings, wherein:

FIG. 1 is a combination flowchart and block diagram of a system and method for making P2P payments, in accordance with example embodiment of the invention;

FIG. 2 is a block diagram illustrating the various ways through which a customer may make P2P payments, in accordance with various embodiments of the invention;

FIG. 3 provides a block diagram illustrating a mobile banking P2P payment system and environment, in accordance with an embodiment of the invention;

FIG. 4 provides a block diagram illustrating the first user's mobile computing device of FIG. 3, in accordance with an embodiment of the invention;

FIG. 5 provides a block diagram illustrating the second user's personal computing device of FIG. 3, in accordance with an embodiment of the invention;

FIG. 6 provides a block diagram illustrating the financial institution's mobile banking system of FIG. 3, in accordance with an embodiment of the invention;

FIG. 7 provides a block diagram illustrating the alias data repository of FIG. 3, in accordance with an embodiment of the invention;

FIGS. 8A-8E provide flow charts illustrating a process for sending P2P payments, in accordance with embodiments of the invention;

FIGS. 9A-9G provide screenshots of a graphical user interface used during the process described in FIGS. 8A-8E, in accordance with embodiments of the invention;

FIGS. 10A-10C provide flow charts for receiving P2P payments, in accordance with embodiments of the invention, in accordance with embodiments of the invention;

FIG. 11 provides a flowchart for sending P2P payments via text message, in accordance with an embodiment of the invention;

FIGS. 12A-12D provide illustrations of a graphical user interface used during the process described in FIG. 11, in accordance with embodiments of the invention;

FIG. 13A is a diagram illustrating a centralized clearinghouse network configuration, in accordance with embodiments of the invention;

FIG. 13B is a diagram illustrating a decentralized block chain network configuration, in accordance with embodiments of the invention;

FIG. 14 is a flowchart illustrating a method for facilitating alias-based person-to-person payments using a block chain distributed network according to embodiments of the invention;

FIG. 15 is a flowchart illustrating a method for facilitating alias-based person-to-person payments using a block chain distributed network according to embodiments of the invention;

FIG. 16 is a combined diagram and flowchart illustrating a directory services (DS) block chain environment configuration according to embodiments of the invention; and FIG. 17 is a flowchart illustrating a method for mapping aliases according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention provide a system and method for mobile banking integrated person-to-person (P2P) payments. Embodiments of the invention allow customers of a financial entity to make payments directly from their accounts, whether their accounts be checking, savings, line of credit, credit card, and/or other accounts, to a payment or transfer recipient, including financial entity customers and non-financial entity customers, without having to share any confidential account information and without having to know account information for the intended payment recipient. Embodiments of the invention also allow customers and non-customers to receive payments from others directly into their financial institution accounts without requiring the customer to share account information with the payment sender. It should be noted that some embodiments of the invention allow a customer to make payments to and/or receive payments from a merchant in the same way that a customer can make payments to and/or receive payments from another person. As such, as used herein, the phrase person-to-person (P2P) is intended to include person-to-merchant (P2M), merchant-to-merchant (M2M), and merchant-to-person (M2P) unless specifically stated otherwise. Embodiments of the present invention permit a sender to send money from the sender's financial institution account directly to the recipient's financial institution account using the alias of the recipient without the involvement of an intermediary or a third party. This allows for greater security as no party apart from the sender, the recipient, and the bank is ever a part of the transfer.

Embodiments of the invention provide a system operatively connected with a block chain distributed network and for using the block chain distributed network for facilitating a person-to-person (P2P) alias-based payment. Embodiments receive a transaction record associated with a P2P transaction between a payor and a payee, wherein the transaction record comprises an alias associated with the payor and/or the payee; access a distributed ledger, wherein the distributed ledger is updated based on communications from a block chain distributed network; retrieve an alias-to-entity mapping from the accessed distributed ledger, wherein the alias-to-entity mapping indicates at least an entity to which the alias is mapped; and based on the mapping, determine that the alias is at least partially valid. In some cases, embodiments determine that the alias corresponds to an account number maintained by the entity in a private ledger; and authorize a transaction associated with the transaction request.

P2P Payments

FIG. 1 is a combination block diagram and flowchart providing an overview of a system and method 100 for making P2P payments, in accordance with one or more embodiments of the invention. A customer 101 with an eligible account 107, e.g., checking (demand deposit account or "DDA"), savings, money market, line of credit, credit card, etc., of a financial entity is be able to register and make use of this service. During the registration process, the customer 101 is able to set up an alias identifier (ID) 117 (or simply an "alias") that maps back to the customer's financial institution account. The alias 117 may be any unique identifier other than the customer's account number. Typically, the alias 117 is an identifier that friends, family, and/or other members of the public uniquely associate with the customer 101. For example, the alias 117 may be a mobile telephone number 119, an email address 121, a social networking ID 123, and/or the like. The embodiments of the invention described herein in the other figures generally permit the customer 101 to use either a mobile telephone number 119 or an email address 121 as the account alias, but it will be appreciated that, in view of this disclosure, other embodiments of the invention may allow use of other types of aliases.

The information provided by the customer 101 during registration of an alias may be verified to confirm that the customer 101 does have access to the mobile number 119, email address 121, social networking ID 123, or other alias 117 provided. For example, as described in greater detail below, the financial institution (or other entity that maintains a database of aliases and associates them with financial institution accounts) may send a communication to the customer 101 using the alias and require the customer 101 confirm access to the alias by responding to the notice in some way. For example, if the alias registered by the customer 101 is a mobile telephone number 119, the financial institution may send a text message to the mobile telephone number 119 with a code and then require that the customer 101 enter the code into a mobile banking or online banking application to confirm that the mobile telephone number is associated with the customer 101. Once the alias information is verified, then the alias is linked to one or more of the customer's financial institution accounts in a data repository maintained by the financial institution or some other entity that provides an alias registry service to the financial institution.

The customer 101 can also use embodiments of the invention to make payments to other entities, such as receiver 125, using an alias of the receiver 125. In some embodiments of the invention, the customer 101 is able to set preferences for accounts to be used for outgoing payments, and preselected account(s) for incoming payments. In some embodiments of the invention, the financial institution places limits (e.g., maximums and/or minimums) on how much money can be sent or received using P2P payment aliases, and such limits may be based on the sender, the receiver, whether the receiver is a customer of the financial institution or a partner financial institution, account history, credit ratings, customer status, whether the customer has registered the alias, and/or any other relevant information. In some embodiments, the customer 101 can also establish limits on P2P payments. For example, a customer 101 may want to set a maximum of $1000 for P2P payments where an alias is used for the recipient as opposed to an account number.

In some embodiments of the invention, the customer 101 may also have an option of opening a new P2P account 109 with the financial institution that the customer may use exclusively for making and/or receiving P2P payments. This financial entity P2P account 109 may be like any other account hosted at the financial entity and so money may be moved instantly into this account 109 through the regular mobile banking transfer process for moving money between a customer's accounts. This account 109 may be a type of checking account except that it may come with certain limitations, e.g., no checks, maximum balance limits, number of daily transactions or the like, and may be opened by customers by providing much less information as compared to a regular checking account. The financial entity may, at a minimum, require customers to provide certain information, such as name, address, date of birth, and social security number, in order to comply with Anti-Money Laundering (AML) regulations. Customers 101 of the financial entity may also have an option to set up P2P accounts 109 (i.e., sub-accounts) for minors 125, other dependents, or related entities. Customers 101 are able to access these accounts just like any of their other accounts. In addition, customers 101 are able to set up a mobile banking access ID for the minor 125 that the minor 125 may use to sign into mobile banking but have access only to the specific minor P2P account 109 set up for them. These P2P-specific accounts and sub-accounts are described in more detail in U.S. patent application Ser. No. 12/038,177 filed on Feb. 27, 2008 and entitled "Sub-Account Mechanism," which application was assigned to, or subject to an obligation to assign to, the same assignee of the present application at the time of filing of the present application and at the time of conception of the inventions described herein.

Referring again to FIG. 1, customers 101 of the financial entity are able to make payments to other people through any of a number of different methods. Payments may be made by a routing number/account number 113. Payments may also be made by providing an account number and an additional identifier, such as a zip code 115. If there is a match to an existing financial entity account in 127, then the funds are transferred instantly to that account. Else, an error message 129 may be generated.

In accordance with embodiments of the invention, payments may be made by providing an alias 117. In general, as described in greater detail below, the customer 101 initiates a P2P payment using an alias by communicating an alias 117 and an associated payment amount to the financial institution. The financial institution then accesses an alias database, or other type of data repository, to determine if the entered alias 117 has been registered by the alias holder and is, thereby, associated with a particular financial institution account. If the alias 117 does have a match to another customer in 131 or financial institution account of another customer 131, then the payment may be initiated to that person, as described in greater detail below. If there is no match, then either an error message 129 is generated or, if possible, the alias 117 may be used to contact the intended recipient 125 and allow this person to register the alias 117 and thereby associate the alias with a financial institution account. At any time, if outgoing payments or payment notifications are not received by a receiver (as represented by block 103), the payment may be canceled (as represented by block 105).

In some embodiments of the invention, an alias 117 may be associated with multiple financial institution accounts of the alias holder. In some such embodiments, the alias holder may be able to establish a default preselected account when registering the alias 117 or afterwards. Consequently, if a receiver 125 does have a preselected account for incoming payments in 137, then the funds may be transferred instantly to that account(s). If the receiver 125 has not set up a preselected account in 137 but the receiver 125 does have multiple accounts associated with the alias 117, then the funds may be moved to a principal settlement account 135 and the receiver 125 may see the payment as an incoming payment within mobile banking 133. The receiver 125 may then be able to use the mobile banking application to move the funds instantly to any of the receiver's other accounts. In other embodiments, however, each alias 117 is associated only with one financial institution account and, therefore, steps 137 and 135 are not needed and the payment is deposited directly into the one financial institution account associated with the alias 117.

As further illustrated in FIG. 1, the alias 117 may be a mobile telephone number 119 and, as such, payment may be made by the customer 101 providing a mobile phone number 119 (the mobile telephone number 119 being the mobile telephone number of the intended payment recipient 125) along with an associated payment amount. This operation may perform exactly as described above for the alias 117 if there is a match in 139 on the mobile number. If there is no match in 139, then a text message may be sent to the mobile number 119 provided (as represented by block 150). If the receiver 125 of the message is an existing financial institution customer (or, in some embodiments, if the receiver 125 is a customer of a partner financial institution), then that person may be allowed to sign into their online or mobile banking account, register the phone number as illustrated by block 151 (thereby associating the phone number with a financial institution account for P2P payment purposes), and then receive funds similar to the process described above for the alias 117. If the receiver 125 is not a financial entity customer with an account eligible for receiving funds, then the receiver 125 may be given the option to sign up (as represented by block 152) for a financial institution account 141 or 143 at the financial institution or return funds to the sender (as represented by block 153).

As further illustrated in FIG. 1, the alias 117 may be an email address 121 and, as such, payment may be made by the customer 101 providing an email address 121 (the email address 121 being an email address of the intended payment recipient 125) along with an associated payment amount. This operation may perform exactly as described above for a mobile number 119 except that the notification message (with the registration or account opening option if appropriate) is sent to the email address 121 provided.

In some embodiments of the invention, payment may be made by providing a social networking ID 123, such as a unique ID associated with the receiver 125 on a particular social networking Internet site. In such a situation, the process operates in the same way as described above for mobile phone number 119 and email address 121 except the social networking platform may be used to notify the receiver based on the social networking ID 123 provided.

In all cases described above, if the receiver 125 is already a customer of the financial institution or a partner financial institution and has already registered the alias 117 provided by the sender 101, a text message, email, mobile banking notice, online banking notice, or other type of message may be sent to receiver 125 based on the alias 117 entered by the sender 101 or irrespective of information entered by sender if there is other contact information found in the receiver's data set, the notification notifying the receiver 125 of the payment. In some embodiments, the receiver 125 may be allowed to reject or re-route the payment. In some embodiments of the invention, the sender 101 is permitted to include a note to the recipient 125 along with the payment, such as a note explaining to the recipient what the purpose of the payment is for.

FIG. 2 is a block diagram illustrating the various ways through which a customer may make P2P payments in accordance with various embodiments of the invention. As illustrated, in some embodiments of the invention, a customer 201 who is signed up for the P2P payment service has the option to initiate P2P payments from a DDA, savings, line of credit, and/or credit card account 203 of the financial entity (and/or from a P2P-specific account 205 with the financial entity) through the financial entity's mobile banking website 209 or a mobile banking handset application 207 by providing any of the above-described alias information, e.g., phone number, email address, social networking ID, and/or other alias, along with a payment amount. In some embodiments of the invention, customers can alternatively or additionally initiate payments by sending a text message 211 to the financial entity, the text message including the receiver's phone number, email address, social networking ID, nickname, or other alias. In some embodiments, customers can alternatively or additionally use the financial institution's mobile banking website 212 to initiate a payment using an alias, as described in greater detail below with respect to FIGS. 3-12C. Whether via a mobile banking handset application 207, mobile website 209, short message service 211, or mobile banking website 212, a receiver 217 associated with the financial entity may receive funds at the receiver's financial institution account (e.g., DDA, savings, or credit account 213 or P2P-specific account 215). A receiver 221 not associated with the financial entity 221 may receive funds at the receiver's financial institution account 219 at another partner financial institution if the account is registered and associated with the alias and/or the receiver 221 may be prompted to register for the service and/or open an account with the financial institution in order to receive the payment from the sender 201.

It should be appreciated that embodiments of the invention described above permit an entity to send money to another entity even if the sending entity does not know any account information for the recipient entity and only knows a mobile telephone number or email address of the recipient entity. This can also result in better protection of personal account information. It should also be appreciated that some embodiments of the invention create a viral registration and/or account opening system that allows for customers of a financial institution send payments to anyone outside the financial entity using an alias. In such embodiments, the non-customers are contacted using the alias and they are allowed to quickly open and/or register an account with the financial institution in order to receive the funds from the sender.

As described above, FIGS. 1 and 2 provide an overview of the alias-type P2P payment system and process of embodiments of the invention. FIGS. 3-12C, described below, provide a more detailed description of some systems and methods of implementing embodiments the invention in a mobile banking environment. Specifically, embodiments of the invention described below disclose a user-friendly mobile banking interface and associated method that may be used by a financial institution to: (1) allow customers to send P2P payments using an alias of the intended recipient; (2) allow customers to register a customer's aliases and then receive alias-type P2P payments from others; and (3) allow customers to easily manage their P2P payments.

Mobile Banking P2P Payment System and Environment

FIG. 3 provides a block diagram illustrating a mobile banking P2P payment system and environment 300, in accordance with an embodiment of the invention. As illustrated in FIG. 3, the P2P payment environment 100 includes a first user 310 and a second user 320 where a first user wants to send funds to a second user. A user of the system may be a person, but may also be a business (e.g., a merchant) or any other entity capable of sending or receiving funds.

The environment 300 also includes a mobile device 400 and a personal computing device 500 for the first user 310 and second user 320, respectively. The personal computing device 500 may be any device that employs a processor and memory and can perform computing functions, such as a personal computer or a mobile device. As used herein, a "mobile device" 400 is any mobile communication device, such as a cellular telecommunications device (i.e., a cell phone or mobile phone), personal digital assistant (PDA), a mobile Internet accessing device, or other mobile device.

The mobile device 400 and the personal computing device 500 are configured to communicate over a network 350 with a financial institution's mobile banking system 600 and, in some cases, one or more other financial institution banking systems 370. The first user's mobile device 400, the second user's personal computing device 500, the financial institution's mobile banking system 600, an alias data repository 700, and any other participating financial institution's banking systems 370 are each described in greater detail below with reference to FIGS. 4-7. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352.

In general, a mobile device 400 is configured to connect with the network 300 to log the first user 310 into a mobile banking system 600. The mobile banking system 600 involves authentication of a first user in order to access the first user's account on the mobile banking system 600. For example, the mobile banking system 600 is a system where a first user 310 logs into his/her account such that the first user 310 or other entity can access data that is associated with the first user 310. For example, in one embodiment of the invention, the mobile system 600 is a mobile banking system maintained by a financial institution. In such an embodiment, the first user 310 can use the mobile device 400 to log into the mobile banking system to access the first user's mobile banking account. Logging into the mobile banking system 300 generally requires that the first user 310 authenticate his/her identity using a user name, a passcode, a cookie, a biometric identifier, a private key, a token, and/or another authentication mechanism that is provided by the first user 310 to the mobile banking system 600 via the mobile device 400.

The financial institution's mobile banking system 600 is in network communication with other devices, such as other financial institutions' transaction/banking systems 370, an alias data repository 700, and a personal computing device 500 that is configured to communicate with the network 350 to log a second user 320 into the mobile banking system 600. In one embodiment, the invention may provide an application download server such that software applications that support the mobile banking system 600 can be downloaded to the mobile device 400.

In some embodiments of the invention, the application download server is configured to be controlled and managed by one or more third-party data providers (not shown in FIG. 3) over the network 350. In other embodiments, the application download server is configured to be controlled and managed over the network 350 by the same entity that maintains the mobile banking system 600.

In some embodiments of the invention, the alias data repository 700 is configured to be controlled and managed by one or more third-party data providers (not shown) over the network 350. In other embodiments, the alias data repository 700 is configured to be controlled and managed over the network 350 by the same entity that maintains the financial institution's mobile banking system 600. In other embodiments, the alias data repository 700 is configured to be controlled and managed over the network 350 by the financial institution implementing the mobile payment system of the present invention. In still other embodiments, the alias data repository 700 is a part of the mobile banking system 600.

FIG. 4 provides a block diagram illustrating the consumer mobile device 400 of FIG. 3 in more detail, in accordance with embodiments of the invention. In one embodiment of the invention, the mobile device 400 is a mobile telephone. However, it should be understood, however, that a mobile telephone is merely illustrative of one type of mobile device 400 that may benefit from, employ, or otherwise be involved with embodiments of the present invention and, therefore, should not be taken to limit the scope of embodiments of the present invention. Other types of mobile devices 400 may include portable digital assistants (PDAs), pagers, mobile televisions, entertainment devices, laptop computers, cameras, video recorders, audio/video player, radio, GPS devices, or any combination of the aforementioned.

The mobile device 400 generally includes a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 350. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 352. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The network interface 460 may also include a payment network interface 470. The payment network interface 470 may include software, such as encryption software, and hardware, such as a modem, for communicating information to and/or from one or more devices on a network 350. For example, the mobile device 400 may be configured so that it can be used as a credit or debit card by, for example, wirelessly communicating account numbers or other authentication information to a terminal of the network 350.

As described above, the mobile device 400 has a user interface that is, like other user interfaces described herein, made up of user output devices 436 and/or user input devices 440. The user output devices 436 include a display 230 (e.g., a liquid crystal display or the like) and a speaker 432 or other audio device, which are operatively coupled to the processor 410. The user input devices 440, which allow the mobile device 400 to receive data from a user such as the first user 310, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The mobile device 400 may also include a positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a merchant or other location to determine that the consumer mobile device 400 is located proximate these known devices.

The mobile device 400 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the mobile device 400 described herein. For example, the memory 420 may include such applications as a conventional web browser application 422 and/or a mobile P2P payment system client application 421. These applications also typically provide a graphical user interface (GUI) on the display 230 that allows the first user 310 to communicate with the consumer mobile device 400, the mobile banking system 600, and/or other devices or systems. In one embodiment of the invention, when the first user 310 decides to enroll in the mobile banking program, the first user 310 downloads or otherwise obtains the mobile banking system client application from the mobile banking system 600 or from a distinct application server. In other embodiments of the invention, the first user 310 interacts with the mobile banking system 600 via the web browser application 422 in addition to, or instead of, the mobile P2P payment system client application 421.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information, etc.

Referring now to FIG. 5, the personal computing device 500 associated with the second user 320 also includes various features, such as a network communication interface 510, a processing device 520, a user interface 530, and a memory device 550. The network communication interface 510 includes a device that allows the personal computing device 500 to communicate over the network 350 (shown in FIG. 3). In one embodiment of the invention, a network browsing application 555 provides for a user to establish network communication with a mobile banking system 600 (shown in FIG. 3) for the purpose of initiating mobile payment and/or registering an account and/or alias with the mobile payment system and/or receiving mobile payment, in accordance with embodiments of the invention.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a customer to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from the first user 310 or second user 320 or output data to the first user 310 or second user 320. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

FIG. 6 provides a block diagram illustrating the mobile banking system 600 in greater detail, in accordance with an embodiment of the invention. As illustrated in FIG. 6, in one embodiment of the invention, the mobile banking system 600 includes a processing device 620 operatively coupled to a network communication interface 610 and a memory device 650. In certain embodiments, the mobile banking system 600 is operated by a first entity, such as a financial institution, while in other embodiments, the mobile banking system 600 is operated by an entity other than a financial institution.

It should be understood that the memory device 650 may include one or more databases or other data structures/repositories. The memory device 650 also includes computer-executable program code that instructs the processing device 620 to operate the network communication interface 610 to perform certain communication functions of the mobile banking system 600 described herein. For example, in one embodiment of the mobile banking system 600, the memory device 650 includes, but is not limited to, a network server application 670, an authentication application 660, a customer account data repository 680 which includes customer authentication data 680 and customer account information 684, a mobile banking application 690 which includes an alias data repository interface 692, a mobile web server application 693, a downloadable mobile P2P payment system client application 694 and other computer-executable instructions or other data. The computer-executable program code of the network server application 670, the authentication application 660, or the mobile banking application 690 may instruct the processing device 620 to perform certain logic, data-processing, and data-storing functions of the mobile banking system 600 described herein, as well as communication functions of the mobile banking system 600.

In one embodiment, the customer account data repository 680 includes customer authentication data 682 and customer account information 684. The network server application 670, the authentication application 660, and the mobile banking application 690 are configured to implement customer account information 684, the customer authentication data 682, and the alias data repository interface 692 when authenticating the customer 101 (or the first user 310) to the mobile banking system 600. The customer account information 684, the customer authentication data 682, and the alias data repository interface 692 are discussed in more detail in a later section.

As used herein, a "communication interface" generally includes a modem, server, transceiver, and/or other device for communicating with other devices on a network, and/or a user interface for communicating with one or more customers. Referring again to FIG. 6, the network communication interface 610 is a communication interface having one or more communication devices configured to communicate with one or more other devices on the network 350, such as the mobile device 400, the personal computing device 500, the mobile banking system 600, the other financial institution banking systems 370, and the alias data repository 700. The processing device 620 is configured to use the network communication interface 610 to transmit and/or receive data and/or commands to and/or from the other devices connected to the network 350.

FIG. 7 provides a block diagram illustrating an alias data repository 700, in accordance with an embodiment of the invention. In one embodiment of the invention, the alias data repository 700 is operated by a second entity that is a different or separate entity from the first entity (e.g., the financial institution) that, in one embodiment of the invention, implements the mobile banking system 600. In one embodiment, the alias data repository 700 could be part of the mobile banking system 600. In another embodiment, the alias data repository 700 is a distinct entity from the mobile banking system 600. As illustrated in FIG. 7, the alias data repository 700 generally includes, but is not limited to, a network communication interface 710, a processing device 720, and a memory device 750. The processing device 720 is operatively coupled to the network communication interface 710 and the memory device 750. In one embodiment of the alias data repository 700, the memory device 750 stores, but is not limited to, a mobile banking system interface 760 and an alias data store 770. The alias data store 770 stores data including, but not limited to, an alias for the customer's financial institution account, mobile number or email address for the first user's 310 account, and a mobile number and/or email address for the second user's 320 account. In one embodiment of the invention, both the mobile banking system interface 760 and the alias data store 770 may associate with applications having computer-executable program code that instructs the processing device 720 to operate the network communication interface 710 to perform certain communication functions involving the alias data store 770 described herein. In one embodiment, the computer-executable program code of an application associated with the alias data store 770 may also instruct the processing device 720 to perform certain logic, data processing, and data storing functions of the application associated with the alias data store 770 described herein. An alias, as defined in this invention, is not limited to just a mobile device number or an email address.

The network communication interface 710 is a communication interface having one or more communication devices configured to communicate with one or more other devices on the network 350. The processing device 720 is configured to use the network communication interface 710 to receive information from and/or provide information and commands to a mobile device 400, a personal computing device 500, other financial institution banking systems 370, the alias data repository 700, the mobile banking system 600 and/or other devices via the network 350. In some embodiments, the processing device 720 also uses the network communication interface 710 to access other devices on the network 350, such as one or more web servers of one or more third-party data providers. In some embodiments, one or more of the devices described herein may be operated by a second entity so that the third-party controls the various functions involving the alias data repository 700. For example, in one embodiment of the invention, although the mobile banking system 600 is operated by a first entity (e.g., a financial institution), a second entity operates the alias data repository 700 that stores the alias details for the customer's financial institution accounts and other information about customers.

As described above, the processing device 720 is configured to use the network communication interface 710 to gather data from the various data sources. The processing device 720 stores the data that it receives in the memory device 750. In this regard, in one embodiment of the invention, the memory device 750 includes datastores that include, for example: (1) aliases for customer financial institution account numbers and routing information, (2) information about sending and receiving users' mobile device numbers, email addresses, or other contact information, which may have been received from the mobile banking system 600; (3) a list of customer IDs or authentication data received from the mobile banking system 600; and/or (4) customer credentials (e.g., a customer ID) received from the customer's mobile device 400 or received from the mobile banking system 600 in response to the customer accessing the mobile banking system 600.

In one embodiment of the invention, an application server is provided to support various supporting systems on the network 350, including the wireless telephone network 352. The application server includes a network communication interface, a processing device, and a memory device. The network communication interface and the processing device are similar to the previously described network communication interface 610 and the processing device 620 previously described. For example, the processing device is operatively coupled to the network communication interface and the memory device. In one embodiment of the application server, the memory device includes a network browsing application having computer-executable program code that instructs the processing device to operate the network communication interface to perform certain communication functions of the application download server described herein.

As discussed above, in one embodiment of the invention, an application download server might be provided. The application download server may include a network communication interface, a processing device, and a memory device. The network communication interface and processing device are similar to the previously described network communication interface 610 and the processing device 620 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified customer's mobile device or personal computing device.

Mobile Banking P2P Payment Send Process and Interface

FIGS. 8A-8E provide flow charts illustrating a process 800 for sending P2P payments via alias using a mobile device, in accordance with an embodiment of the invention. FIGS. 8A-8E illustrate the flow chart in terms of "swim lanes" associated with entities which may perform the operations in each respective swim lane. The entities illustrated in the exemplary Figures are a financial institution's mobile banking system, a first user using a mobile device, an alias data repository, and a second user using a second personal computing device. However, it should be noted that other entities could also be involved and some embodiments of the invention may not be limited to the four entities illustrated in FIGS. 8A-8E. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

Figure 8A:
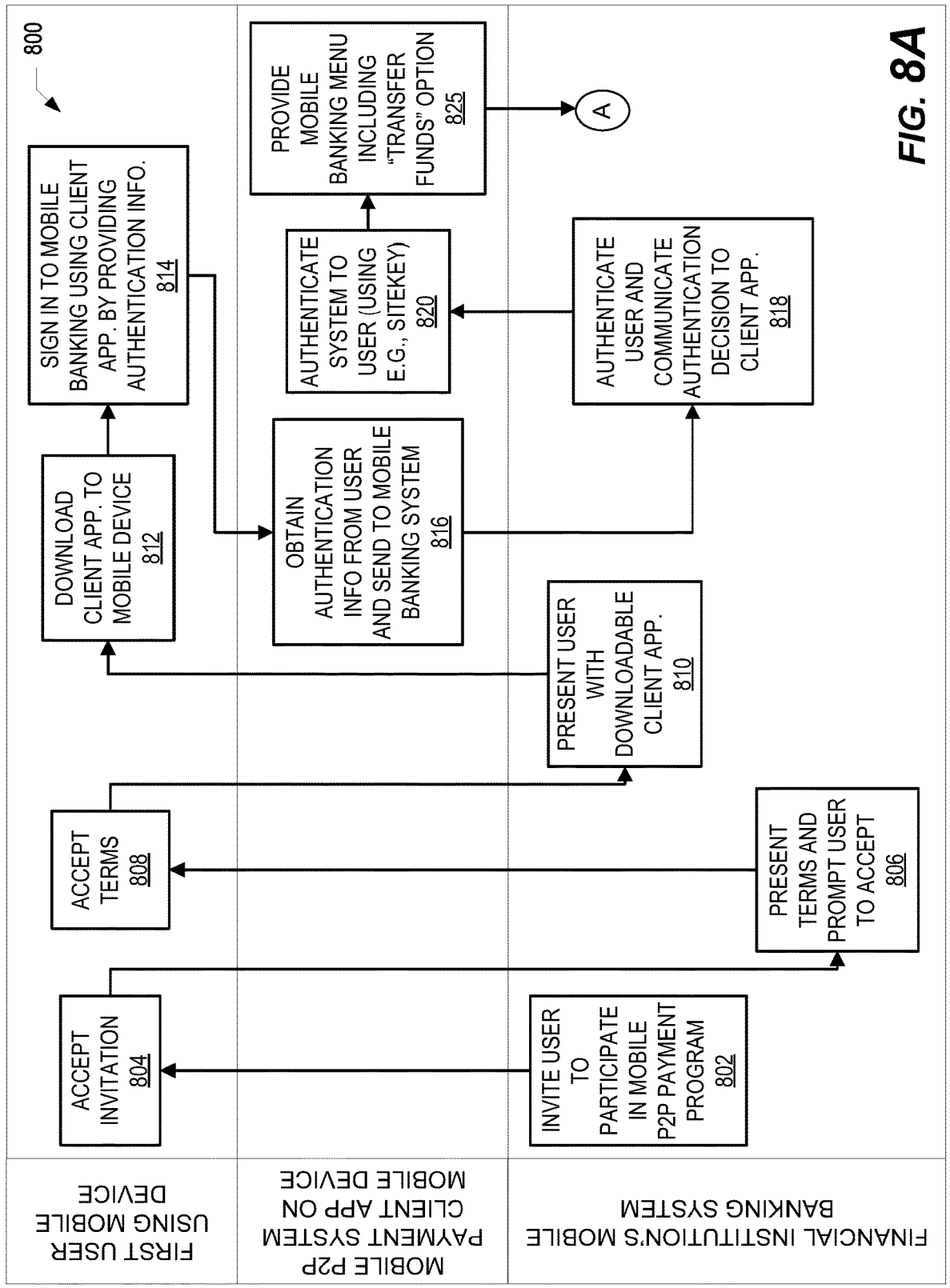

The process begins at block 802 of FIG. 8A where a financial institution's mobile banking system 600 invites a user to participate in a mobile P2P payment program. In one embodiment, the mobile banking system 600 only invites certain existing mobile banking users who fit certain criteria, including, but not limited to, pre-determined minimum account balance, number of years since the user first opened an account, etc.

The process then moves to block 804 where the first user 310 using mobile computing device 400 accepts the invitation.

The process then moves to block 806 of FIG. 8A where the mobile banking system 600 presents to the first user the terms of the mobile P2P transfer feature that will govern the transfer of funds. In one embodiment, the first user can read the terms on the first user's mobile device 400, whereas in another embodiment, the first user can only read the terms on a personal computing device.

The process then moves to block 808 of FIG. 8A. The first user accepts the terms of the P2P service by activating an appropriate button on the mobile webpage.

The process then moves to block 810 of FIG. 8A where the mobile banking system 600 presents the first user with a downloadable client application.

The process then moves to block 812 of FIG. 8A where the first user 310 downloads the client application to the first user's mobile device 400.

The process then moves to block 814 of FIG. 8A where the first user 310 signs in to the mobile banking system 600 using the client application by providing appropriate authentication information.

The process then moves to block 816 of FIG. 8A where the mobile P2P payment system client application 694 on the mobile device 400 obtains authentication information from the first user and sends the authentication information to the mobile banking system 600.

The process then moves to block 818 of FIG. 8A where the mobile banking system 600 authenticates the first user 310 and communicates the authentication decision to the mobile P2P payment system client application 694.

The process then moves to block 820 of FIG. 8A where the mobile P2P payment system client application 694 authenticates the system to the first user 310. In one embodiment of the invention, the authentication is achieved using "SiteKey," which is a web-based security system that provides mutual authentication between end-users and websites. In a challenge-response process of SiteKey, the first user has to identify himself or herself on a secure website by entering a username. Subsequently, the website authenticates itself to the first user by displaying an image and an accompanying phrase that the first user had previously configured. If the user recognizes this image and the accompanying phrase, the first user can authenticate himself or herself to the website by entering a password. Other embodiments of the invention may use other authentication systems.

Figure 9A:
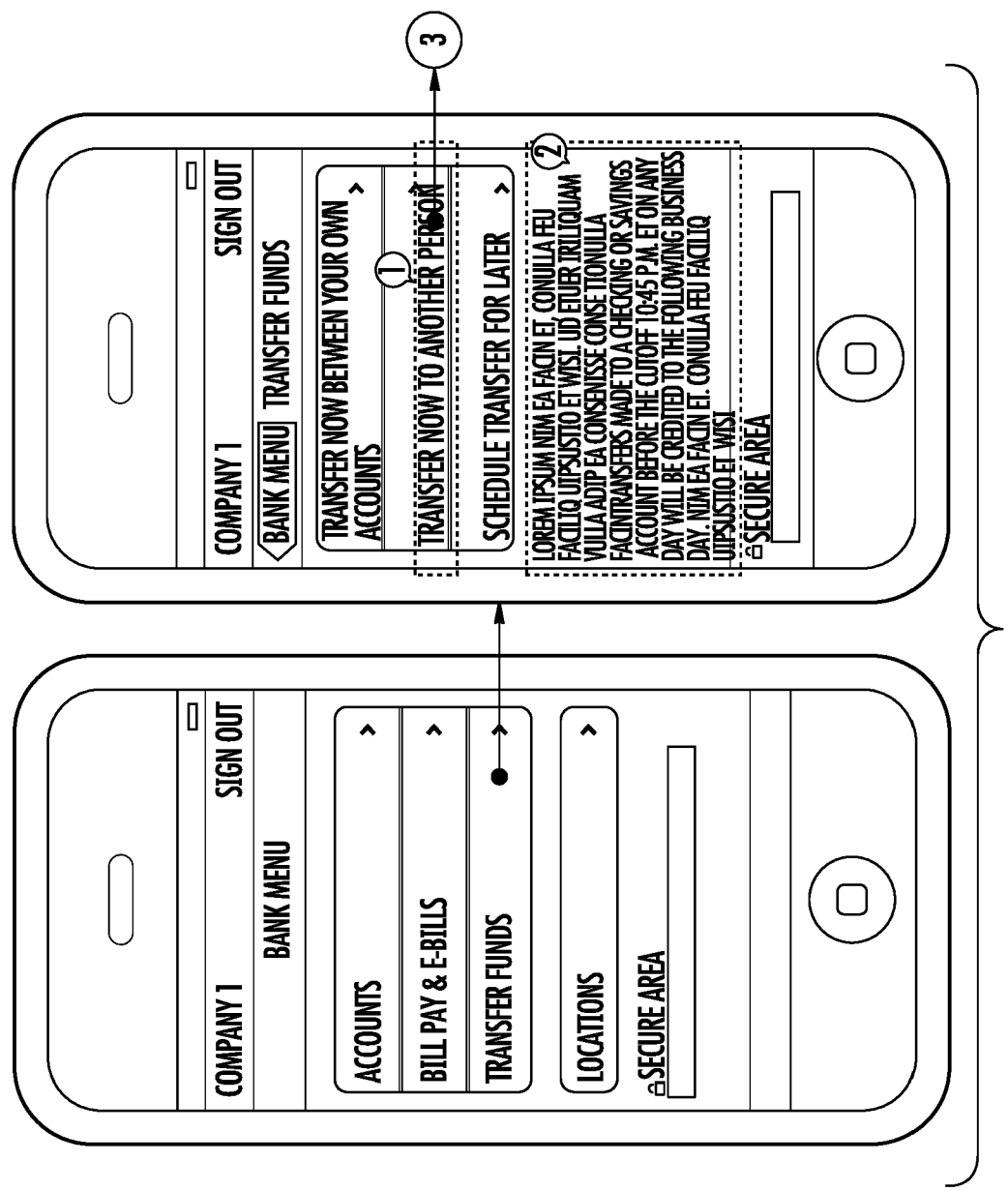

The process then moves to block 825 of FIG. 8A where the mobile P2P payment system client application 694 provides a mobile banking menu including an option to transfer funds. A screenshot is illustrated in FIG. 9A(1). As shown in FIG. 9A(1), the mobile P2P payment system client application 694 displays a bank menu page on which the first user can navigate to an accounts function, a bill-paying function, a transfer funds function, or a location function. Further, the mobile P2P payment system client application 694 indicates to the first user that the first user is in a secure area of the mobile banking system 600. The bank menu page also has a text area where error messages are displayed. The mobile P2P payment system client application 694 always allows users to sign out from their accounts on any mobile webpage by providing an appropriate hyperlink or button.

Figure 8B:
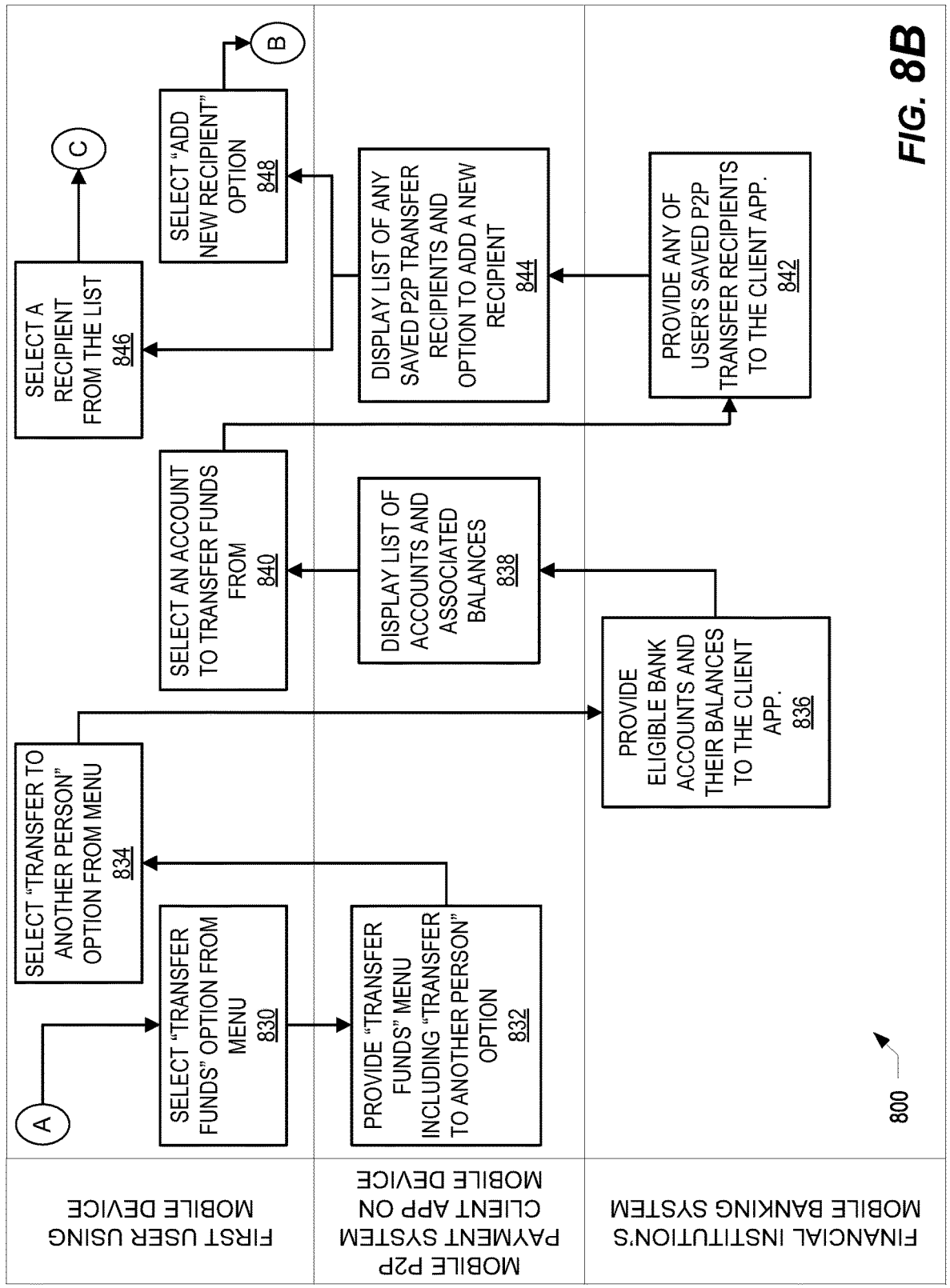

The process then moves to block 830 of FIG. 8B where the first user 310 selects the transfer funds option from the menu displayed in FIG. 9A(1).

The process then moves to block 832 of FIG. 8B where the mobile P2P payment system client application 694 provides a transfer funds menu that includes an option to transfer to another person. This can be seen in FIG. 9A(2), where based on the user activating the transfer funds function on the screenshot of FIG. 9A(1), the mobile P2P payment system client application 694 displays three options for the first user including an option to transfer between the first user's own accounts, an option to transfer to another person, and an option to schedule a transfer for later execution. In one embodiment, each of these three options are hyperlinks that are linked to mobile payment system 600. The mobile P2P payment system client application 694 indicates to the first user using a static textbox that any transfers made to an account before a cutoff time on any day will be credited to that account; otherwise the transfer will credited on the following business day.

The process then moves to block 834 of FIG. 8B where the first user 310 selects the option to transfer to another person from the transfer funds menu.

The process then moves to block 836 of FIG. 8B where the mobile banking system 600 provides eligible financial institution accounts and their balances to the mobile P2P payment system client application 694.

Figure 9B:
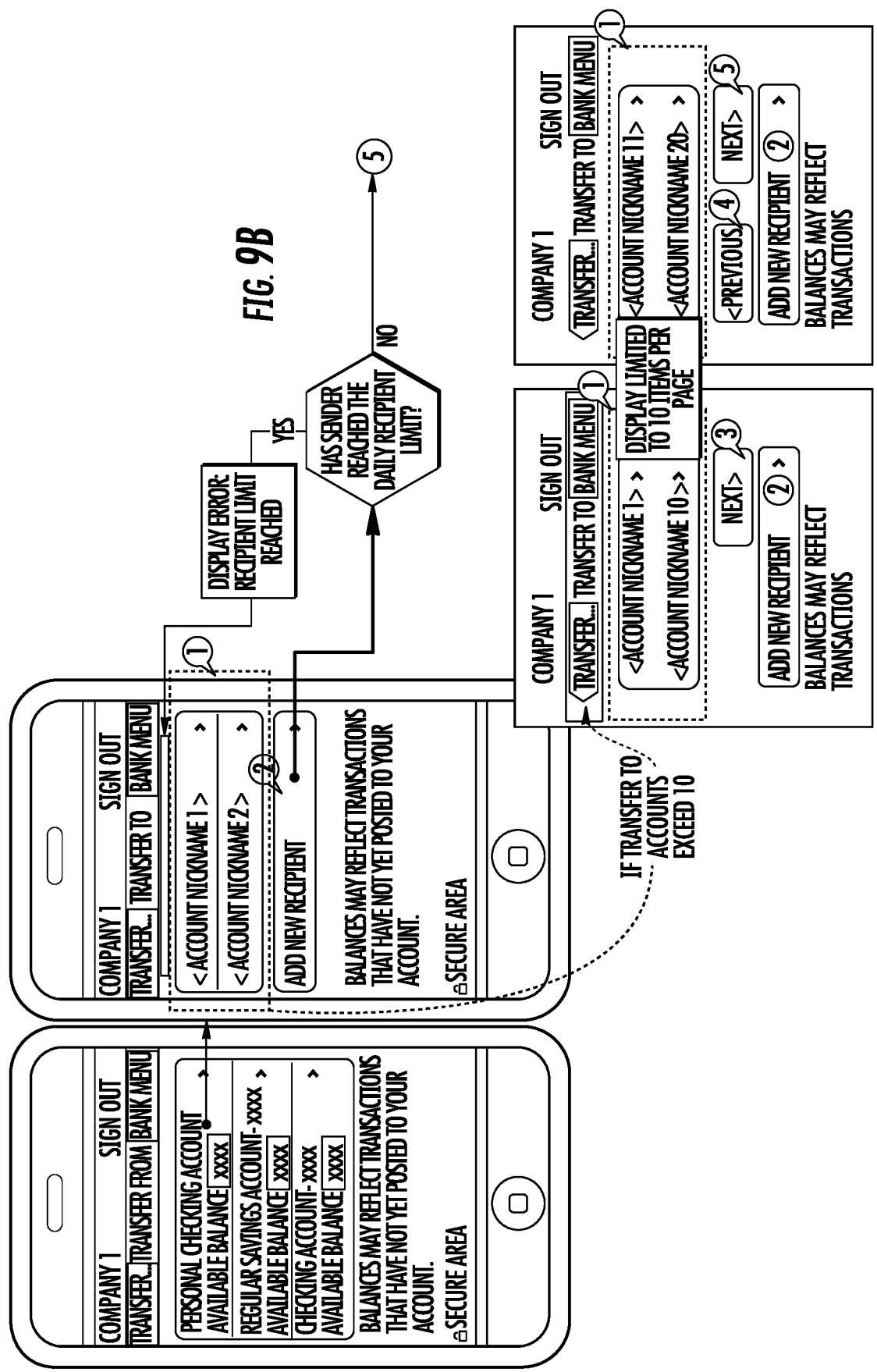

The process then moves to block 838 of FIG. 8B where the mobile P2P payment system client application 694 displays a list of eligible financial institution accounts that can participate in the mobile P2P transfer as well as their associated balances. A relevant screenshot is shown in FIG. 9B(3) where the mobile P2P payment system client application 694 displays the eligible accounts and their balances. The mobile P2P payment system client application 694 also indicates to the first user that the balances may reflect transactions that have not yet been posted to the first user's account. In the illustrated example of FIG. 9B(3), a personal checking account, a regular savings account and a another checking account and their respective balances are depicted.

The process then moves to block 840 of FIG. 8B where the first user 310 can select an account to transfer funds from.

The process then moves to block 842 of FIG. 8B where the mobile banking system 600 provides any of first user's saved P2P transfer recipients to the mobile P2P payment system client application 694.

The process then moves to block 844 of FIG. 8B where the mobile P2P payment system client application 694 displays a list of any saved P2P transfer-to accounts or recipients and an option to add a new recipient. A screenshot of this list is shown in FIG. 9B(4) where any saved P2P transfer recipients are visible in the region displayed as "Account Nickname 1" and "Account Nickname 2." Activating any particular transfer-to account that is in the name of or otherwise associated with the first user will take the first user to an account details page for that particular account. Activating any particular transfer-to account not in the name of or associated with by the first user (i.e., another user's account) will not take the first user to an account details page for that particular account. In one embodiment, the first user cannot see the balance of a transfer-to account not in the name of or associated with the first user. FIG. 9B(4) also displays a hyperlink to add a new transfer recipient. This link is only available if the first user has agreed to the terms and conditions page on the first user's mobile banking account. In one embodiment, the mobile P2P payment system client application 694 can only display a first pre-determined number of transfer-to accounts or recipients per page. Therefore as shown in FIG. 9B(4a), if the number of transfer-to accounts are greater than a first pre-determined number, then a first user has to activate the next button to choose other recipients if the user wants to choose a recipient who is not in the initial pre-determined displayed list of recipients. If the number of transfer-to accounts or recipients are greater than a second higher pre-determined number, then as shown in FIG. 9B(4b), the mobile P2P payment system client application 694 provides the first user with the next button and the previous button to navigate between groups of recipients. If the number of transfer-to accounts or recipients is greater than a first pre-determined number but smaller than a second higher pre-determined number, then the mobile P2P payment system client application 694 provides the first user with a previous button but not a next button. In one embodiment of the invention, the first pre-determined number is 10 and the second higher pre-determined number is 20.

The process then moves to block 846 of FIG. 8B where the first user 310 can select a recipient from the list to participate in the P2P transfer by activating the link associated with a particular recipient. If the user selects an existing recipient, then the mobile P2P payment system client application 694 presents to the user the transfer GUI of block 860 (FIG. 8C) that is described later. Alternatively, the process can move to block 848 of FIG. 8B where the first user adds a new recipient by activating the link to add a new recipient. In one embodiment, in which the user is limited to adding a predetermined number of new recipients in a daily period, if the first user has reached the pre-determined daily recipient limit, the mobile P2P payment system client application 694 displays an error message on an area of the mobile webpage displayed in FIG. 9B(4).

Figure 8C:
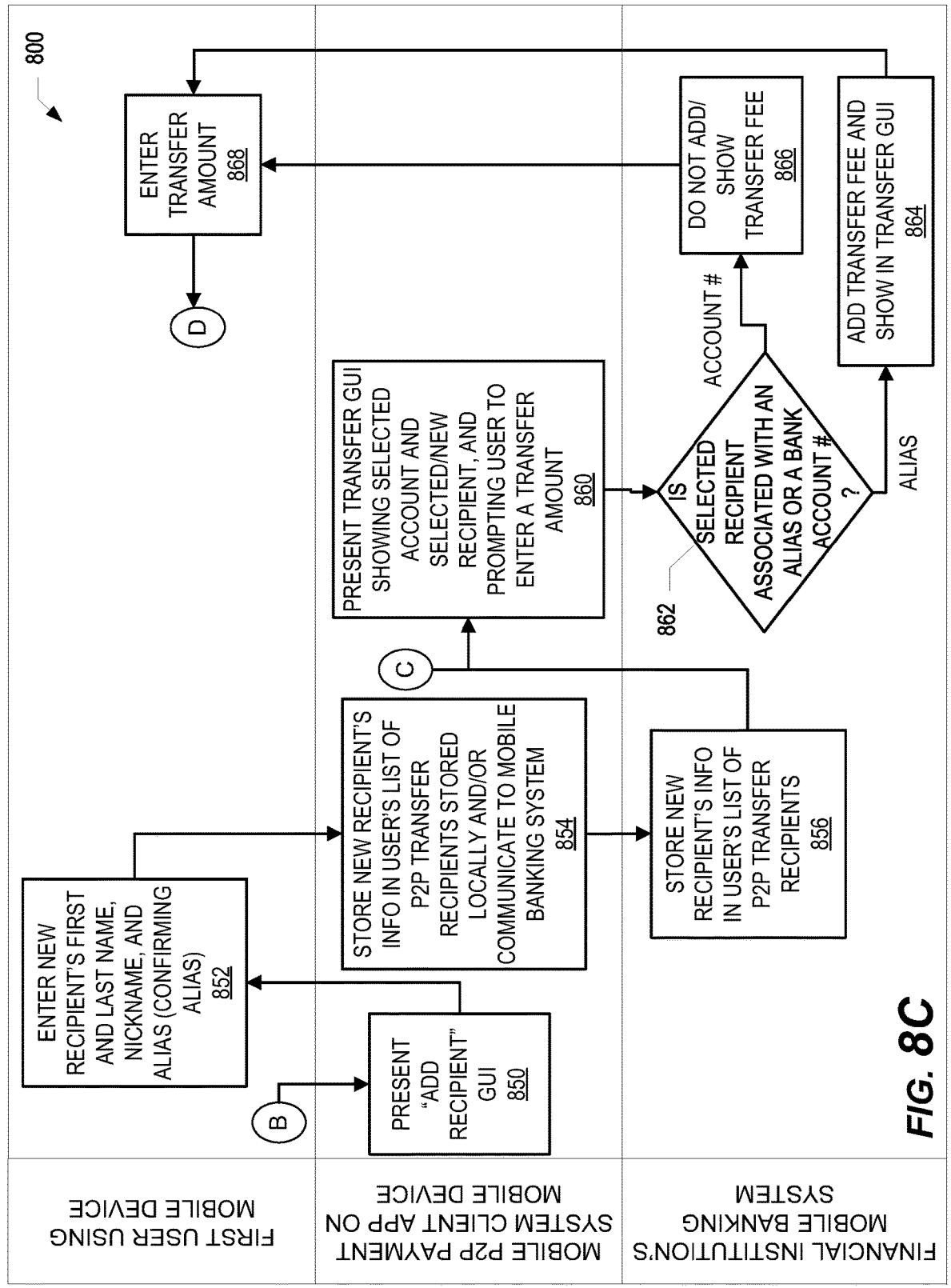
Figure 9C:
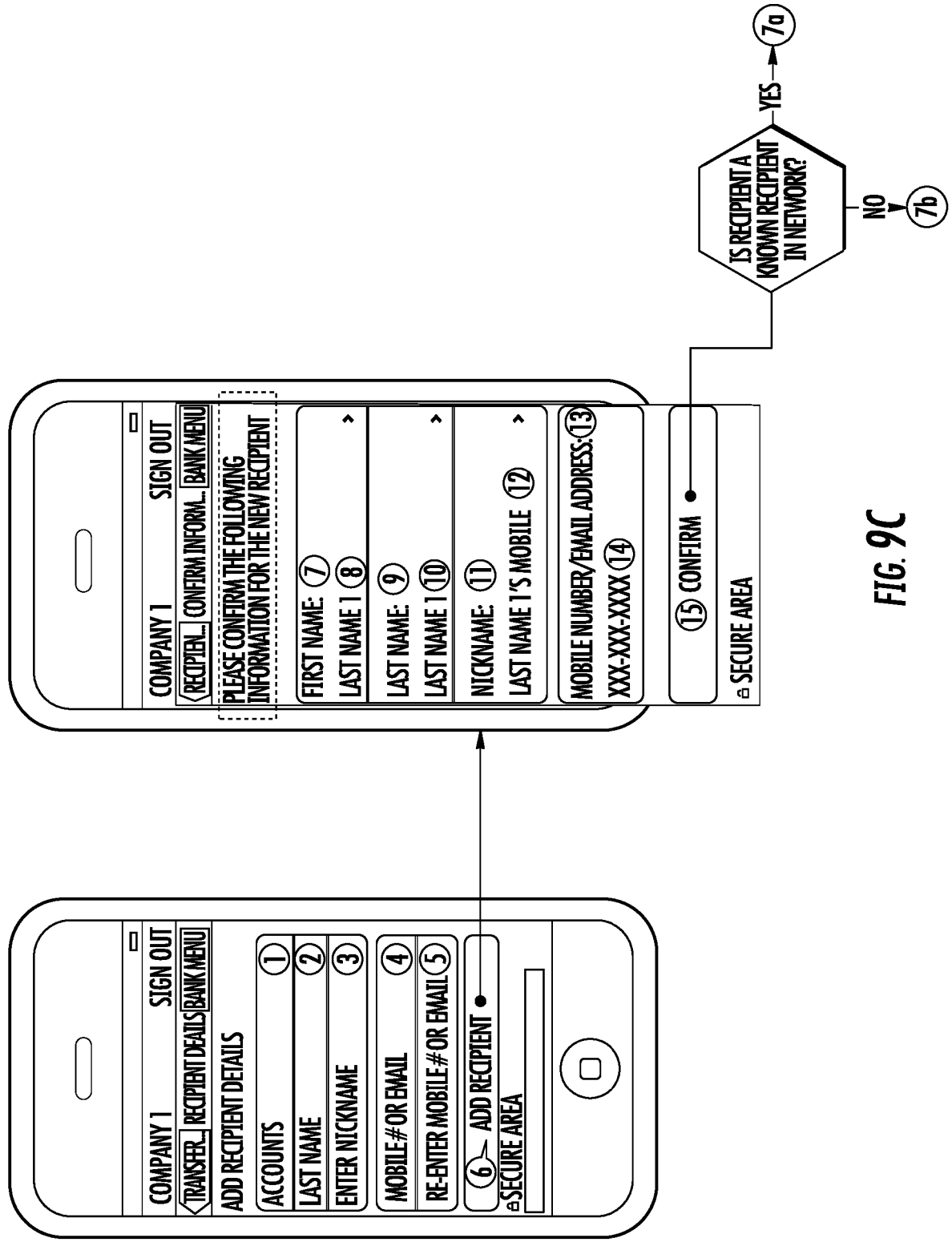

The process then moves to block 850 of FIG. 8C where the mobile P2P payment system client application 694 presents to the first user a GUI to add a new recipient. A screenshot of this GUI is shown in FIG. 9C. As shown in FIG. 9C(5), the mobile P2P payment system client application 694 presents an input field to enter the recipient's first name, an input field to enter the recipient's last name, an input field to enter a nickname associated with the recipient as chosen by the first user, a first input field to enter an alias, and a second input field to re-enter the alias which is checked against the alias entered into the first input field to verify that both aliases match. In one embodiment, the alias can be, but is not limited to, a mobile device number or an email address. The GUI also presents the user with a button to add the new recipient. The process then moves to block 852 of FIG. 8C where the first user enters the new recipient's first name, last name, nickname, and alias, along with re-entering the alias and activating the button the add the recipient. As shown in FIG. 9C(6), a pre-confirmation page is now displayed where the mobile P2P payment system client application 694 asks the first user to confirm the details of the recipient by activating the confirm button. In one embodiment, the complete set of characters comprising the alias are not displayed on the pre-confirmation page. By activating any of the entries entered by the first user, the first user can be taken back to the mobile webpage for adding recipient details. For instance, if the first user activates the first name that is displayed on the pre-confirmation page, a hyperlink embedded into the text allows the first user to return to the pre-confirmation page FIG. 9C(5) for editing the first name.

Once the first user activates the confirm button, the process moves to block 854 of FIG. 8C where the mobile P2P payment system client application 694 locally stores the new recipient's information in the first user's list of P2P transfer recipients and/or communicated to the mobile banking system 600.

The process then moves to block 856 of FIG. 8C where the mobile banking system 600 stores the new recipient's information in the first user's list of P2P transfer recipients.

Figure 9D:
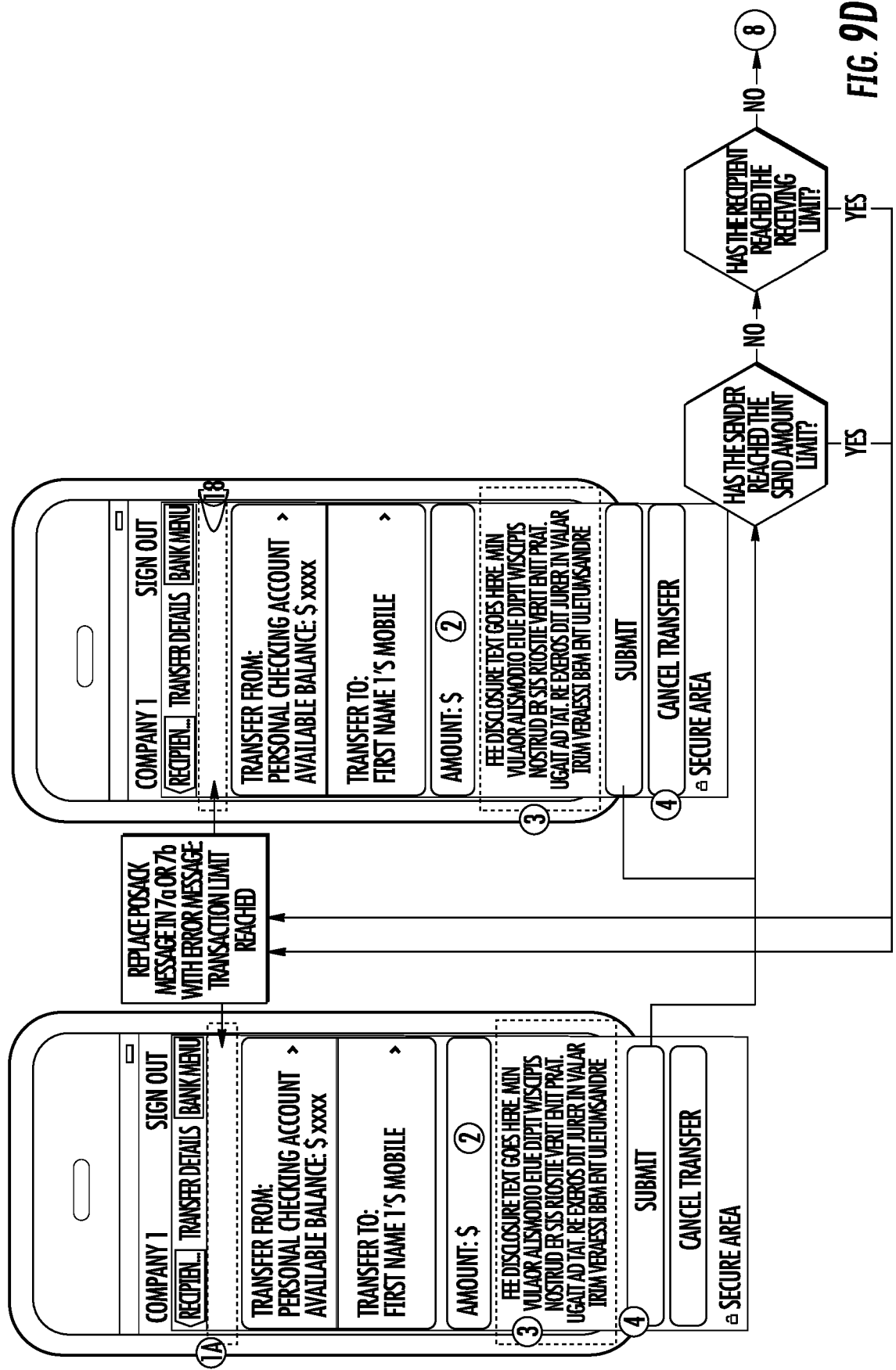

The process then moves to block 860 of FIG. 8C where the mobile P2P payment system client application 694 presents a transfer GUI showing selected account and selected/new recipient, and prompting the first user to enter a transfer amount. This is shown in FIG. 9D where the screenshot shows that on a transfer details page, the mobile P2P payment system client application 694 displays the transfer-from account, the transfer-to account or recipient alias, and an input text box for entering the amount that the first user 310 wishes to transfer. As shown in FIG. 9D, the GUI also presents disclosure text regarding any possible assessments that will be incurred by the first user for making this transfer. The GUI also displays a submit button for submitting the transfer and a cancel button for canceling the transfer and returning to the menu page shown in FIG. 9A.

The process then moves to block 862 of FIG. 8C where the mobile banking system 600 determines if the selected recipient is associated with an alias or a financial institution account number.

If, in block 862 of FIG. 8C, the mobile banking system 600 determines that the selected recipient is associated with an alias, then the process moves to block 864 where the mobile banking system 600 adds the transfer assessment and shows this transfer assessment in a GUI. If, in block 862 of FIG. 8C, the mobile banking system 600 determines that the selected recipient is not associated with an alias, then the process moves to block 866 where the mobile banking system 600 does not show or add a transfer assessment. As stated above and as shown in FIG. 9D, the mobile P2P payment system client application 694 displays any possible transfer assessment disclosure (along with the transfer assessment in some embodiments) in a text box. In one embodiment, this assessment disclosure text box is placed under the text input field where the first user enters the amount to be transferred.

The process then moves to block 868 of FIG. 8C where the first user enters a transfer amount in the appropriate text input field as shown in FIG. 9D.

The process then moves to block 870 of FIG. 8D where the mobile P2P payment system client application 694 communicates the amount to be transferred to the mobile banking system 600.

The process then moves to block 872 of FIG. 8D where the mobile banking system 600 determines if the transfer amount is above a maximum limit placed on the transfer. In one embodiment, there is a pre-determined amount limit placed on the first user (sender). In another embodiment, there is a pre-determined amount limit placed on the recipient. In still another embodiment, both these pre-determined amount limits place a ceiling on the amount that can be transferred via a mobile P2P transfer. There may be several factors that affect this limit including, but not limited to, the first user's identity, the recipient's identity, the length and nature of the first user's relationship with the financial institution, the length and nature of the recipient's relationship with the financial institution, the amount of funds that the first user has deposited at the financial institution, the first user's status with the financial institution, etc. In one embodiment, the maximum amount that can be transferred using the mobile P2P transfer method is dynamically determined, at the time of the transfer request, by a supporting application that works in conjunction with or is embedded within the mobile P2P payment system client application 694.

If in block 872 of FIG. 8D the transfer amount is above the maximum allowable limit, then the mobile P2P payment system client application 694 displays an error message to the first user.

If in block 872 of FIG. 8D the transfer amount is below or equal to the maximum allowable limit, the mobile P2P payment system client application 694 requests user confirmation of the transfer request. A GUI that captures a screenshot of this pre-confirmation page is displayed in FIG. 9E(8). Here, the mobile P2P payment system client application 694 displays the transfer-from account, the transfer-to account or recipient alias, the amount to be transferred, and the assessment to be incurred by the first user for making this transfer. The GUI also displays assessment disclosure text on the page. In some embodiments, there is no assessment incurred by the first user for making the transfer. As shown in FIG. 9E(8), the GUI also displays two buttons or hyperlinks, one for making the transfer and one for canceling the transfer and returning to the bank menu page shown in FIG. 9A.

The process then moves to block 878 of FIG. 8D where the first user confirms the transaction request by activating the button or hyperlink for making the transfer. If the mobile banking system 600 recognizes that this transaction is a duplicate of another transaction executed within a pre-determined amount of time in the past, then, as shown in FIG. 9E(8a), the mobile P2P payment system client application 694 displays another pre-confirmation page informing the first user that the transfer is a possible duplicate of a recently executed transaction. As shown in FIG. 9E(8a), the GUI also displays two buttons or hyperlinks, one for making the transfer and one for canceling the transfer and returning to the bank menu page shown in FIG. 9A.

Figure 9F:
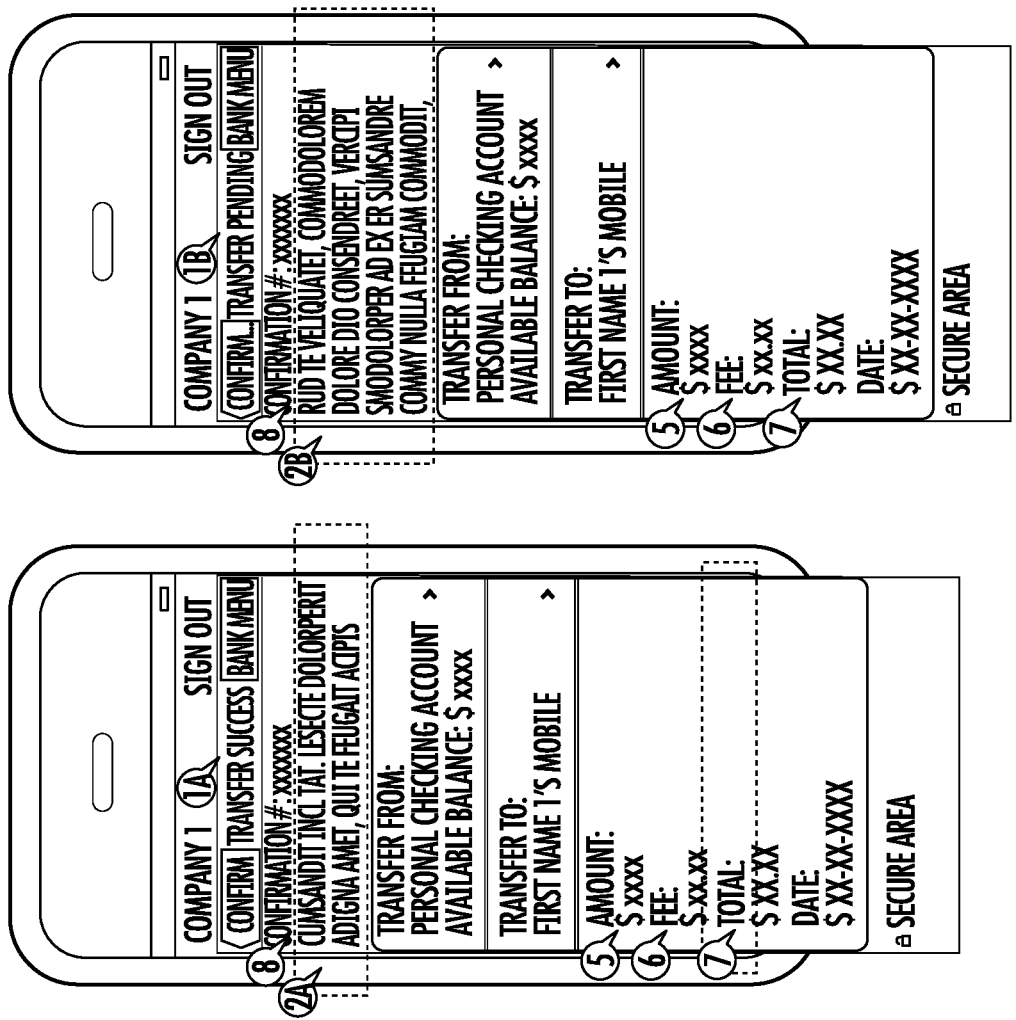
Figure 9G:
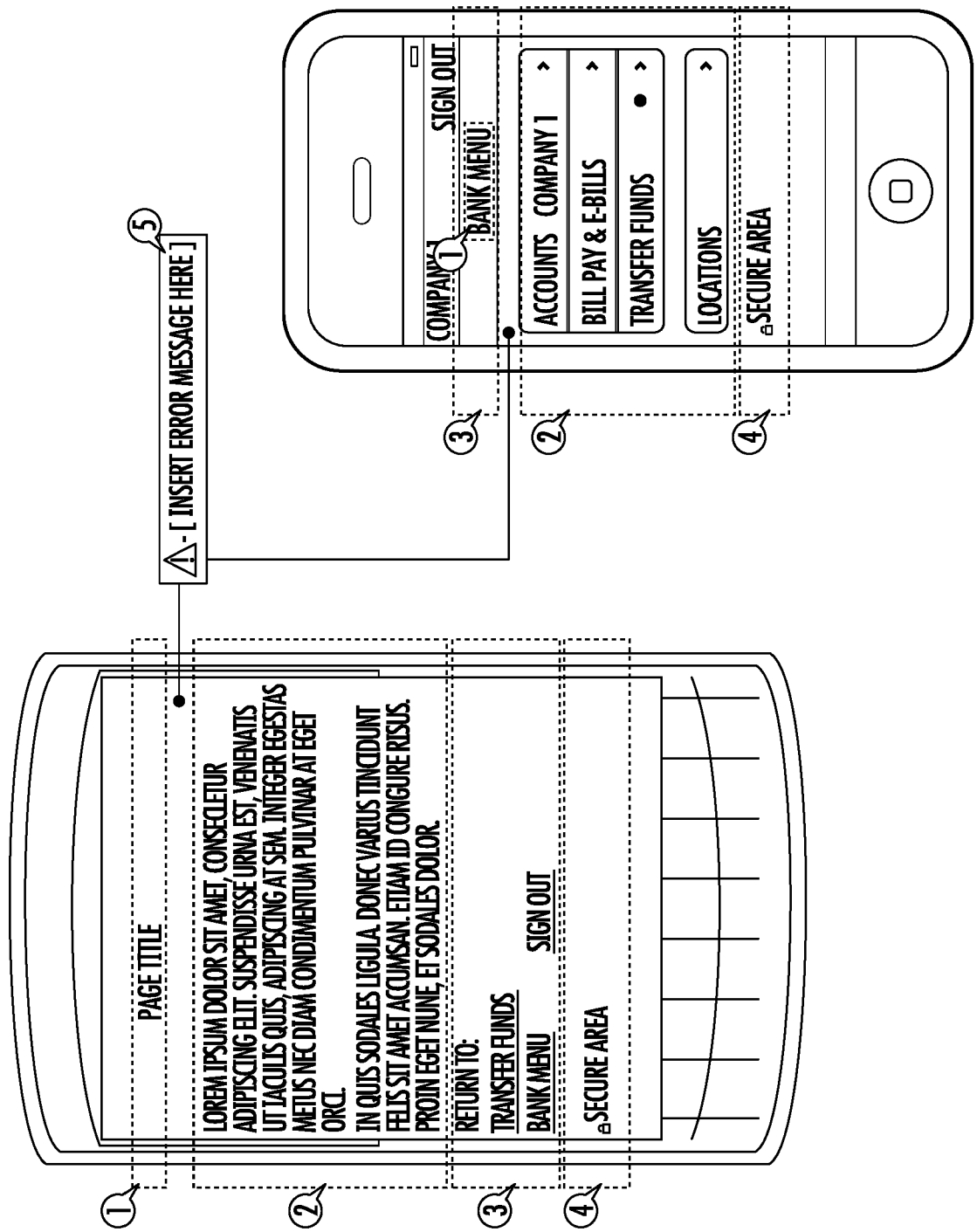

The process then moves to block 880 of FIG. 8D where the mobile banking system 600 determines whether the recipient is associated with an alias or a financial institution account number. If the recipient is associated with a financial institution account number, the process moves to block 881 where the mobile banking system 600 uses the financial institution account number to initiate an Automated Clearing House (ACH) transfer or other type of transfer. Subsequently, the process moves to block 882 of FIG. 8D where the mobile P2P payment system client application 600 provides notification to the first user that a transfer or a notice of transfer request to the recipient (second user) has been initiated and displays the information regarding the transfer to the first user. An instance of this notification is shown in FIG. 9G. FIG. 9G shows a confirmation page that displays the transfer-from account, the transfer-to account or recipient alias, the amount transferred, the assessment incurred by the first user for making this transfer, the total cost of the transfer, and the date on which the transfer was executed. The confirmation page also displays a confirmation number associated with the transfer.

If, in block 880, the recipient is associated with an alias then, the process moves to block 883 where the mobile banking system 600 sends the alias and the recipient's name to an alias data repository 700.

The process then moves to block 884 where the alias data repository 700 looks up the alias in an alias datastore. Then the process moves to block 885, where the alias data repository 700 determines whether the alias is associated with a financial institution account. If the alias is associated with a financial institution account, then, if the alias data repository 700 determines that the provided name matches the name in the datastore, then the process moves to block 881 of FIG. 8D where the mobile banking system 600 uses the financial institution account number to initiate the ACH transfer or other type of transfer. Subsequently, the process moves to block 882 of FIG. 8D where the mobile P2P payment system client application 694 provides notification to the first user that a transfer or a notice of transfer request to the recipient (second user) has been initiated and displays the information regarding the transfer to the first user. An instance of this notification is shown in FIG. 9F. FIG. 9F shows a confirmation page that displays the transfer-from account, the transfer-to account or recipient alias, the amount transferred, the assessment incurred by the first user for making this transfer, the total cost of the transfer, and the date on which the transfer was executed. The confirmation page also displays a confirmation number associated with the transfer. The confirmation page also displays whether the transfer has been successful FIG. 9F(9*a*) or whether it is still pending FIG. 9F(9*b*).

If in block 885 of FIG. 8D, the alias data repository 700 determines that the alias is not associated with a financial institution account, then the process moves to block 888 where the mobile P2P payment system client application 694 displays information about the transfer to the first user and indicates that the transfer is pending.

Figure 8E:
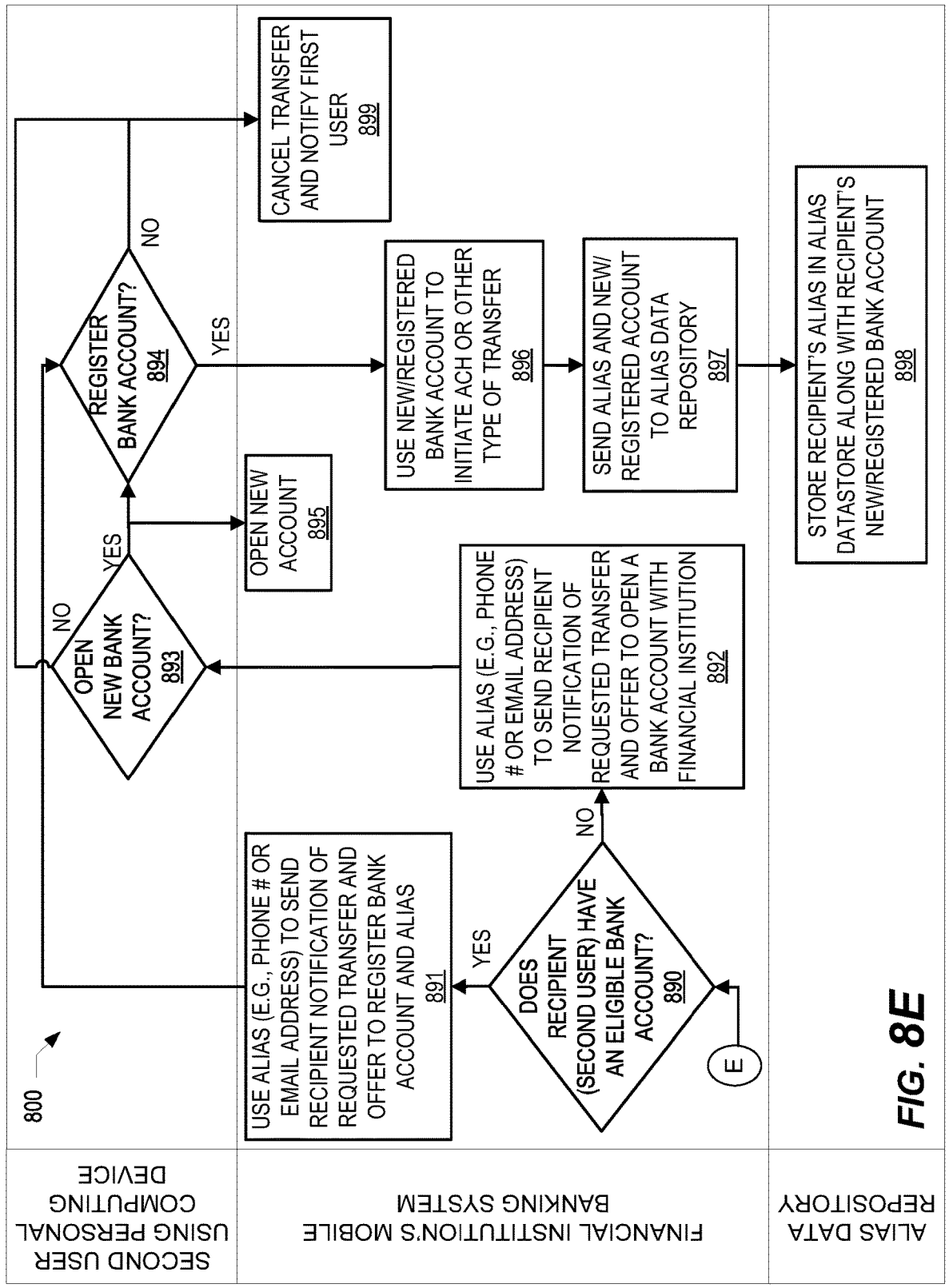

The process then moves to block 890 of FIG. 8E where the mobile banking system determines whether if the recipient (second user) has an eligible financial institution account. If the recipient (second user) does not have an eligible financial institution account, then in block 892, the mobile banking system 600 uses an alias to send the recipient notification of requested transfer from the first user and an offer to open a financial institution account with the financial institution that manages the mobile banking system 600. In one embodiment, the alias is a phone number or an email address.

The process then moves on from block 892 to block 893 of FIG. 8E, where if the second user decides to not open a financial institution account at the financial institution that manages the mobile banking system 600, then the mobile banking system 600 cancels the transfer and notifies the first user in block 899.

If in block 893 of FIG. 8D, the second user (recipient) decides to open a new financial institution account, the mobile banking system 600, in block 895, opens a new account for the second user. Subsequently, the second user (recipient) must determine in block 894 whether the second user registers the new financial institution account for the mobile P2P service.

As shown in FIG. 8E, if the second user in block 894 does not register the new financial institution account opened in block 895, then the mobile banking system 600 cancels the transfer and notifies the first user in block 899.

As shown in FIG. 8E, if the second user registers the new financial institution account in block 894 for mobile P2P transfers, then the mobile banking system 600, in block 896, uses the new registered financial institution account to initiate an ACH transfer or other type of transfer. The process then moves to block 897 where the mobile banking system 600 sends the alias and the new registered account information to the alias data repository 700. The process then moves to block 898 of FIG. 8E where the alias data repository 700 stores recipient's alias in alias datastore along with recipient's (second user's) new registered financial institution account.

If the recipient (second user) has an eligible financial institution account as determined by the mobile banking system 600 in block 890, then the process moves to block 891 in FIG. 8E where the mobile banking system 600 uses an alias (e.g., phone number or email address) to send recipient (second user) notification of requested transfer, and offers to register the recipient's financial institution account and alias. As shown in FIG. 8E, then the process moves to block 894 where if the second user (recipient) decides not to register the second user's financial institution account for mobile P2P transfers, then the mobile banking system 600 cancels the transfer and notifies the first user.

As shown in FIG. 8E, if the second user (recipient) registers the eligible financial institution account in block 894, then the mobile banking system 600 uses the eligible registered financial institution account to initiate an ACH transfer or other type of transfer in block 896. The process then proceeds to block 897 where the mobile banking system 600 sends alias and the eligible registered account information to the alias data repository 700. The process then moves to block 898 of FIG. 8E where the alias data repository 700 stores recipient's alias in alias datastore along with recipient's eligible registered financial institution account.

Mobile Banking Alias Registration and P2P Payment Receive Process and Interface

FIGS. 10A-10C provide flow charts illustrating a process 1000 for receiving P2P payments, in accordance with an embodiment of the invention. FIGS. 10A-10C illustrate the flow chart in terms of "swim lanes" associated with entities which may perform the operations in each respective swim lane. The entities illustrated in the exemplary Figures are a financial institution's mobile banking system 600 and a first user (recipient) using a first personal computing or mobile device. However, it should be noted that other entities could also be involved and some embodiments of the invention may not be limited to the two entities illustrated in FIGS. 10A-10C. Additionally, it should be understood that, in other embodiments of the invention, the entities need not be required to perform the actions illustrated in each respective swim lane. For example, some of the process steps described herein may be performed by the first entity (or other entities)

even though the element may be illustrated as in the swim lane of the second entity. Similarly, in some embodiments, some of the process steps may be performed by the second entity (or other entities) even though the element may be illustrated as in the swim lane of the first entity.

The process 1000 in FIG. 10A starts with block 1005 where a mobile banking system 600 sends a first user (recipient) notice of a requested transfer from a second user, the notice including a link to the mobile banking system 600 and a confirmation number.

The process then proceeds to block 1010 where a first user (recipient) activates the link provided with the notice.

The mobile banking system 600 alerts the first user (recipient) that to accept the transfer, the first user will need an eligible checking or saving account at a participating financial institution. For customers who hold accounts at the financial institution that manages the mobile banking system 600, the mobile banking system 600 presents a widget with a textbox that allows the first user to enter login or other authenticating information. The mobile banking system 600 also provides a link for the first user to enroll with the financial institution's mobile banking system. For customers of other participating financial institutions, the mobile banking system 600 provides a sign-in button, which might either display a sign-in widget on the instant page or might provide for a link to another page where the first user can enter login information for the participating financial institution. The mobile banking system 600 also notifies the first user that if the first user does not have an account with one of the participating banks, that first user can open an account at the financial institution that maintains the mobile banking system 600. The mobile banking system 600 notifies the first user that the first user may review the terms of opening a new account at this financial institution, including any assessments that may be incurred by the first user in opening this new account. The mobile banking system 600 also notifies the first user that if the first user does not want to open a new financial institution account, the first user may notify the sender to arrange an alternate transfer method. The mobile banking system 600 also notifies the first user that the transaction will be canceled if it is not accepted within a pre-determined period of time.

The process then proceeds to block 1020 of FIG. 10A where the first user (recipient) determines whether the first user has an account with the financial institution that manages the mobile banking system 600. If the first user has a financial institution account with the financial institution that manages the mobile banking system 600, then the process moves to block 1050 where the first user enters authentication information into the appropriate textbox.

As shown in FIG. 10A, if the first user does not have a financial institution account with the financial institution that manages the mobile banking system 600 then the process proceeds to block 1022 where the first user determines whether the first user has an account with participating financial banks or financial institutions. If the first user has a financial institution account with a participating financial institution, the process proceeds to block 1040 where the first user can select the participating financial institution sign-in link. The process then moves to block 1045 where the mobile banking system 600 forwards the first user to a participating financial institution's website or alternatively, the mobile banking system 600 opens a widget or an applet on the same window or new pop-up window.

As shown in FIG. 10A, if, in block 1020, the first user does not have an account the financial institution that manages the mobile banking system 600 and if, in block 1024, the first user (recipient) does not open a new account with the financial institution that manages the mobile banking system 600, then, as shown in block 1035, after a defined period of time without recipient (first user) acceptance, the mobile banking system 600 cancels the transfer and notifies the second user (sender).

As shown in FIG. 10A if, in block 1024, the first user opens a new account with the financial institution that manages the mobile banking system 600, then the first user, in block 1025, selects the link directing the first user to open a new account with the financial institution that manages the mobile banking system 600.

As shown in FIG. 10A, the link in block 1025 directs the mobile banking system 600 to display a new account application GUI to the first user (see block 1030), which new account application quickly approves and opens a new account for the first user after receiving any pertinent information that may be required to open and be approved for a new account at the financial institution that manages the mobile banking system 600. The process then proceeds to block 1050 in FIG. 10A where the first user enters authentication information into a textbox.

The process then moves to block 1060 in FIG. 10B where the mobile banking system 600 prompts the first user to enter a confirmation number received with the transfer notice and agree to the terms governing the transfer. The mobile banking system 600 indicates to the first user that this is the start of the procedure to accept a transfer to money to the first user's email address or mobile number. The mobile banking system 600 prompts the first user to enter the received confirmation number in a textbox. The webpage also has two buttons—a first button configured to allow the first user to indicate a desire not to proceed with accepting the transfer and a second button configured to allow the first user to indicate a desire to proceed with the transfer. The second button can move from a dormant state to an activatable state by checking the check-box to confirm that the first user has a) has read and agrees to the terms of the service agreement, including the terms of the Email/Mobile Network Transfer section; b) consents to receive email and automated text messages about Email/Mobile Transfers; c) will only register mobile numbers where the first user is the account holder; or if the first user is not the account holder, the first user has the account holder's permission to register that mobile number; and d) will obtain the consent of the person to whom the first user wants to send a Mobile Transfer text message to receive the automated text message. In one embodiment, the first user has to always go through the procedure of accepting the transfer. In other embodiments, the first user does not have to go through the procedure accepting the transfer for any transfer after the first transfer.

Subsequently, in block 1065, the first user enters a confirmation number in the appropriate textbox and agrees to the terms that govern the transaction by activating the appropriate checkbox. The first user then activates on the second button to continue the process of accepting the transfer.

The process then moves to block 1068 of FIG. 10B where the mobile banking system 600 uses the confirmation number entered in block 1065 to identify or confirm the transfer request.

Then the process proceeds to block 1070 of FIG. 10B where the mobile banking system 600 prompts the user to register the alias to which the transfer notice was sent. The mobile banking system 600 indicates to the first user that if the first user has received a notice that money was sent to the first user, then the first user will need to set up to accept transfers the same email address or mobile number that received the transfer notice. The page shows a first textbox where the user can enter the alias that received the transfer notice, and a second textbox where the user can confirm the alias entered in the first textbox by re-entering the alias in the second textbox. The mobile banking system 600 also prompts the user to select the appropriate account to link to the alias that will receive the funds by selecting the appropriate account from a drop down list. The mobile banking system 600 also prompts the user to check a checkbox, whereby the first user by checking the checkbox agrees that by registering the alias, the first user is the alias account holder, or has the alias account holder's permission to register it, and consents to receive email and text messages about alias transfers at this email address or phone number. In some embodiments, the mobile banking system 600 presents an authentication widget that will be described in further detail below. The page also has two buttons—a first button configured to allow the first user to indicate a desire not to proceed with receiving the transfer and a second button configured to allow the first user to indicate a desire to proceed with receiving the transfer. This second button moves from a dormant state to an activatable state after the first user enters all the required information on the page and has been further authenticated, as in some embodiments. In one embodiment, the mobile banking system 600 also saves the information entered on this page, so that the first user does not have to re-register an alias every time the first user receives a P2P money transfer.

The process then proceeds to block 1075 where the first user enters the alias in the appropriate textbox, confirms the alias in the appropriate textbox, selects the account to receive the funds from the drop-down list, and checks the checkbox that indicates that the first user accepts the terms that govern the transfer. In some embodiments, the accounts listed in the drop-down list are identified only by selected few digits of the account numbers.

[In some embodiments, the process then proceeds to block 1077 where the mobile banking system 600 requires additional authentication to register an alias. The mobile banking system 600 displays a widget which serves as an additional authenticating step before saving the information of the first user's associated alias. The mobile banking system 600 indicates to the first user that by activating in the widget on the button for a sending a code, the first user will receive a code on the first user's mobile device. In another embodiment, the first user may receive a code through other means such as email, snail mail, etc. In one embodiment, the widget is a SAFEPASS® widget and the user can send a "SAFEPASS" code to the first user's mobile device.

The process then moves to block 1079 of FIG. 10B where the first user performs an additional authenticating step. The first user activates on the widget's button for sending a code to the first user's mobile device. The first user than receives on first user's mobile device the code that the first user must input into the widget. Once the first user inputs the correct code into the widget and presses a button in the widget to confirm that the code is correct, the button that corresponds to adding a new recipient is activated so that it can now be activated by the first user. The first user (recipient) activates this button so that the mobile banking system 600 can store the first user's alias. The first user can activate a designated button on the page which indicates that the first user wishes to proceed with receiving the transfer. The mobile banking system 600 indicates to the first user that by activating the button to continue with receiving the transfer, the first user will receive an enrollment code.

The process then moves to block 1080 of FIG. 10D where the mobile banking system 600 uses the registered alias to send an enrollment code to the device of the first user (recipient) associated with the alias.

The process then moves to block 1082 of FIG. 10D where the mobile banking system 600 prompts the first user to enter the enrollment code that the first user received on the device associated with the alias. The mobile banking system 600 indicates to the first user that the first user must verify the alias (e.g., mobile number) to complete enrollment in the mobile P2P transfer service. In one embodiment, the webpage indicates to the first user that the first user should expect a text message from the financial institution that manages the mobile banking system 600. The page also has activatable text if the first user would like to know more about the use of enrollment codes. The page indicates to the first user, the enrollment code must be entered into the appropriate textbook in order verify ownership of the mobile number or email address associated with the alias and complete enrollment with the P2P transfer service. The mobile banking system 600 also indicates to the first user that the enrollment number expires in a pre-determined number of minutes. After the enrollment number expires, the mobile banking system 600 will not be able use that enrollment code to verify ownership of the first user's mobile number associated with the transfer and will not be able to complete the enrollment of the first user (recipient). The webpage also has activatable text to get help if the first user has not received an enrollment code or if the enrollment code has expired. The page indicates to the first user that messaging and data rates may apply for receiving the enrollment code. The page also has two buttons—a first button configured to allow the first user to indicate a desire not to proceed with the transaction and a second button configured to allow the first user to indicate a desire to proceed with receiving the transfer. The second button only moves from a dormant state to an activatable state after the first user enters an enrollment code on the page. In an embodiment, the second button only becomes activatable after the first user enters a valid and unexpired enrollment code on the page.

The process then moves to block 1084 where the first user enters the enrollment code into the appropriate textbox.

The process then moves block 1086 where the mobile banking system 600 determines if the enrollment code entered by the first user matches the enrollment code sent by the mobile banking system 600 to the alias of the first user.

If the entered code in 1086 does not match the code sent to the alias, then the mobile banking system 600 displays a graceful error message to the first user that the transaction cannot move any further. In one embodiment, the mobile banking system 600 allows the first user to correct any errors in the alias provided by the first user or in the code received by the first user. In one embodiment, the mobile banking system 600 only grants a pre-determined number of unsuccessful attempts to verify the code before rejecting the transfer.

If the entered code in 1086 matches the code sent to the alias, the process moves to block 1088 where the mobile banking system 600 processes any pending transfers involving the newly registered alias. The mobile banking system 600 indicates to the user that the verification of the alias has been completed. The mobile banking system 600 thanks the user for setting up an alias to accept transfers. The mobile banking system 600 indicates to the first user that people or entities can now send money to the first user using the first user's alias. The mobile banking system 600 indicates to the first user that any transfer to the first user's newly registered alias will be deposited to the account number shown on the webpage. In one embodiment, the mobile banking system 600 only shows a selected few digits of the first user's financial institution account number. The page also indicates to the first user that the transfer request is now in process. The page shows details of the transfer, including, but not limited to the name of the sender, the amount, the date on which the sender sent the amount, the confirmation number, and the status of the transfer. The page also two buttons. The first button allows the first user to add another alias and the second button allows the first user make a transfer using the newly registered alias.

The process then moves to block 1090 where the mobile banking system 600 sends the alias to the alias data repository 700 along with associated account information to be stored in the alias datastore.

In one embodiment, the mobile banking system 600 presents four hyperlinks under the transfers hyperlink described earlier. These four hyperlinks are a hyperlink for a making a transfer, a hyperlink for reviewing transfers, a hyperlink for adding recipients, and a hyperlink for managing accounts. Using the appropriate hyperlink, the first user has the option of obtaining set up to accept transfer by activating an appropriate link. The mobile banking system 600 indicates to the first user (recipient) that the first user may activate the link if the first user received a transfer notice, i.e., the first user received an email, text message, or other form of electronic communication that someone has sent money to the first user. The mobile banking system 600 indicates to the first user that in order to complete the transfer and collect the funds, the first user must set up the first user's alias to accept transfers. The mobile banking system 600 also presents a activatable link so that the first user can be directed to a page to learn more about this P2P transfer via alias method. The mobile banking system 600 also presents a help box where the first user can understand more about what the first user can do using the mobile banking system 600, what the first user needs to know, and what else the first user can do using the mobile banking system 600. The mobile banking system 600 also presents a message to the first user that transferring money within the bank is fast and free. The mobile banking system 600 also indicates to the customer that the feature of making a P2P transfer using a recipient's alias is a new feature, and that transfers within the bank now include transfers made using a recipient's alias. Alternatively, a user who intends to receive money using an alias can get set up by activating the link associated with obtaining a set up to accept transfers. A user who accesses the mobile banking system 600 can register an alias by selecting an appropriate link. Therefore, in one embodiment, the user does not have to wait to receive a payment using the mobile P2P transfer service before setting up an alias to receive transfers. In one embodiment, the user can register an alias using a mobile device, while in another embodiment, the user can register an alias using a personal computing device.

In one embodiment of the invention, both the sender and the recipient need to have financial institution accounts registered for mobile P2P transfer via alias. In another embodiment of the invention, the sender needs to have a financial institution account registered for mobile P2P transfer via alias, but the recipient does not need to have a financial institution account registered for mobile P2P transfer via alias. In another embodiment of the invention, the recipient needs to have a financial institution account registered for mobile P2P transfer via alias, but the sender does not need to have a financial institution account registered for mobile P2P transfer via alias.

Text Message P2P Payment Send Process and Interface

FIG. 11 provides a flow chart illustrating a process 1100 for sending P2P payments via text message, in accordance with an embodiment of the invention. FIG. 11 illustrates the flow chart in terms of "swim lanes" associated with entities which may perform the operations in each respective swim lane. The entities illustrated in the exemplary Figure are a financial institution's mobile banking system 600, a first user (sender) 310 using a first personal computing or mobile device 400, and an alias data repository 700. However, it should be noted that other entities could also be involved and some embodiments of the invention may not be limited to the three entities illustrated in FIG. 11. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

All features that are described above as being part of the mobile P2P payment process and interface are also part of the text message P2P payment process and service. In one embodiment of the invention, the text message P2P payment send process and interface is a feature provided in the mobile P2P payment send process and interface. In another embodiment of the invention, the text message P2P payment send process and interface is distinct from the mobile P2P payment send process and interface. This text message P2P transfer feature is particularly useful for users who carry mobile devices that do not have computing resources and cannot access the Internet, i.e., mobile devices that only have messaging features and can only access a phone network.

Figure 12A:

Referring to FIG. 11, the process starts in block 1110 of FIG. 11 where the first user 310 (sender) sends a text message to a phone number associated with a mobile banking system 600 in a format that is recognized by the mobile banking system 600. In one embodiment, the format includes the word "Pay" followed by the recipient's alias followed by the amount that the first user intends to transfer. An illustration of the text message that the first user sends in block 1110 of FIG. 11 is displayed in FIG. 12A. FIG. 12A shows that the text message is directed to "Bank X" and the message is to pay the sum of $20 to the recipient associated with the alias phone number.

The process then moves to block 1120 in FIG. 11 where the mobile banking system 600 receives the text message from the first user and sends the number from which the message originated to the alias data repository 700 along with the alias of intended recipient.

The process then moves to block 1130 in FIG. 11 where the alias data repository 700 looks up the number of the first user (sender) in the alias datastore.

The process then moves to block 1140 in FIG. 11 where the alias data repository 700 determines if the number of the first user is a number associated with a financial institution account. If the alias data repository 700 determines that the number of the first user is not a number associated with a financial institution account, the mobile banking system 600 replies to the first user with a graceful error message that the transaction cannot be completed (see block 1105). In one embodiment, the error message is sent via text message, however, in other embodiments, the error message can be sent by any form of communication such as email, placing a phone call to the first user, snail mail etc.

If, in block 1140, the alias data repository 700 determines that the number of the first user is a number associated with a financial institution account, then the process moves to block 1150 in FIG. 11 where the alias data repository 700 looks up the recipient alias in the alias data store.

The process then moves to block 1160 in FIG. 11 where the alias data repository 700 determines if the recipient's alias is associated with a financial institution account. If the alias data repository 700 determines that the recipient alias is not associated with a financial institution account, the mobile banking system 600 replies to the first user with a graceful error message that the transaction cannot be completed (see block 1105). In one embodiment, the error message is sent via text message, however, in other embodiments, it can be sent by any form of communication such as email, placing a phone call to the first user, snail mail etc.

If, in block 1160, the alias data repository 700 determines that the recipient alias is associated with a financial institution account, then the process moves to block 1170. At block 1170, the mobile banking system 600 determines whether the transfer amount is above the maximum that may be transferred in this transaction. If the mobile banking system 600 determines that the transfer amount is above the maximum that may be transferred in this transaction, then the mobile banking system 600 replies to the first user with a graceful error message that the transaction cannot be completed (see block 1105). In one embodiment, the error message is sent via text message, however, in other embodiments, it can be sent by any form of communication such as email, placing a phone call to the first user, snail mail etc.

Figure 12B:
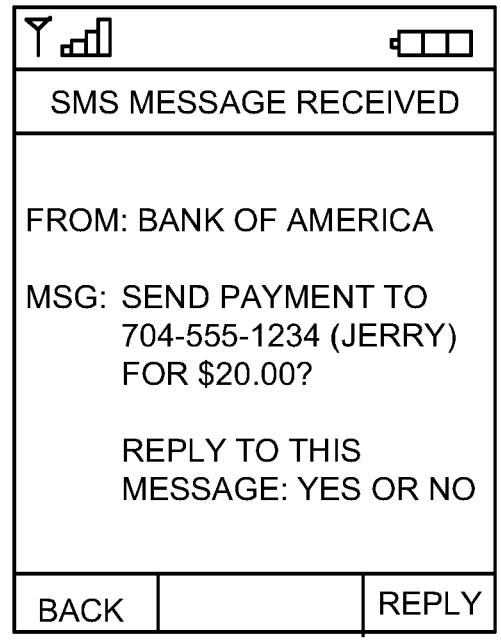

If, in block 1170, the mobile banking system 600 determines that the transfer amount is not above the maximum that may be transferred in this transaction, then the mobile banking system 600 sends a text message to the first user showing the requested transfer with the recipient name associated with the alias and requesting that the first user confirm the transfer request, wherein the format of the return confirmation text message is specified in the text message. In one embodiment, the recipient name associated with the alias is received from the alias data repository 700. In one embodiment, the text message in 1180 sent from the mobile banking system 600 specifies that the first user can confirm the transfer request with a "Yes" and can reject the transfer request with a "No." In other embodiments, the "Yes" and the "No" can be any letters, characters, or combinations thereof as defined by the mobile banking system 600. An illustration of the text message that the mobile banking system 600 sends to the first user in block 1180 of FIG. 11 is displayed in FIG. 12B. FIG. 12B shows that the text message is from "Bank X" and the message is whether the mobile banking system 600 should send a sum of money to a recipient who is identified by both an alias and a name. The text message also specifically informs the first user that the first user can confirm the payment with a "Yes" and can reject the payment with a "No."

Figure 12C:
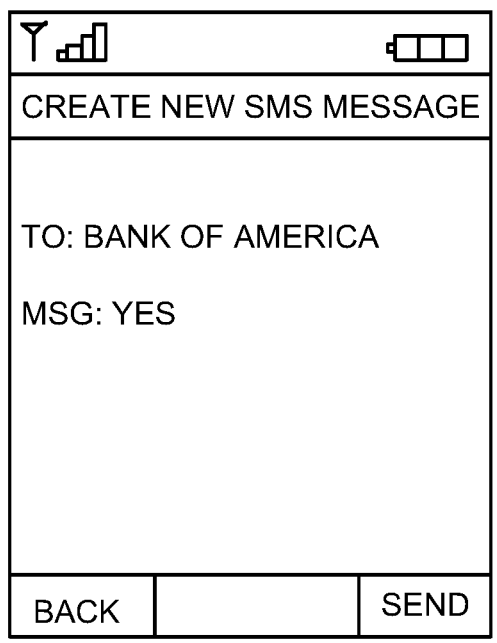

The process then moves to 1185 where the first user confirms the transaction request by replying to text message in 1180 with a "Yes." In other embodiments, the first user can confirm the transaction request in the format as specified in the text message sent in 1180 from the mobile banking system 600 to the first user. An illustration of the text message that the first user sends in block 1185 of FIG. 11 is displayed in FIG. 12C. FIG. 12C shows that the text message is directed to "Bank X" and the message is "Yes." This indicates that the first user is willing to go ahead with the payment.

The process then moves to block 1190 where the mobile banking system 600 uses the first user's and the recipient's financial institution account numbers to initiate ACH or other type of transfer from the financial institution account associated with the first user's (sender's) phone number to the financial institution account associated with the recipient's alias.

Figure 12D:

The process then moves to block 1195 where the mobile banking system 600 sends a text message to the first user with information regarding the transfer and with a message that the transfer initiated successfully. An illustration of the text message that the mobile banking system 600 sends to the first user in block 1195 of FIG. 11 is displayed in FIG. 12D. FIG. 12D shows that the text message is from "Bank X" and the message is that the first user has successfully transferred a sum of money to a recipient who is identified by name and alias. The text message also provides the first user with a confirmation number for the transfer.

Mobile Banking P2P Payment Management Process and Interface

As shown in FIG. 9G according to one embodiment of the invention, the mobile P2P payment system client application 694 displays a bank menu page on which the first user can navigate to an accounts function, a bill-paying function, a transfer funds function, or a location function. In one embodiment, each of these navigable options is a hyperlink, whereas in another embodiment, each of these navigable options is a button. The mobile P2P payment system client application 694 indicates to the first user that the first user is in a secure area of the mobile banking system 600. The bank menu page also has a text area where error messages are displayed. The mobile P2P payment system client application 694 always allows users to sign out from their accounts by providing an appropriate button or hyperlink.

Block Chain Configuration/Architecture

Rather than utilizing a centralized database of aliases as discussed with reference to some embodiments above and as shown in FIG. 13A, other various embodiments of the invention may use a decentralized block chain configuration or architecture as shown in FIG. 13B in order to facilitate real-time alias-based P2P payments. Such a decentralized block chain configuration ensures accurate mapping of aliases to financial institutions and accounts. Accordingly, a block chain configuration may be used to maintain an accurate ledger of aliases and to provide validation of transactions involving those aliases.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, one that meets other criteria. In some block chain systems, miners are motivated to create blocks by a rewards structure that offers a predefined per-block reward and/or assessments offered within the transactions validated themselves. Thus, when a miner successfully validates a transaction on the block chain, the miner may receive rewards and/or assessments as a motivation to continue creating new blocks.

As mentioned above and referring to FIG. 13B, a block chain 1300 is typically decentralized—meaning that a distributed ledger 1320 (i.e., a decentralized ledger) is maintained on multiple nodes 1310 of the block chain 1300. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains.

Various other specific-purpose implementations of block chains have been developed. These include distributed domain name management, decentralized crowd-funding, synchronous/asynchronous communication, decentralized real-time ride sharing and even a general purpose deployment of decentralized applications.

The block chain 1300 may perform one or more of the steps or functions performed by the alias data repository 700 as discussed above with reference to FIG. 7.

Block Chain Alias Payment

In various embodiments of the invention, a block chain implementation is used to validate and clear payments, such as by the blockchain itself validating payments, real-time messaging validating/clearing and/or ACH validation/clearing of payments. For real-time alias p2p payments, such as those discussed in greater detail in the above sections herein, multiple active directories may be created. In such cases, a need exists to ensure mappings are not overloaded or redirected and in order to maintain a complete audit trail. The block chain configuration is used to index alias mappings in all directories and maintain a full and visible audit trail. Mining is used, in some embodiments, to ensure that changes to specific mappings (e.g., mapping an alias to a financial institution and/or mapping an alias to an account) are confirmed and/or have reached a predetermined level of consensus. This also ensures unauthorized users are not manipulating the director(ies).

A real-time p2p payment made using an alias requires that the alias is mapped to the appropriate financial institution. This information must be universally available to everyone on the payment network, and the block chain configuration enables such information distribution. Furthermore, a real-time p2p payment made using an alias also requires that the alias is correctly mapped to the appropriate account. In some embodiments of the invention, such a mapping, while integral to clearing (or validating) the transaction, the mapping of the alias to an account is maintained as private information. For example, the mapping of the alias to an account number may be maintained at a server local to the financial institution. Thus, once a requested transaction has been placed on the public blockchain, the blockchain network recognizes that the alias associated with the transaction is mapped to a particular financial institution. That financial institution's server or system connected to the blockchain receives the information about the requested transaction and the alias and can validate that the transaction may be validated by looking up the appropriate mapping of the alias to the account. As noted, this information is not placed on the public blockchain, but rather is held privately, such as on a private blockchain or a "side-chain".

One advantage of using a blockchain configuration for real-time alias-based p2p payments is an opportunity for scaling. Thousands of banks or financial institutions may participate in a block chain for real-time alias-based p2p payments and, therefore, the time to validation of a transaction may be shortened. For example, a proposed transaction that is placed on the block chain may be validated by one or a predetermined number of nodes of the block chain in order for the transaction to proceed. The nodes may work as miners or "validators" in order to confirm that an alias being used is a valid alias and is mapped to a particular, valid financial institution. This determination may be based on the fact that the financial institution that originally mapped the alias to itself (the "originating FI") has placed it on the blockchain and in some cases, has included additional information such as a key that validates the alias.

The block chain may be configured with a set of rules to dictate when and how aliases are validated, transactions are approved and other details about how the network communicates data and the like. In some embodiments, the rules dictate that the originating FI must approve all transactions for aliases mapped to that FI. In some embodiments, the rules dictate that some or all transactions may be approved by one or more validator nodes without further input from the originating FI other than the validation of the mapped alias. In some such cases, the rules dictate that the mapped alias, when placed on the blockchain also includes additional information that is useful in determining whether transactions associated with the alias should be approved.

For example, the alias may be associated with information indicating a spending limit on the blockchain. Thus, if a transaction request associated with an alias has a transaction amount less than the spending limited stored on the blockchain and associated with the alias, the rules may dictate that a validating node can approve the transaction without further input from the originating FI. In other embodiments, the validating node must reach out to the originating FI in certain situations as dictated by the rules. For example, if the alias is indicated to be mapped to multiple accounts, multiple FIs and/or is, in any way, indicated to be a faulty or invalid alias (due to some information present on the blockchain), then the rules may dictate that the validating node communicate with the originating FI to confirm or deny validation of the alias and approval or denial of the requested transaction.

In some embodiments, the validator may approve the transaction without communicating with the originating FI. In such a case, the validator (or a group of validators if multiple validations are required by the rules), can approve the transaction based solely on the information contained in the blockchain. Thus, if a transaction is requested and a validator receives the transaction, it can check the transaction's associated alias against its ledger to determine whether an originating FI has validated the alias. If so, then the validator may approve the transaction. In this regard, the transaction may be approved very quickly, and in some cases, in real-time or near real-time.

In cases where the rules dictate further input from the originating FI, once the mapping of the alias to a particular financial institution is validated, the transaction may proceed through the blockchain network to the system(s) of that financial institution over normal block chain protocol and procedure, may be directly routed to the identified financial institution, or may be communicated over traditional rails or channels such as ACH or card-based approval channels in order to complete full validation of the alias and/or approval of the transaction. Once the financial institution receives the proposed transaction, then the financial institution retrieves its alias mapping, determines the account associated with the alias and can approve and complete the transaction.

In various embodiments, any of the nodes 1300 may be a validator or a miner that validates transactions. In some embodiments, a number of the nodes 1300 must validate a transaction in order for the transaction to be approved. For example, in one embodiment, three nodes 1300 must validate the authenticity of the alias before the transaction may be approved. A specific example would be a customer having an alias of "customer@email.com" that requests a P2P transaction using the block chain distributed network. This alias may be linked (i.e., mapped) to BANK1 on the distributed ledger on the block chain. The alias may also be linked (i.e., mapped) to ACCOUNT1 maintained at BANK1. The mapping of the alias to ACCOUNT1 is a contained on a private register held by BANK1. When an alias is mapped to BANK1, BANK1 provides the information that the alias is a valid alias that is mapped to a valid account held by BANK1. Thus, up-to-date nodes 1300 on the block chain distributed network then are aware that alias is mapped to BANK1 and is a valid alias. In some embodiments, the updates, such as the fact that an alias is mapped to a particular financial institution are only sent out to validating nodes, and in other cases, the updates are sent to all nodes or predetermined or specific nodes.

As noted above, in some instances, the rules of the blockchain and/or rules specific to particular originating FIs or validators dictate that validators cannot approve transactions without confirming available funds. In some cases, the available funds information is already associated with the alias mapping on the public blockchain, but in other cases, the validator must communicate with the originating FI in order to request approval of the transaction.

In some embodiments, an alias may only be remapped by the originating entity to ensure the validity of a remapping. For example, when a customer remaps an alias to another bank, the original bank may be required to verify the remapping. Similarly, in some embodiments, the bank to which an alias is remapped must verify the alias has been remapped. This may be done by confirming the alias is associated with a real customer who owns an account at the bank to which the alias was remapped. In some cases, particularly in cases where one or more nodes have raised a concern that a transaction involving the alias is not valid, the real customer may be contacted for verification of identity and/or verification that he/she has initiated a remapping of an alias.

Referring to FIG. 14, a method 1400 for using a block chain distributed network for facilitating a P2P alias-based payment is shown. The first step, represented by block 1410 is to receive, by a node of a block chain distributed network, a transaction record (or request) associated with a person-to-person transaction between a payor and a payee. The record includes an alias associated with the payor and/or the payee. In some cases, the transaction record includes an alias associated with the payor and another alias associated with the payee.

The next step, represented by block 1420, is to access a distributed ledger, where the ledger is updated based on communications from a block chain distributed network. The next step, represented by block 1430, is to retrieve an alias-to-entity mapping from the accessed distributed ledger. The mapping indicates at least an entity to which the alias is mapped. Next, as represented by block 1440, based on the mapping, the node determines that the alias is at least partially valid. Finally, as represented by block 1450, the last step is to communicate the transaction record to the entity and/or one or more additional nodes for full validation of the transaction record and authorization of the transaction.

Referring now to FIG. 15, a flowchart illustrates a method 1500 for using a block chain distributed network for facilitating a P2P alias-based payment. The first step, represented by block 1510, is to receive a transaction request from a node in a block chain distributed network at a financial institution system. Then, as represented by block 1520, the system determines, from the transaction request, that an alias is associated with the transaction request. Next, the system accesses a private alias ledger including a listing of a plurality of aliases and a corresponding plurality of account numbers, as represented by block 1530. Next, as represented by block 1540, the system determines the alias corresponds to an account number maintained by the entity (i.e., the financial institution). Based on determining the alias corresponds to the account number, the next step is to authorize a transaction associated with the transaction request as represented by block 1550. Finally, as represented by block 1560, the last step is to update a distributed ledger (including, for example, with the authorization of the transaction) stored by the system and to provide access to the distributed ledger to the block chain distributed network.

In some embodiments, the alias may be associated with a blockchain digital wallet and use a private key in order to confirm available funds for requested transactions. In this regard, approval of a requested transaction may be provided by a validator without requiring approval from the originating FI.

Blockchain Alias Mapping and Directory Services

According to embodiments of the invention, a blockchain distributed network enables reliable alias mapping. Such a blockchain alias mapping system addresses potential reliability issues with a global alias map that supports real-time payments, regardless of how the payments are ultimately processed. A blockchain alias mapping system has a variety of potential use cases such as registration, re-registration, look-up (to determine if an alias is mapped or to determine the appropriate network to use) and redirection of an alias to a different financial institution (FI) or account. This last use case may be related to a hijack situation where an exposure may be identified.

Currently directory services (DS) are operated by payment product companies, which are typically financial institutions (FIs). These DS's provide a directory mapping of an account to an alias that is applicable only for that FI's payment product. Independent DS's that exist currently are not interoperable, meaning that the various DS's for different FIs do not and cannot overlap such that, for example, an alias might be mapped to accounts maintained by multiple FIs. Now no common DS is available that enables a customer to map multiple payment accounts they hold with different FIs. Such a solution, which may be implemented as discussed at length above, may have some inherent security issues due to the use of a "centralized database" or clearinghouse, such as is shown in FIG. 13A. Currently available models typically require customers to manage their aliases and tokens with different DS's for different payment accounts held with different FIs, for example, one alias for one credit card, another alias for one checking account, yet another alias for a particular FI, and the like.

Accordingly, embodiments of the invention enable a system for directory services and mapping aliases that allows different FIs to use a common, shared, single source of database without a central third party. Embodiments of the system utilize blockchain and distributed ledger technologies. Blockchain provides a single source of truth that maintains a single ledger of alias and tokens for different products/services offered by different FIs. FIs that provide an the functionality for an alias to be mapped to accounts by its customers may also act as nodes of the blockchain. These FI nodes may enable their customers to enroll (or register) an alias for mapping to the account. The account may also be represented as a token (UUID) mapped to an alias name with mapping in the blockchain. A customer of a FI (i.e., node) may utilize its services (e.g., interface) to create a unique address for themselves in the blockchain and can thereby manage an alias-token couple. The node (FI) provides secure services for its customers to control the creation and life cycle management of the alias-token couple associated with that FI. These secure services may include, in some embodiments, write permissions for managing the alias-token pair. Any node (FI), in some embodiments, is enabled to query, search and read alias-token pair mapping in the blockchain for any customer (regardless of the customer's non-affiliation with that node). These functions are generally referred to as read permissions. The write permissions and operations are controlled through the customer's private key, in some embodiments, so that the customer can securely manage his/her alias/token pair(s).

Each private key may have a public key (an address on the blockchain uniquely associated with the customer) associated with it. As further discussed below, a public key (corresponding to a single DS blockchain account) may have multiple associated private keys authorized for using the public key for transactions. The map of all alias-token pairs of a particular customer are stored on the blockchain associated with the public key of the customer in the blockchain ledger. All map entries (add/edit/delete) for a customer are accepted only when signed by the secure private key of the customer. The FI (node) may provide a service that enables the customer to secure the private key in the FI's digital vault. Alternatively, the customer may receive a copy of the private key in a soft format or paper mailing form sent securely from the FI.

When a customer is accessing their respective managed aliases through a second FI different than the first FI that holds the customer's accounts, the customer can utilize the private key. Alternatively, the second FI may request that the first FI change mappings created by the first FI when the customer exercises write operations through the second FI.

A customer may map her aliases to multiple tokens or accounts. In such a case, the map entry captures which is the preselected token/account to be used when the DS is queried or searched. Customers may also define smart contracts by which they can set up rules in the blockchain. The smart contracts define which alias-token entry needs to be used for specific transactions.

In various embodiments, an alias may be used by multiple users. Each of the users may be authorized the use the alias to make payments, however, each user or subsets of users are assigned unique private keys during registration. Accordingly, each user may utilize their individual private key in order to perform a transaction using the alias. For example, when the user provides an alias for a transaction, the user can also provide the user's private key during the transaction. Use of the private key alongside the alias during a transaction may also indicate which account, payment rail, assessments or otherwise that are used for a transaction.

Referring to FIG. 16, a combined diagram and flowchart illustrates a blockchain distributed network system environment configured for alias mapping according to some embodiments of the invention. A customer interface 1610 enables a customer to interact with an FI by use of an online banking and/or mobile application (OLB/mobile app) 1615. The customer interface 1610 is configured to operably connect with the bank interface system 1630. The bank interface system 1630 may have an authentication control module 1635 for authenticating the customer's identity with the FI through the customer interface 1610. An alias-token map user interface 1645 enables the customer to manage their aliases and register new alias-token pairs. The bank interface system 1630 is operably connected with the bank DS blockchain system 1650, which in some cases is one or more systems or servers internal to the FI, that is, without direct access to systems external to the FI.

The bank DS blockchain system 1650, in some embodiments, includes several application or modules 1651. These modules may include a service registration controller 1652, a token life cycle management module 1654, a search alias-token map provider module 1656 and a view alias-token map provider module 1658. The service registration controller 1652 enables a customer to map an alias to a token (i.e., account or financial instrument) that is held by the FI. The token life cycle management module 1654 enables a customer to manage his/her aliases and the alias-token mappings. Module 1654 allows the customer to edit the alias and/or token that has been mapped, to add new aliases and tokens and their mappings, and to delete aliases, token and/or mappings from the customer's account. The search alias-token map provider module 1656 is configured to enable the FI to process a payment. The FI must search the blockchain using the module 1656 to identify account details associated with any alias that is submitted to the FI for a payment transaction. The view alias-token map provider 1658 enables the customer to view all the details regarding mappings. The system 1650 has a bank database 1660, which may include information related to some or all the F's accounts, customer and/or the like. The admin module 1662 controls access permissions and may initiate and/or manage running of the other modules 1651.

Every bank or FI that is participating in the DS blockchain has a node that is an interface for connecting with and communicating with the blockchain. The bank DS blockchain node 1670 has a blockchain server 1672 that is configured to connect the node 1670 with the blockchain. A smart contracts engine 1674 is provided for implementing smart contracts for managing alias-token selection for processing payments. For example, given a particular set of circumstances, the smart contract may be configured to use a particular alias-token pair for completing a payment. Some or all the data stored in the bank database 1660 may be pushed to the DS ledger and smart contract database 1676 that is provided for access by the blockchain network, represented by the other nodes (e.g., FIs) in the DS blockchain cloud 1690. In some cases, the bank database 1660 may contain more information for a particular alias-token mapping pair than is pushed to the DS ledger 1676. For example, the alias-token pair may be associated with a customer name, bank name, FI name, payment rail, rail assessment and/or the like.

The customer private key 1620 may be created and provided by the service registration controller 1652. The customer may select to store the secure digital vault(s) 1640. These private key(s), as discussed elsewhere, provide the customer with an opportunity to access their respective account through the originating FI or another FI.

Referring now to FIG. 17, a flowchart illustrates a method for using a blockchain distributed network for alias mapping. First, as represented by block 1710 is to authenticate a customer. This is done through a node (which is typically maintained by a FI) of the blockchain distributed network. The customer has a preexisting relationship with the FI with one or more accounts owned by the customer held by the financial institution.

Next, as represented by block 1720, the customer registers with the service. This is a one-time activity that creates an address in the DS blockchain. A unique address represents a customer in the blockchain. A customer can choose to use any FI with which he/she has a relationship in order to register for the DS blockchain service as it is a one-time activity. Once the customer has chosen to register with the DS blockchain service and they are authenticated, the node connects with the DS blockchain system to create an account. This DS account includes an address (i.e., a public key) for the customer. The DS blockchain system 1650 also generates a private key, which may be securely communicated to the customer. The node does not store the private key for improved security. The private key is required in order for the customer to add/edit/delete alias-token entries of the customer account. Thus, it becomes possible for the customer to use the same address to control the lifecycle of tokens with different FIs.

Next, as represented by block 1730, an alias-token/account pair (aka couple or mapping) is enrolled in the service. The customer first chooses an account (such as an account held at the financial institution) and provides an alias to associate with the account. Then, the FI checks the validity of the alias, that is, it confirms that the alias is truly owned by the customer. For example, if the alias is an email address, the FI may confirm by sending a test message with a confirmation link to the customer for validation. The node then queries the blockchain to check if the alias already exists in the blockchain. If it already exists, then the node checks to determine if the alias is part of the DS blockchain address of the customer. If validations are successful, then the customer is prompted to enter the private key. The node then makes a change to the customer's address in the blockchain to add the alias-token map. Additional data about the token can also be captured and stored in the blockchain. Such data may include, for example, the customer name, the FI name, payment rail information, assessment information for the payment rail, and the like. If the alias does not already exist, then the node creates an account for the customer as detailed above with reference to block 1720.

Next, as represented by block 1740, the token lifecycle is managed, such as by editing and/or deleting the alias-token pair. These operations are similar to the operations for adding the alias-token pair in reverse, for example, when the customer desires to remove the token from mapping, then the alias-token pair is removed from the blockchain address of the customer.

Other operations, as represented by block 1750, may be performed including searching, reading and implementing smart contracts. The search service may be useful for a customer to confirm that the customer's alias is not used by other customers without permission. Any node can search the DS blockchain for any alias and/or token. Such a query returns the address of the account that has the alias/token mapped to it. The read service provides that any node can query the DS blockchain to get the token for a given alias. Along with the token, other information associated with the address may be returned by the DS blockchain.

As noted above, smart contracts may also be implemented on the blockchain. Smart contracts are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

The customer can use the services of the node to create a smart contract. This smart contract, as noted above, is a set of rules which, when executed by the blockchain at a specific time, will return the best alias/rail to choose for a particular payment. This is useful in a scenario where an alias maps to multiple tokens. The smart contract returns the best token that a sender (node) can use to make a particular payment. For example, is ABCDE is an alias for multiple token, then the sender wants to make a cross-border payment, the smart contract may execute a set of rules as set by the customer (who is the recipient) and return the token and the appropriate rail through which the customer wants to receive cross-border payments. As another example, if the sender wants to make a real-time payment, then the smart contract may choose a token-rail combination that supports real-time payments.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system maintained by an entity and operatively connected with a block chain distributed network and for using the block chain distributed network for facilitating a person-to-person (P2P) alias-based resource allocation, the system comprising:
   a memory device; and
   a processing device operatively coupled to the memory device, wherein the processing device is configured to execute computer-readable program code to:
   receive a resource event record associated with a P2P resource event between a first user and a second user, wherein the resource event record comprises an alias associated with at least one of the first user or the second user;
   access a first distributed ledger, wherein the first distributed ledger is a public blockchain that is updated based on communications from a block chain distributed network;
   retrieve an alias-to-entity mapping from the accessed first distributed ledger, wherein the alias-to-entity mapping indicates at least an entity to which the alias is mapped;
   based on the mapping, determine that the alias is at least partially valid and is associated with the entity;
   access a second distributed ledger comprising a listing of a plurality of aliases and a corresponding plurality of resource depository numbers, wherein the second distributed ledger is a private blockchain;
   determine that the alias corresponds to a resource depository number maintained by the entity; and
   based on determining that the alias corresponds to the resource depository number maintained by the entity, authorize a resource event associated with a resource event request.

2. The system of claim 1, wherein the processing device is further configured to execute computer-readable program code to:
   based at least in part on the determination that the alias is at least partially valid, initiate authorization of the resource event.

3. The system of claim 1, wherein the processing device is further configured to execute computer-readable program code to:
   communicate authorization of the resource event to the block chain distributed network.

4. The system of claim 1, wherein the processing device is further configured to execute computer-readable program code to:
   update a distributed ledger stored by the system and provide access to the distributed ledger to the block chain distributed network.

5. The system of claim 4, wherein the processing device is further configured to execute computer-readable program code to:
   update the distributed ledger with the authorization of the resource event.

6. A method performed by a system maintained by an entity and operatively connected with a block chain distributed network and for using the block chain distributed network for facilitating a person-to-person (P2P) alias-based resource allocation, the method comprising:
   receiving a resource event record associated with a P2P resource event between a first user and a second user, wherein the resource event record comprises an alias associated with the at least one of the first user and the second user;
   accessing a first distributed ledger, wherein the first distributed ledger is a public blockchain that is updated based on communications from a block chain distributed network;
   retrieving an alias-to-entity mapping from the accessed first distributed ledger, wherein the alias-to-entity mapping indicates at least an entity to which the alias is mapped;
   based on the mapping, determining that the alias is at least partially valid and is associated with the entity;
   accessing a second distributed ledger comprising a listing of a plurality of aliases and a corresponding plurality of resource depository numbers, wherein the second distributed ledger is a private blockchain;
   determining that the alias corresponds to a resource depository number maintained by the entity; and
   based on determining that the alias corresponds to the resource depository number maintained by the entity, authorizing a resource event associated with a resource event request.

7. The method of claim 6, further comprising:
   based at least in part on the determination that the alias is at least partially valid, initiating authorization of the resource event.

8. The method of claim 6, further comprising:
   communicating authorization of the resource event to the block chain distributed network.

9. The method of claim 6, further comprising:
   updating a distributed ledger stored by the system and provide access to the distributed ledger to the block chain distributed network.

10. The method of claim 9, further comprising:
    updating the distributed ledger with the authorization of the resource event.

11. A computer program product for execution on a system operatively connected with a block chain distributed network, the computer program product for using the block chain distributed network for facilitating a person-to-person (P2P) alias-based resource allocation, the computer program product comprising at least one non-transitory computer-readable medium having computer-readable program code portions embodied therein, the computer-readable program code portions comprising:
    an executable portion configured to receive a resource event record associated with a P2P resource event between a first user and a second user, wherein the resource event record comprises an alias associated with at least one of the first user and the second user;
    an executable portion configured to access a first distributed ledger, wherein the first distributed ledger is a public blockchain that is updated based on communications from a block chain distributed network;

an executable portion configured to retrieve an alias-to-entity mapping from the accessed first distributed ledger, wherein the alias-to-entity mapping indicates at least an entity to which the alias is mapped;

an executable portion configured to, based on the mapping, determine that the alias is at least partially valid and is associated with the entity;

an executable portion configured to access a second distributed ledger comprising a listing of a plurality of aliases and a corresponding plurality of resource depository numbers, wherein the second distributed ledger is a private blockchain;

an executable portion configured to determine that the alias corresponds to a resource depository number maintained by the entity; and an executable portion configured to, based on determining that the alias corresponds to the resource depository number maintained by the entity, authorize a resource event associated with a resource event request.

12. The computer program product of claim 11, wherein the computer-readable program code portions further comprise:

an executable portion configured to, based at least in part on the determination that the alias is at least partially valid, initiate authorization of the resource event.

13. The computer program product of claim 11, wherein the computer-readable program code portions further comprise:

an executable portion configured to communicate authorization of the resource event to the block chain distributed network.

14. The computer program product of claim 11, wherein the computer-readable program code portions further comprise:

an executable portion configured to update a distributed ledger stored by the system and provide access to the distributed ledger to the block chain distributed network.

* * * * *